United States Patent
Kobayashi

(10) Patent No.: US 9,088,774 B2
(45) Date of Patent: Jul. 21, 2015

(54) IMAGE PROCESSING APPARATUS, IMAGE PROCESSING METHOD AND PROGRAM

(75) Inventor: Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 13/576,987

(22) PCT Filed: Jan. 5, 2011

(86) PCT No.: PCT/JP2011/050042
§ 371 (c)(1),
(2), (4) Date: Sep. 11, 2012

(87) PCT Pub. No.: WO2011/099314
PCT Pub. Date: Aug. 18, 2011

(65) Prior Publication Data
US 2013/0010059 A1   Jan. 10, 2013

(30) Foreign Application Priority Data
Feb. 12, 2010 (JP) .............................. P2010-029239

(51) Int. Cl.
H04N 13/00   (2006.01)
G06T 19/20   (2011.01)

(52) U.S. Cl.
CPC ............ *H04N 13/0022* (2013.01); *G06T 19/20* (2013.01); *G06T 2219/2004* (2013.01); *H04N 2013/0081* (2013.01)

(58) Field of Classification Search
USPC .......................................................... 348/43
See application file for complete search history.

(56) References Cited

U.S. PATENT DOCUMENTS

| 6,324,001 B2 | 11/2001 | Tabata |
| 2001/0030715 A1 | 10/2001 | Tabata |
| 2010/0033554 A1 | 2/2010 | Kobayashi |

FOREIGN PATENT DOCUMENTS

| CN | 101646095 | 2/2010 |
| EP | 2 152 011 | 4/2009 |

(Continued)

OTHER PUBLICATIONS

English-language Supplementary European Search Report in corresponding EP 11742063.8, mailed May 14, 2013.
Notification of the Second Office Action Issued by People's Republic of China Patent Office on Mar. 27, 2014, in corresponding JP Application or Patent No. 2011-80008412,4, Mailed Mar. 27, 2014.

(Continued)

*Primary Examiner* — Michael Teitelbaum
(74) *Attorney, Agent, or Firm* — Finnegan Henderson; Farabow Garrett & Dunner LLP

(57) ABSTRACT

An apparatus and a method for performing a parallax control of a left image and a right image applied to display of a stereoscopic image are provided. The apparatus includes a left image transforming unit for generating a left image-transformed image by changing a phase of an image signal of a left image which is to be presented to a left eye in a right direction or a left direction and a right image transforming unit for generating a right image-transformed image by changing a phase of an image signal of a right image which is to be presented to a right eye in the left direction or the right direction. For example, each image transforming unit generates a differential signal by applying, to an input image, differential filter coefficients of coefficient series of opposite characteristics, and generates a parallax-controlled transformed signal using combining processing in which the differential signal or a non-linear signal of this differential signal is added to an original image signal. This processing achieves processing for, e.g., reduction or enlargement of a parallax range.

11 Claims, 23 Drawing Sheets

(56) References Cited

FOREIGN PATENT DOCUMENTS

| | | |
|---|---|---|
| EP | 2 152 011  A2 | 8/2009 |
| EP | 2 152 011 | 2/2010 |
| JP | 07-167633 | 7/1995 |
| JP | 09-322199 | 12/1997 |
| JP | 2006-325173 | 11/2006 |
| JP | 2010-63083 | 3/2010 |

OTHER PUBLICATIONS

English Language People's Republic of China Search Report in corresponding JP 2011-80008412.4, mailed Mar. 27, 2014.

L. Zhang, et al., "Stereoscopic Image Generation Based on Depth Image for 3D TV", IEEE Trans. on Broadcasting, vol. 51, No. 2, Jun. 2005.

International Search Report for PCT/JP2011/050042 dated Apr. 19, 2011 from the Japanese Patent Office.

FIG. 2
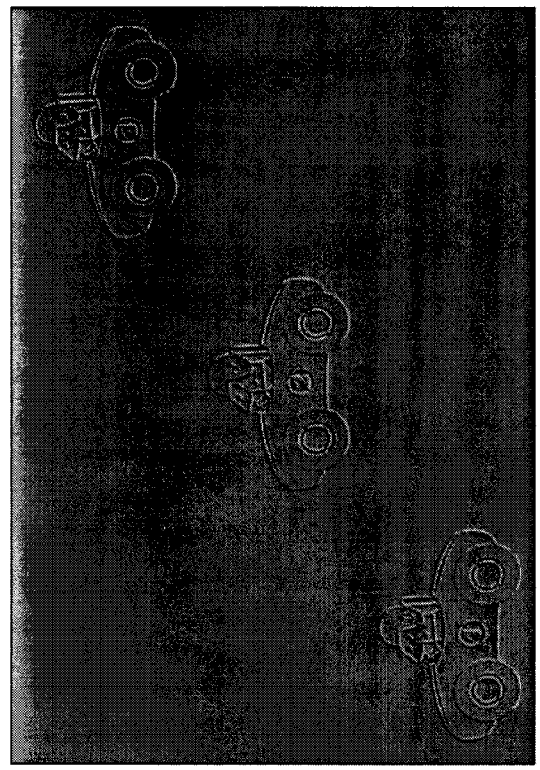
(b) DIFFERENTIAL SIGNAL
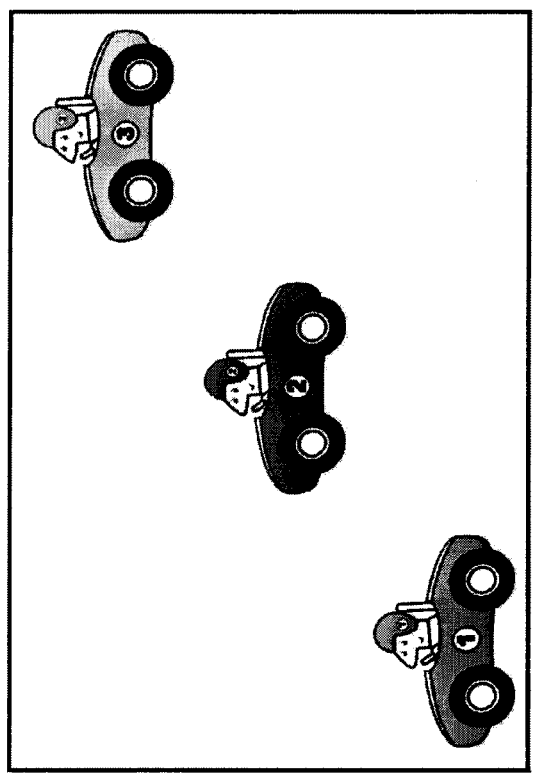
(a) INPUT SIGNAL

IMAGE PROCESSING APPARATUS, IMAGE PROCESSING METHOD AND PROGRAM

TECHNICAL FIELD

The present invention relates to an image processing apparatus, an image processing method, and a program, and more specifically, to an image processing apparatus, an image processing method, and a program for performing parallax control of a parallax image that supports stereoscopic vision (three-dimensional vision).

BACKGROUND ART

In order to generate a so-called parallax image (also referred to as a three-dimensional image or a 3D image) that supports stereoscopic vision (three-dimensional vision), it is necessary to prepare images from different viewpoints, i.e., a left eye image and a right eye image. More specifically, images having parallax are generated as a left eye image and a right eye image, and control is performed such that the left eye image is observed with only the left eye of an observer (user) and the right eye image is observed with only the right eye of the observer (user), so that the observer can feel stereoscopic feeling.

Configurations for allowing a user to observe each image with only one of the eyes include various methods. Examples include a passive-glasses method for separating images observed with the right and left eyes from each other using polarization filters and color filters and an active-glasses method for time-divisionally separating images to right and left images using a liquid crystal shutter. In general, stereoscopic images can be observed by observing images with such special three-dimensional vision glasses.

As described above, various methods have been suggested in the past as methods for achieving three-dimensional vision by presenting images having parallax.

However, when the parallax range is too narrow, i.e., when a width between a subject seen in proximity and a subject seen at a distance is too narrow, there is a problem in that a user is unable to sufficiently feel stereoscopic feeling. On the other hand, it is reported that there are some observers who feel tired or sickness when they continue to observe three-dimensional images with large parallax ranges for a long period of time. As a method for solving such problem, a method for controlling the amount of parallax has been suggested in order to give appropriate stereoscopic feeling.

For example, Patent Document 1 (Japanese Patent Application Laid-Open No. 07-167633) discloses a method for detecting a retinal image difference (disparity) corresponding to parallax from right and left images (a left eye image and a right eye image) constituting a three-dimensional image and adjusting the parallax by horizontally shifting the right and left images on the basis of the detected retinal image difference (disparity) information. In other words, this method disclosed in Patent Document 1 is an image conversion method for setting a parallax range that can be comfortably seen by an observer, by horizontally shifting the entire image using an average value of disparities.

It should be noted that the disparity is a retinal image difference or a value corresponding to a distance, on a display unit, between a subject in the left eye image and the same subject in the right eye image, and the larger the disparity is, the larger the parallax is.

This method disclosed in Patent Document 1 is an image conversion method for setting a parallax range that can be comfortably seen by an observer, by horizontally shifting the entire image using an average value of disparities.

In this configuration disclosed in Patent Document 1, the amount of horizontal shift is determined using an average value of disparities, and there is an advantage in that conversion can be performed with less amount of processing. In this configuration disclosed in Patent Document 1, however, the entire right and left images are horizontally shifted, and there is a problem in that the dynamic range of parallax (difference in depth between the closest subject and the farthest subject) cannot be controlled.

On the other hand, Non-patent Document 1 ("Stereoscopic image generation based on depth image for 3D TV", L. Zhang and W. J. Tam, IEEE Trans. On Broadcasting, Vol. 51, No. 2, June 2005) discloses a method for generating a disparity map describing disparity corresponding to each pixel of images (displacement between a left image and a right image) from the right and left images and recovering images for different viewpoints, using the disparity map and the original images.

With this method disclosed in Non-patent Document 1, an image from a new viewpoint can be generated, and images can be generated in which the dynamic range of parallax of the stereo image are also controlled. In this method described in Non-patent Document 1, however, it is essential to generate the disparity map describing disparity (image difference) for each pixel of images, and this increases the processing cost, and there is a problem in that it is difficult to reduce the size of the circuit. Moreover, since the quality of the generated images depends on the accuracy of the disparity map, it is required to generate the disparity map with a high resolution and a high degree of accuracy. It is difficult to generate such disparity map with a high degree of accuracy, which becomes a factor for increasing the size of the circuit.

CITATION LIST

Patent Document

Patent Document 1: Japanese Patent Application Laid-Open No. 07-167633

Non-Patent Document

Non-patent Document 1: "Stereoscopic image generation based on depth image for 3D TV", L. Zhang and W. J. Tam, IEEE Trans. On Broadcasting, Vol. 51, No. 2, June 2005

SUMMARY OF THE INVENTION

Problems to be Solved by the Invention

The present invention is made in view of, for example, the above problems, and it is an object of the present invention to provide an image processing apparatus, an image processing method, and a program capable of controlling parallax of stereo images without generating any disparity map describing disparity for each pixel of images or by only generating a rough disparity map including less amount of data that can be generated with less processing.

Solutions to Problems

A first aspect of the present invention lies in:
an image processing apparatus including:
a left image transforming unit for inputting a left image which is to be presented to a left eye and which is applied to display of a stereoscopic image, changing a phase of an image signal of a left image in a right direction or a left direction, and generating a left image-transformed image; and a right image transforming unit for inputting a right image which is to be presented to a right eye and which is applied to display of a stereoscopic image, changing a phase of an image signal of a right image in the left direction or the right direction, and generating a right image-transformed image, wherein the left image transforming unit and the right image transforming unit extract feature quantities of the image signals of the input images, and generate the left image-transformed image and the right image-transformed image using image transform processing to which the extracted feature quantities are applied.

Further, in an embodiment of the image processing apparatus according to the present invention, the left image transforming unit includes a left image differentiating device for generating a differential signal of the image signal of the left image as the feature quantity, and a left image combining unit for generating the left image-transformed image by executing combining processing in which the differential signal of the left image or a transformed signal of the differential signal is added to the left image signal, wherein the right image transforming unit includes a right image differentiating device for generating a differential signal of the image signal of the right image as the feature quantity, and a right image combining unit for generating the right image-transformed image by executing combining processing in which the differential signal of the right image or a transformed signal of the differential signal is added to the right image signal.

Further, in an embodiment of the image processing apparatus according to the present invention, the left image transforming unit includes a left image non-linear transforming unit for executing non-linear transform processing of the differential signal of the left image, and the left image combining unit generates the left image-transformed image by executing combining processing in which a transformed signal generated by the left image non-linear transforming unit is added to the left image signal, and the right image transforming unit includes a right image non-linear transforming unit for executing non-linear transform processing of the differential signal of the right image, and the right image combining unit generates the right image-transformed image by executing combining processing in which a transformed signal generated by the right image non-linear transforming unit is added to the right image signal.

Further, in an embodiment of the image processing apparatus according to the present invention, the left image differentiating device and the right image differentiating device execute differential processing to which first-order differentiation filters having differential filter coefficient series of opposite patterns are applied.

Further, in an embodiment of the image processing apparatus according to the present invention, the left image differentiating device and the right image differentiating device execute differential processing according to a same differential mode, and one of the left image combining unit and the right image combining unit adds the differential signal of each image or the transformed signal of the differential signal to the input image signal, and the other of them performs processing of deducting the differential signal of each image or the transformed signal of the differential signal from the input image signal.

Further, in an embodiment of the image processing apparatus according to the present invention, the left image differentiating device and the right image differentiating device execute differential processing of a brightness signal of the input image signal.

Further, in an embodiment of the image processing apparatus according to the present invention, the image processing apparatus further includes a parallax detecting unit generating parallax information by analyzing arrangement of a corresponding point which corresponds to a same subject portion in the left image and the right image which are input into the image processing apparatus, and the left image differentiating device and the right image differentiating device execute differential processing by changing a differential processing mode in accordance with the parallax information generated by the parallax detecting unit.

Further, in an embodiment of the image processing apparatus according to the present invention, the parallax detecting unit generates disparity polarity information indicating that the arrangement of the corresponding point which corresponds to the same subject portion in the left image and the right image which are input into the image processing apparatus is any one of the following settings (a) and (b): (a) a corresponding point of the left image is located at left of a corresponding point of the right image; and (b) the corresponding point of the left image is located at right of the corresponding point of the right image, and the left image differentiating device and the right image differentiating device execute differential processing to which first-order differentiation filters having differential filter coefficient series of opposite patterns are applied, in accordance with the disparity polarity information generated by the parallax detecting unit.

Further, in an embodiment of the image processing apparatus according to the present invention, the parallax detecting unit generates parallax information by applying reduced images or decimated images of the left image and the right image which are input to the image processing apparatus.

Further, in an embodiment of the image processing apparatus according to the present invention, the image processing apparatus further includes a control signal input unit for inputting a control signal for controlling change to at least one of a differential processing mode for the left image differentiating device and the right image differentiating device and a transform processing mode for the left image non-linear transforming unit and the right image non-linear transforming unit.

Further, a second aspect of the present invention lies in:
an image processing method executed by an image processing apparatus, including:

a left image transforming step for causing a left image transforming unit to input a left image which is to be presented to a left eye and which is applied to display of a stereoscopic image, to change a phase of an image signal of a left image in a right direction or a left direction, and to generate a left image-transformed image; and a right image transforming step for causing a right image transforming unit to input a right image which is to be presented to a right eye and which is applied to display of a stereoscopic image, to change a phase of an image signal of a right image in the left direction or the right direction, and to generate a right image-transformed image, wherein the left image transforming step and the right image transforming step are steps for extracting feature quantities of the image signals of the input images, and generating the left image-transformed image and the right image-transformed image using image transform processing to which the extracted feature quantities are applied.

Further, a third aspect of the present invention lies in:
A program for causing an image processing apparatus to execute image processing, wherein the program causes the image processing apparatus to execute:

a left image transforming step for causing a left image transforming unit to input a left image which is to be presented to a left eye and which is applied to display of a stereoscopic image, to change a phase of an image signal of a left image in a right direction or a left direction, and to generate a left image-transformed image; and a right image transforming step for causing a right image transforming unit to input a right image which is to be presented to a right eye and which is applied to display of a stereoscopic image, to change a phase of an image signal of a right image in the left direction or the right direction, and to generate a right image-transformed image, wherein in the left image transforming step and the right image transforming step, feature quantities of the image signals of the input images are extracted, and the left image-transformed image and the right image-transformed image are generated using image transform processing to which the extracted feature quantities are applied.

It should be noted that the program of the present invention is, for example, a program that can be provided, as a storage medium or a communication medium provided in a computer-readable format, to a general purpose system that can execute various program codes. By providing such programs in the computer-readable format, processing according to the programs is achieved on a computer system.

Other objects, features, and advantages of the present invention will become apparent from more detailed description based on attached drawings and embodiments of the present invention explained below. In this specification, a system is a logical configuration of a set of multiple apparatuses, and an apparatus of each configuration is not necessarily limited to be provided within the same housing.

Effects of the Invention

According to a configuration of an embodiment of the present invention, an apparatus and a method for performing a parallax control of a left image and a right image applied to display of a stereoscopic image are provided. The image processing apparatus according to the present invention includes a left image transforming unit for generating a left image-transformed image by changing a phase of an image signal of a left image which is to be presented to a left eye in a right direction or a left direction and a right image transforming unit for generating a right image-transformed image by changing a phase of an image signal of a right image which is to be presented to a right eye in the left direction or the right direction. For example, each image transforming unit generates a differential signal by applying, to an input image, differential filter coefficients of coefficient series of opposite characteristics, and generates a parallax-controlled transformed signal using combining processing in which the differential signal or a non-linear signal of this differential signal is added to an original image signal. This processing achieves processing for, e.g., reduction or enlargement of a parallax range.

BRIEF DESCRIPTION OF DRAWINGS

FIGS. 2($a$) and 2($b$) are figures explaining differential processing performed by a differentiating device of the image processing apparatus according to the embodiment of the present invention.

MODE FOR CARRYING OUT THE INVENTION

Figure 1:
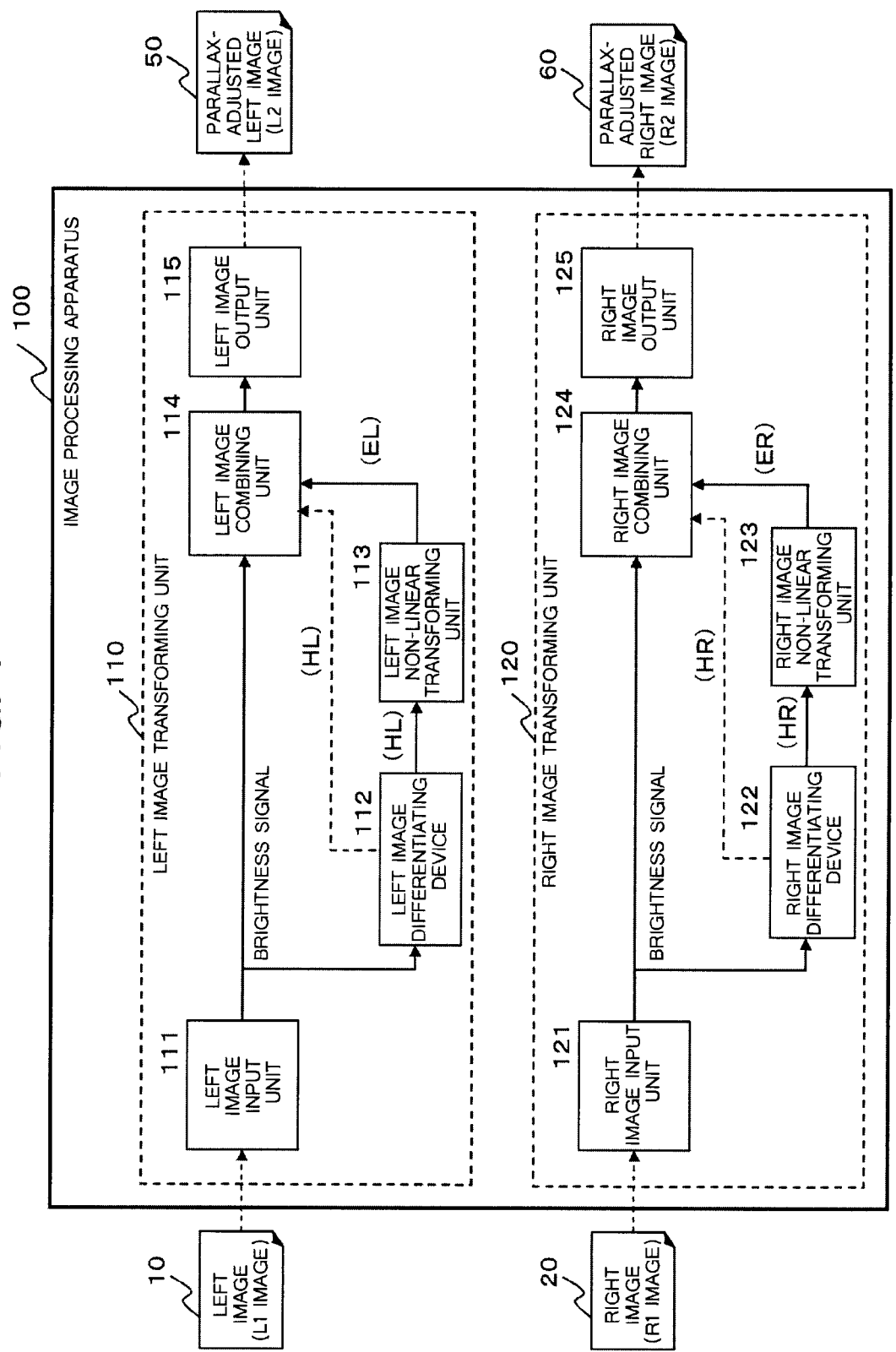
FIG. 1 is a figure explaining an example of configuration of an image processing apparatus according to an embodiment of the present invention.

An image processing apparatus, an image processing method, and a program according to the present invention will be hereinafter explained in detail with reference to drawings. The following explanation will be made in order in accordance with corresponding items listed below.

A. Embodiment 1: Example of reducing processing of parallax range set at a deeper side with respect to a display surface of a display unit B. Embodiment 2: Example of enlarging processing of parallax range set at a deeper side with respect to a display surface of a display unit C. Embodiment 3: Example of control (reducing/enlarging) processing of parallax range set at a closer side with respect to a display surface of a display unit D. Embodiment 4: Example of control processing of parallax range set at either side of a display surface of a display unit E. Embodiment 5: the embodiment for performing parallax control using simplified disparity map F. Embodiment 6: the embodiment having configuration to enable input of signal for control of shift mode

[A. Embodiment 1: Example of Reducing Processing of Parallax Range Set at a Deeper Side with Respect to a Display Surface of a Display Unit]

An embodiment 1 of the present invention will be explained with reference to FIG. 1 and subsequent drawings.

The embodiment 1 is an embodiment in which parallax control can be performed without using any disparity map in which a value of disparity corresponding to image displacement of right and left images (a left eye image and a right eye image) constituting a stereoscopic image (three-dimensional image) (a retinal image difference and the like, and a display position distance between a left image and a right image on a display unit) is associated with each pixel.

In the present embodiment, an image processing apparatus is achieved, which executes parallax control such as reducing processing and enlarging processing of a parallax range of right and left images (left eye image and right eye image) constituting a three-dimensional image without generating any disparity map.

An example of configuration of an image processing apparatus according to the present embodiment will be explained with reference to FIG. 1. As illustrated in FIG. 1, an image processing apparatus 100 includes a left image transforming unit 110 for receiving a left image (L1 image) 10, performing image transform, and generating a parallax-adjusted left image (L2 image) 50 in which parallax is adjusted, and also includes a right image transforming unit 120 for receiving a right image (R1 image) 20, performing image transform, and generating a parallax-adjusted right image (R2 image) 60 in which parallax is adjusted.

The left image (L1 image) 10 and the right image (R1 image) 20 serving as input images are a left eye image and a right eye image, respectively, which are applied for display of a stereoscopic image (three-dimensional image). In other words, the left image (L1 image) 10 and the right image (R1 image) 20 are images in which parallaxes are set in accordance with subject distances, such as images taken from different viewpoints. It should be noted that the left image (L1 image) 10 and the right image (R1 image) 20 may be either still pictures or motion pictures such as video data. In either of the cases of the motion picture or the still picture, a pair of the left image (L1 image) 10 and the right image (R1 image) 20 which are respectively applied to display three-dimensional images is successively input to a left image transforming unit no and a right image transforming unit 120, and these units generate the parallax-adjusted left image (L2 image) 50 and the parallax-adjusted right image (R2 image) 60 in which parallax is adjusted by applying transform processing of the images.

The left image transforming unit 110 includes a left image input unit 111 for receiving the left image (L1) 10, a left image differential processing unit 112 for performing differential processing of the left image 10, a left non-linear transforming unit 113 for non-linearly transforming a differential signal of the left image 10, a left image combining unit 114 for combining the left image 10 and the differential signal non-linearly transformed, and a left image output unit 115 for outputting the converted parallax-adjusted left image (L2) 50.

The right image transforming unit 120 includes a right image input unit 121 for receiving the right image (R1) 20, a right image differential processing unit 122 for performing differential processing of the right image 20, a right non-linear transforming unit 123 for non-linearly transforming a differential signal of the right image 20, a right image combining unit 124 for combining the right image 20 and the differential signal non-linearly transformed, and a right image output unit 125 for outputting the converted parallax-adjusted right image (R2) 60.

The left image transforming unit 110 and the right image transforming unit 120 perform processing to generate the parallax-adjusted left image 50 and the parallax-adjusted right image 60 in which parallaxes are controlled, by extracting spatial feature quantities of the input image signals and applying different emphasis processing on the extracted feature quantities, and to output the parallax-adjusted left image 50 and the parallax-adjusted right image 60 via the left image output unit 115 and the right image output unit 125.

For example, the left image output unit 115 and the right image output unit 125 are connected to a display unit for performing display processing of the three-dimensional images, and performs display processing of three-dimensional images in which the parallax-adjusted left image (L2) 50 and the parallax-adjusted right image (R2) 60 in which parallaxes are adjusted are applied.

Alternatively, the left image output unit 115 and the right image output unit 125 are connected to a recording unit for executing recording processing to a recording medium, so that recording processing is performed to record the parallax-adjusted left image (L1) 50 and parallax-adjusted right image (R1) 60 to the recording medium. Alternatively, the left image output unit 115 and the right image output unit 125 may be configured to transmit the parallax-adjusted left image (L1) 50 and parallax-adjusted right image (R1) 60 to an external apparatus via a communication unit.

The details of processing executed by the left image transforming unit 110 will be explained.

The left image input unit 111 receives the left image (L1) 10 generated in advance to be applied to display of the three-dimensional image.

The left image differentiating device 112 extracts image feature quantities from the left image 10 which is input to the left image transforming unit 110. More specifically, the left image differentiating device 112 retrieves a brightness signal from the left image 10, and generates a differential signal (HL) of the brightness signal. For example, the left image differentiating device 112 receives a brightness signal of an image in a horizontal direction, and generates a signal obtained by performing first-order differentiation on the input brightness signal. In the first order differential processing, for example, a linear first-order differentiation filter and the like with three taps in the horizontal direction is used.

FIG. 2 illustrates an example of generating processing of a differential signal of the left image differentiating device 112.

FIG. 2 shows an example of signals listed below.
(a) input signal
(b) differential signal FIG. 2(a) is an example of input image signal.

FIG. 2(b) is an image obtained by performing differential processing on the input image signal of FIG. 2(a). For example, FIG. 2(b) shows a brightness differential signal (HL) generated by the left image differentiating device 112.

In the embodiment, a case will be explained where the brightness signal is adopted as processing data. However, not only the brightness signal but also a color signal (such as RGB) may be adopted as the processing target data.

The left image non-linear transforming unit 113 non-linearly transforms the differential signal (HL) which is output from the left image differentiating device 112, and outputs the signal as a non-linear transformed signal (EL) to the image combining unit 114.

Figure 3:
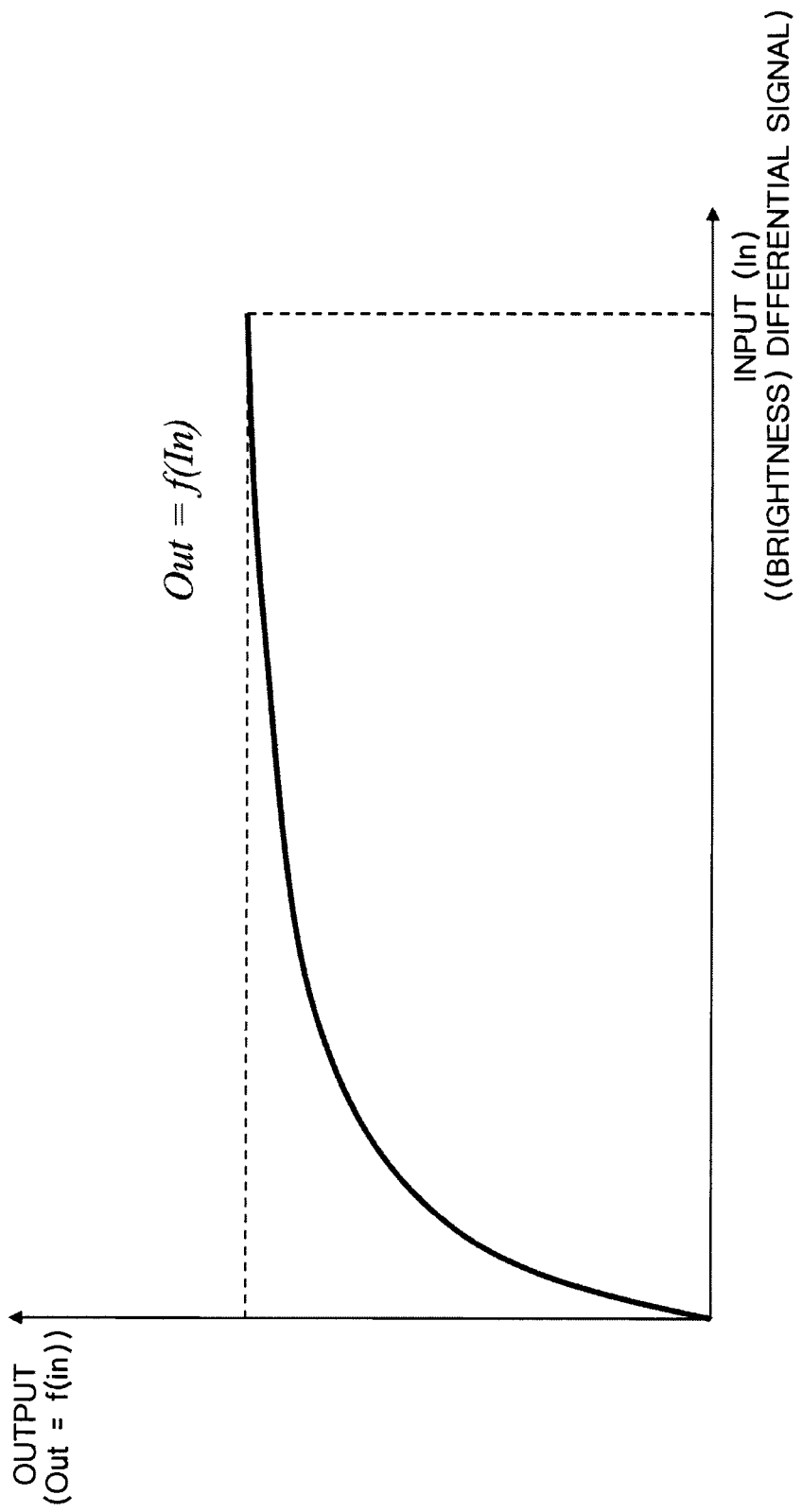
FIG. 3 is a figure explaining non-linear transform processing performed by a non-linear transforming unit of the image processing apparatus according to the embodiment of the present invention.

FIG. 3 illustrates an example of non-linear transform processing executed by the left image non-linear transforming unit 113. The horizontal axis denotes a brightness value of the differential signal (brightness differential signal) which is output from the left image differentiating device 112, and the vertical axis denotes an output brightness value provided as a result of the non-linear transform processing performed by the left image non-linear transforming unit 113.

The left image non-linear transforming unit 113 transforms the input differential signal (In (=HL)) using a function f (x) defined in advance, and outputs a parallax-emphasized signal (Out (=EL)). More specifically, Out=f (In) holds. At this occasion, various kinds of setting may be used in the function f (x). An example of function f (x) includes the following function.

$$f(x)=x^\gamma$$

An exponential function as described in the above expression is used. γ is a coefficient set in advance, and it can be set to various values.

The transform function used in the left image non-linear transforming unit 113 is not limited to the exponential function. Alternatively, linear transform may be performed.

As indicated with broken lines in FIG. 1, the processing of the left image non-linear transforming unit 113 may be omitted. In this case, the differential signal (HL) which is output from the left image differentiating device 112 is directly input to the left image combining unit 114.

The left image combining unit 114 performs processing of generating the parallax-adjusted left eye image 50 by applying the left image (L1) 10 and spatial feature quantities generated from this left image (L1) 10, i.e., the differential signal (HL) of the brightness signal or the non-linear transformed signal (EL) generated by non-linearly converting this differential signal.

Subsequently, the processing of the left image combining unit 114 will be explained.

The left image combining unit 114 performs processing of generating the parallax-adjusted left eye image 50 by applying the left image 10 which is the input image and the spatial feature quantities generated from this left image 10, i.e., the differential signal of the brightness signal or the non-linear transformed signal generated by non-linearly converting this differential signal. The generated parallax-adjusted left image 50 is output via the left image output unit 115, and for example, it is displayed on the display unit.

FIGS. 4(a) to 4(c) illustrate an example of image combining processing performed by the left image combining unit 114. The following signals are shown from the top of FIGS. 4(a) to 4(c).
(a) input signal (L1)
(b) differential signal (HL)
(c) combined image signal (=parallax-adjusted left image signal (L2))

(a) Input signal (L1) denotes brightness change of the left image (L1) 10, which is input into the image processing apparatus 100, for any given one horizontal line of any given frame of video data, for example. This shows an example of one line in which there is a high brightness region having high brightness in a central portion.

In a region P from a line position (x1) to a line position (x2), (a) input signal (L1) shows a change such that the brightness gradually increases. Between line positions (x2) to (x3), there is a high brightness portion in which high level brightness is maintained. Thereafter, in a region Q from a line position (x3) to a line position (x4), (a) input signal (L1) shows a change such that the brightness gradually decreases.

(b) Differential signal (HL) denotes a result of differential of (a) input signal (L1). This differential signal is a signal generated by the left image differentiating device 112 of the left image transforming unit 110 as illustrated in FIG. 1.

It should be noted that differential filter coefficients used by the left image differentiating device 112 make a differential filter having differential filter coefficients of the following sequence as illustrated in FIG. 4(b).

1, 0, −1

The differential processing performed with the filter having the differential filter coefficients of the above sequence means applying:
a differential signal (In') of a pixel (n) in a horizontal line,
a pixel value of a pixel (n−1) before (at the left of) the pixel (n) (in the present example, brightness)=(I(n−1)), and
a pixel value of a pixel (n+1) after (at the right of) the pixel (n) (in the present example, brightness)=(I(n+1)),
and calculating as follows.

$$In'=(I(n-1))-(I(n+1))$$

As illustrated in FIGS. 4(a) to 4(c), the differential signal (LH) generated by the left image differentiating device 112 has a negative value in the region P in which the brightness change of (a) input left image signal (L1) is positive, and the differential signal (LH) generated by the left image differentiating device 112 has a positive value in the region Q in which the brightness change of (a) input left image signal (L1) is negative.

(c) Combined signal (parallax-adjusted left image signal (L2)) is a signal generated by the left image combining unit 114 of the left image transforming unit 110 as illustrated in FIG. 1. The left image combining unit 114 generates the combined signal (parallax-adjusted left image signal (L2)) by executing combining processing for adding (a) input left image signal (L1) and (b) left image differential signal (HL).

As a result, the combined signal (parallax-adjusted left image signal (L2)) as illustrated in FIG. 4(c) is generated.

As can be understood from this figure, the brightness change portions P, Q of (a) input signal (L1) are phase-changed (shifted) in the right direction in (c) combined image signal (=parallax-adjusted left image signal (L2)). This is the effect caused by the combining (adding) processing of the differential signal to the input signal (L1).

In the explanation of FIGS. 4(a) to 4(c), an example is shown in which the processing of the left image non-linear transforming unit 113 as illustrated in FIG. 1 is omitted. However, when the processing of the left image non-linear transforming unit 113 is added, the amplitude of the differential signal of FIG. 4(b) is controlled (for example, suppressed).

In this case, (c) combined image signal (=parallax-adjusted left image signal (L2)), which is the result of the combining processing performed by the left image combining unit 114, is also a phase-changed (shifted) signal, i.e., in which the brightness change portion P, Q are moved to the right side with respect to (a) input signal (L1), just like the one as illustrated in FIGS. 4(a) to 4(c).

As described above, the left image transforming unit 110 as illustrated in FIG. 1 generates and outputs the parallax-adjusted left image (L2) 50 in which the brightness change portion of the left image (L1) 10, i.e., the input image, is shifted in the right direction.

Subsequently, the processing of the right image transforming unit 120 as illustrated in FIG. 1 will be explained. The right image transforming unit 120 has the same configuration as the left image transforming unit 110.

More specifically, the right image transforming unit 120 includes a right image input unit 121 for receiving the right image (R1) 20, a right image differential processing unit 122 for performing differential processing of the right image 20, a right non-linear transforming unit 123 for non-linearly transforming a differential signal of the right image 20, a right image combining unit 124 for combining the right image 20 and the differential signal non-linearly transformed, and a right image output unit 125 for outputting the converted parallax-adjusted right image (R2) 60.

Basically, the processing of each constituent unit of the right image transforming unit 120 performs the same processing as the processing of each corresponding constituent unit of the left image transforming unit 110.

However, the right image transforming unit 120 is different in coefficients of a differential filter applied by the right image differential processing unit 122 that performs the differential processing of the right image 20.

The coefficients of the differential filter applied by the right image differential processing unit 122 have a sequence obtained by inversing the coefficients of the differential filter applied by the left image differential processing unit 112 of the left image transforming unit 110. In other words, the coefficients of the differential filter applied by the right image differential processing unit 122 have a sequence of an inverse pattern.

Figure 5:
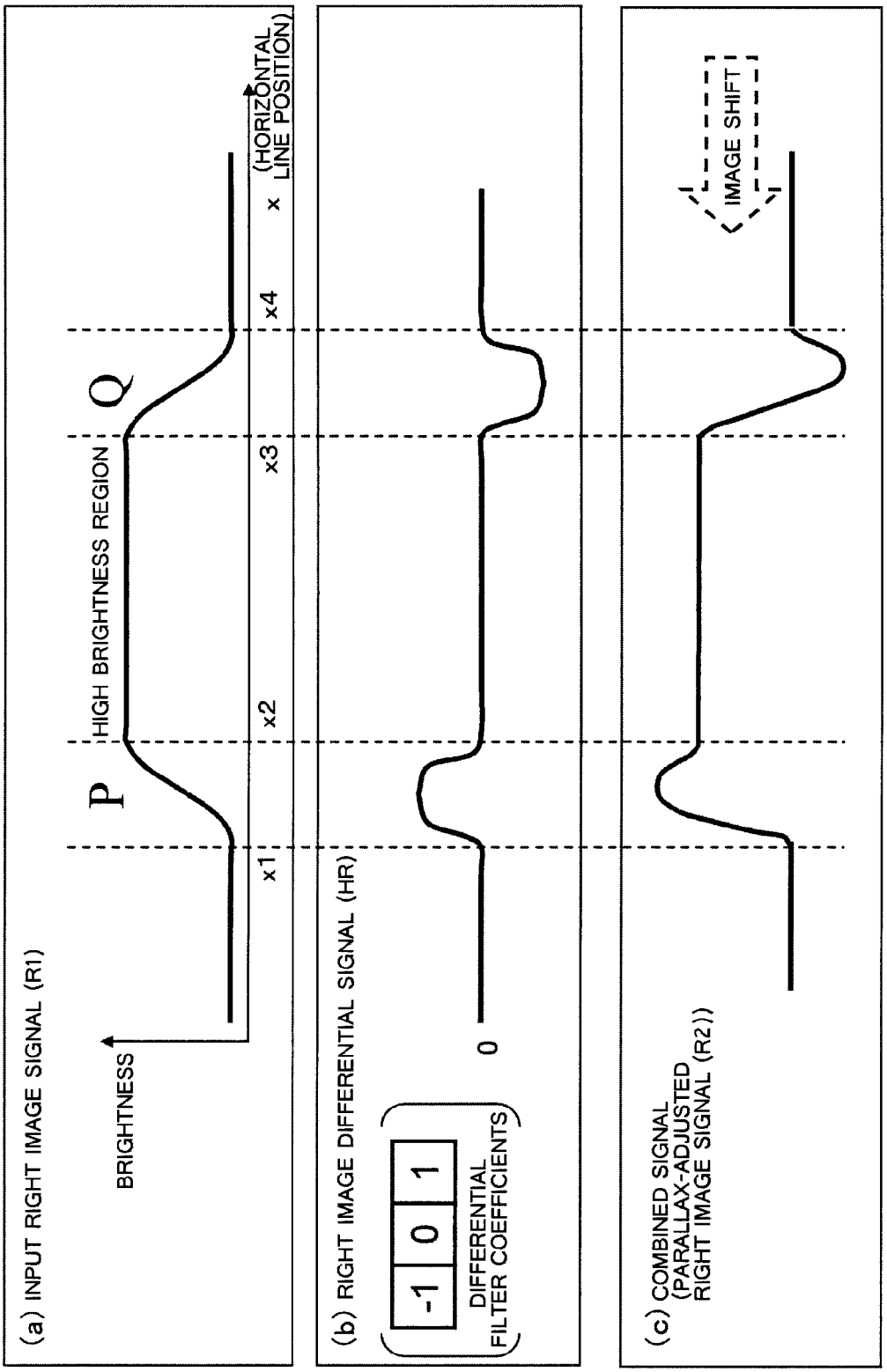
FIGS. 5($a$) to 5($c$) are figures explaining an example of processing performed by a right image transforming unit of the image processing apparatus according to the embodiment of the present invention.

An example of the right image (R1) 20 which is input to the right image transforming unit 120, the right image differential signal (HR) generated by the right image differential processing unit 122, and the combined signal (parallax-adjusted right image signal (R2) generated by the right image combining unit 124 will be explained with reference to FIGS. 5(a) to 5(c).

The example of the signals as illustrated in FIGS. 5(a) to 5(c) corresponds to FIGS. 4(a) to 4(c) described above as the example of the signals of the left image transforming unit 110.

More specifically, FIGS. 5(a) to 5(c) illustrate an example of image combining processing performed by the right image combining unit 124. The following signals are shown from the top of FIGS. 5(a) to 5(c).

(a) input signal (R1)

(b) differential signal (HR)

(c) combined image signal (=parallax-adjusted right image signal (R2))

(a) Input signal (R1) denotes brightness change of the right image (R1) 20, which is input into the image processing apparatus 100, for any given one horizontal line of any given frame of video data, for example. This shows an example of one line in which there is a high brightness region having high brightness in a central portion.

In a region P from a line position (x1) to a line position (x2), (a) input signal (R1) shows a change such that the brightness gradually increases. Between line positions (x2) to (x3), there is a high brightness portion in which high level brightness is maintained. Thereafter, in a region Q from a line position (x3) to a line position (x4), (a) input signal (R1) shows a change such that the brightness gradually decreases.

(b) Differential signal (HR) denotes a result of differential of (a) input signal (R1). This differential signal is a signal generated by the right image differentiating device 122 of the right image transforming unit 120 as illustrated in FIG. 1.

It should be noted that, as described above, differential filter coefficients used by the right image differentiating device 122 is constituted by the coefficient sequence obtained by inversing the differential filter coefficients used by the left image differentiating device 112. More specifically, as illustrated in FIG. 5(b), the differential filter coefficients used by the right image differentiating device 122 make a differential filter having differential filter coefficients of the following sequence as illustrated in FIG. 5(b).

−1, 0, 1

The differential processing performed with the filter having the differential filter coefficients of the above sequence means applying:

a differential signal (In') of a pixel (n) in a horizontal line, a pixel value of a pixel (n−1) before (at the left of) the pixel (n) (in the present example, brightness)=(I(n−1)), and a pixel value of a pixel (n+1) after (at the right of) the pixel (n) (in the present example, brightness)=(I(n+1)), and calculating as follows.

$$In'=-(I(n-1))+(I(n+1))$$

As illustrated in FIGS. 5(a) to 5(c), the differential signal (HR) generated by the right image differentiating device 122 has a positive value in the region P in which the brightness change of (a) input right image signal (R1) is positive, and the differential signal (HR) generated by the right image differentiating device 122 has a negative value in the region Q in which the brightness change of (a) input right image signal (R1) is negative.

(c) Combined signal (parallax-adjusted right image signal (R2)) is a signal generated by the right image combining unit 124 of the right image transforming unit 120 as illustrated in FIG. 1. The right image combining unit 124 generates the combined signal (parallax-adjusted right image signal (R2)) by executing combining processing for adding (a) input right image signal (R1) and (b) right image differential signal (HR). As a result, the combined signal (parallax-adjusted right image signal (R2)) as illustrated in FIG. 5(c) is generated.

As can be understood from this figure, the brightness change portions P, Q of (a) input signal (R1) are phase-changed (shifted) in the left direction in (c) combined image signal (=parallax-adjusted right image signal (R2)). This is the effect caused by the combining (adding) processing of the differential signal to the input signal (R1).

In the explanation of FIGS. 5(a) to 5(c), an example is shown in which the processing of the right image non-linear transforming unit 123 as illustrated in FIG. 1 is omitted. However, when the processing of the right image non-linear transforming unit 123 is added, the amplitude of the differential signal of FIG. 5(b) is controlled (for example, suppressed).

In this case, (c) combined image signal (=parallax-adjusted right image signal (R2)), which is the result of the combining processing performed by the right image combining unit 124, is also a phase-changed (shifted) signal, i.e., in which the brightness change portion P, Q are moved to the left side, i.e., in the left direction, with respect to (a) input signal (R1), just like the one as illustrated in FIGS. 5(a) to 5(c).

As described above, the right image transforming unit 120 as illustrated in FIG. 1 generates and outputs the parallax-adjusted left image (R2) 50 in which the brightness change portion of the right image (R1) 20, i.e., the input image, is shifted in the left direction.

Subsequently, correspondence between the input image and the output image of the image processing apparatus 100 will be explained with reference to FIG. 6.

Figure 6:
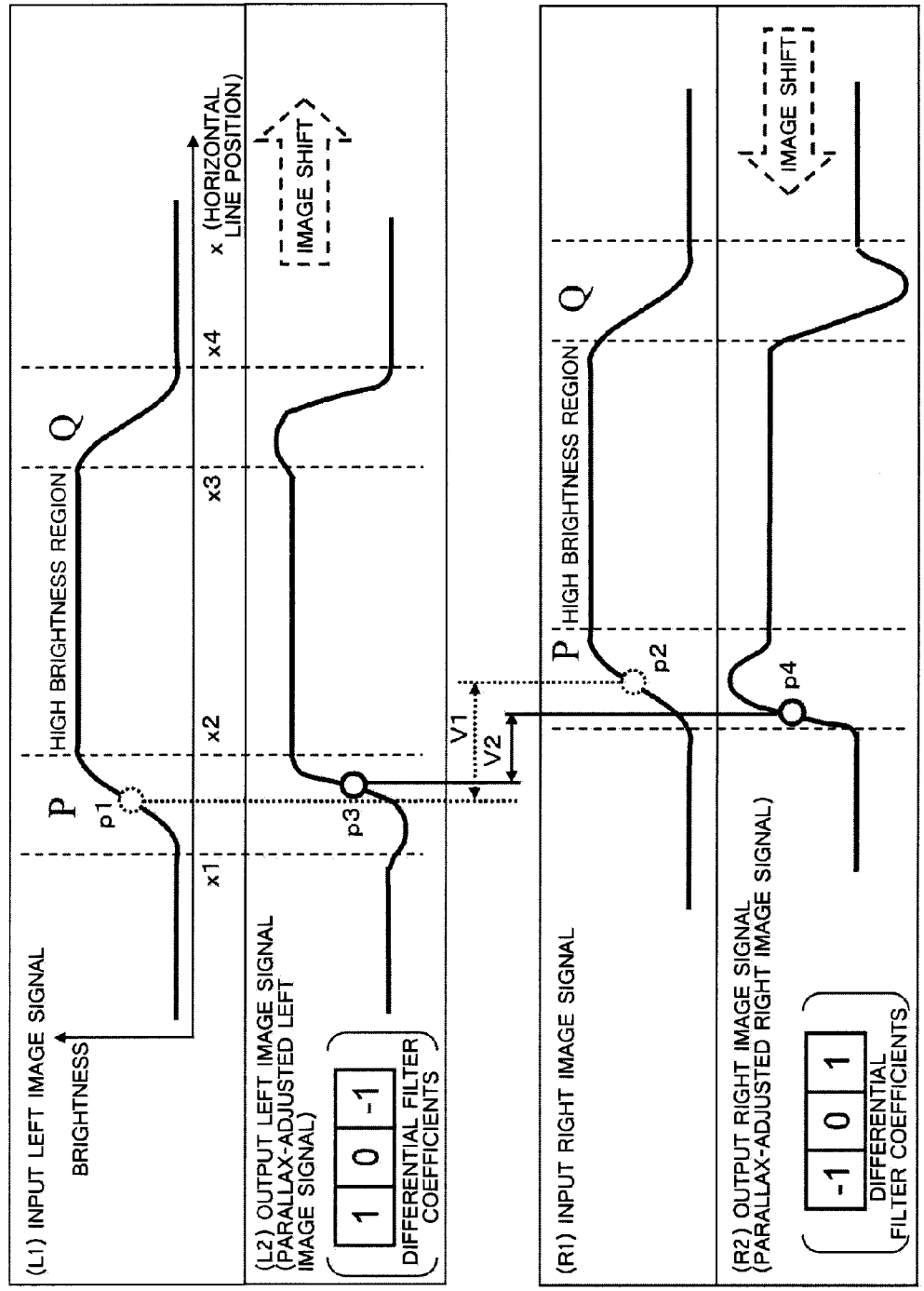
FIG. 6 is a figure explaining an example of image transform processing executed by the image processing apparatus according to the embodiment of the present invention.

The following signals patterns are shown from the top of FIG. 6.

(L1) input left image signal (L2) output left image signal (parallax-adjusted left image signal)

(R1) input right image signal (R2) output right image signal (parallax-adjusted left image signal)

These correspond to the signal patterns explained with reference to FIGS. 4(a) to 5(c).

The input image signal of the image processing apparatus 100 includes the following pair of image signals.

(L1) input left image signal (R1) input right image signal

These are signals for displaying a three-dimensional image, in which parallax is set in advance.

More specifically, for example, in FIG. 6, a displacement is set between a displace position of (L1) input left image signal and a display position of (R1) input right image signal in the central portion of the brightness change portion [P]. The parallax is generated by this displacement of the display positions.

In the explanation below, a distance on a display unit between the display position of a subject in a left image and the display position of the same subject in a right image is defined as "disparity".

The disparity between the input images (L1), (R1) in the central portion of the brightness change portion [P] is set as follows:

a point in (L1) input left image signal (p1), a point in (R1) input right image signal (p2), and a distance [V1] between these points.

In contrast, the disparity of the output images, i.e., parallax-adjusted image signals is as follows:

a point in (L2) output left image signal (parallax-adjusted left image signal) (p3), a point in (R2) output right image signal (parallax-adjusted left image signal) (p4), and a distance [V2] between these points is the disparity.

As described above, the disparities in the central portion of the brightness change portion [P] are as follows:

the disparity V1 of the pair of the input images, and the disparity V2 of the output images (parallax-adjusted image signals), which are different values.

In the present example, the following expression holds.

V2<V1

The disparity in the output images is reduced as compared with the disparity of the input images. With this reduction of the disparity, the parallax is suppressed.

This effect is obtained as an effect of phase change (shift) of each image.

The effect of the parallax adjusting process of the image processing apparatus according to the present embodiment 1 will be explained with reference to FIGS. 7(a) and 7(b). FIGS. 7(a) and 7(b) show the following figures.

(a) parallax range S1 of input image (b) parallax range S2 of parallax-adjusted image These two parallax ranges are shown. It should be noted that the left image and the right image (left eye image and right eye image) constituting the three-dimensional image includes subjects having various subject distances (distances from a camera), and various parallaxes according to the subject distances are set in the left image and the right image.

FIGS. 7(a) and 7(b) show a left eye 201 and a right eye 202 of the observer (user) and a display screen 210 of a display unit which is executing the three-dimensional image display process.

An image having various parallaxes according to the subject distances are presented on the display screen 210.

It should be noted that a retinal image difference indicating a positional displacement of images on retinas of the eyes, i.e., the left eye 201 and the right eye 202 of the observer (user) and a distance between the same subjects on the display screen are used as an index value of parallax. In this case, the distance of the same subjects on the display screen is defined as disparity, and disparities are compared. When the disparity is zero, the parallax is zero. This is a case where the display positions, on the display screen 210, of a subject in a left image observed with the left eye 201 of the observer (user) and a right image observed with the right eye 202 of the observer (user) are located at the same position.

More specifically, a point A 221 in the center of the display screen 210 of FIG. 7(a) is a subject A at which parallax=0 holds, i.e., a subject A at which disparity=0 holds. In this case, the user feels as if the subject A is located on the display screen 210.

It should be noted that [A left/right image] in the figure means that the display position, on the display screen 210, of the subject A in the left image for a three-dimensional image observed with the left eye 201 of the user is at the same position as the display position, on the display screen 210, of the subject A in the right image for a three-dimensional image observed with the right eye 202 of the user.

On the other hand, the display positions, on the display screen 210, of the following images as illustrated in FIG. 7(a) are different:

a left image B and a right image B, and a left image C and a right image C.

This means that the display position of the subjects B, C in the left image for a three-dimensional image observed with the left eye 201 of the user is at a position different from the display position of the subjects B, C in the right image for a three-dimensional image observed with the right eye 202 of the user.

In such case, the user feels as if the subjects B, C are located at positions different from the display screen 210.

More specifically, the subject B is observed as if the subject B is located at a point 222 in the space, which is a crossing point between a line connecting the left eye 201 of the observer and the display position of the left image B on the display screen 210 and a line connecting the right eye 202 of the observe and the display position of the right image B on the display screen 210.

On the other hand, the subject C is observed as if the subject C is located at a point 223 in the space, which is a crossing point between a line connecting the left eye 201 of the observer and the display position of the left image C on the display screen 210 and a line connecting the right eye 202 of the observe and the display position of the right image C on the display screen 210.

As described above, the position of the subject felt by the observer is set in accordance with the distance (disparity) of the same subject, on the display screen 210, between the left image and the right image. This will be explained using a disparity indicating a subject interval between the left image and the right image on the display screen 210.

The disparity of the subject A is zero.

The subject A in the left image and the subject A in the right image are displayed at the same position on the display screen 210, and therefore, the disparity is zero.

The position of the subject A realized by the observer is the position 221 on the display screen 210.

The disparity of the subject B is DB.

The distance, on the display screen 210, between the subject B in the left image and the subject B in the right image is DB, and therefore, the disparity is DB.

The position of the subject B realized by the observer is the position 222 which is farther from the observer than display screen 210.

The disparity of the subject C is DC.

It should be noted that DB<DC holds.

The distance, on the display screen 210, between the subject C in the left image and the subject C in the right image is DC, and therefore, the disparity is DC.

The position of the subject C realized by the observer is the position 223 which is farther from the observer than display screen 210 and is farther from the subject B.

When the subjects A, B, C are observed in the images, the parallax range observed by the observer is a width [S1] from the point A at the closest display screen position to the point of the subject C which is the farthest in the image.

FIG. 7(b) illustrates an observation state of an image displayed using images converted by the image processing apparatus 100 as illustrated in FIG. 1, i.e., the parallax-adjusted left image (L2) 50 and the parallax-adjusted right image (R2) 60, for example.

The subjects A2, B2, C2 are the same subjects as A, B, C of FIG. 7(a), but as a result of the transform processing described above, image shift occurs based on the phase change of the image signals, whereby the subject positions observed by the observer are changed.

The disparity of the subject A2 is 0.

The subject A2 in the left image and the subject A2 in the right image are displayed at the same position on the display screen 210, and therefore, the disparity is zero.

The position of the subject A2 realized by the observer is a position 231 on the display screen 210.

The disparity of the subject 32 is DB2.

The distance, on the display screen 210, between the subject B2 in the left image and the subject B2 in the right image is DB2, and therefore, the disparity is DB2.

The position of the subject B realized by the observer is a position 232 which is farther from the observer than display screen 210.

However, the position of the subject B2 realized by the observer is set at a position closer to the observer (closer to the display screen 210) than subject position B in the input image before the conversion as illustrated in FIG. 7(a). This is a result of the above shift processing of the images.

The disparity of the subject C2 is DC2.

It should be noted that DB2<DC2 holds.

The distance, on the display screen 210, between the subject C2 in the left image and the subject C2 in the right image is DC2, and therefore, the disparity is DC2.

The position of the subject C2 realized by the observer is a position 233 which is farther from the observer than display screen 210 and is farther from the subject B2.

However, the position of the subject C2 realized by the observer is set at a position closer to the observer (closer to the display screen 210) than subject position C in the input image before the conversion as illustrated in FIG. 7(a). This is a result of the above shift processing of the images.

As a result of the image transform processing of the image processing apparatus 100, for example, the left image position of the point B slightly moves in the right direction, and the right image position of the point B slightly moves in the left direction, so that the disparity is reduced. In other words, the disparity decreases from DB to DB2.

The left image position of the point C, which is located at a further deeper position, greatly moves in the right direction, and the right image position of the point C greatly moves in the left direction, so that the disparity is further reduced.

The disparity decreases from DC to DC2.

It should be noted that the following inequality holds.

$$(DC-DC2)>(DB-DB2)$$

This means that the reduction width of the disparity is greater for the deeper subject.

As a result, as can be understood by comparing the parallax ranges S1, S2 of FIGS. 7(a) and 7(b), The parallax range S1 (A to C) of the input image before the conversion change to the parallax range S2 (A2 to C2) of the output image (parallax-adjusted image) after the conversion.

In other words, in this example, the parallax range S2 (A2 to C2) of the output image (parallax-adjusted image) is reduced as compared with the parallax range S1 (A to C) of the input image.

The parallax suppressing effect explained with reference to FIGS. 7(a) and 7(b) is the effect that is provided as a result of the image shift explained previously with reference to FIGS. 4(a) to 4(c) and 5(a) to 5(c).

In other words, the left image differential processing unit 113 performs differential calculation using the coefficients as illustrated in FIG. 4(b), and the differential signal is added to the left image, or the differential signal is added to the left image after the non-linear processing, whereby an image of a subject away from the focal position is displaced in the right direction with respect to the input image.

On the other hand, the 1 right image differential processing unit 123 performs differential calculation using the coefficients as illustrated in FIG. 5(b), and the differential signal is added to the right image, or the differential signal is added to the right image after the non-linear processing, whereby an image of a subject away from the focal position is displaced in the left direction with respect to the input image.

As a result, the disparity between the left image and the right image is less than that of the input image, and the parallax range can be reduced, e.g., from the parallax range S1 of FIG. 7(a) to the parallax range S2 as illustrated in FIG. 7(b).

In the image transform processing executed by the image processing apparatus 100 as illustrated in FIG. 1, the change of the disparity is the least at a pixel position in focus (for example, a subject closest to the observer) in the image serving as the conversion target image, and the farther a point is away from the focal position, the greater the change of the disparity becomes.

In the example as illustrated in FIGS. 7(a) and 7(b), the point A which is the closest to the observer is in focus, and there is hardly any change of the disparity at the point A (which will be referred to as DA). In the image, it is considered that, as a subject moves to a deeper side (to A, B, and then to C), the subject moves away from the focal point, and this increases blur.

In this case,

The disparities of the subjects A, B, and C before the image conversion are denoted as DA, DB, and DC, respectively, and The disparities of the subjects A, B, and C after the image conversion are denoted as DA2, DB2, and DC2, respectively.

Then, the change widths of the disparities are set as follows.

$$(DC2-DC) > (DB2-DB) > (DA2-DA) \approx 0$$

The non-linear transforming units 113, 123 as illustrated in FIG. 1 use, for example, the non-linear transform processing described above with reference to FIG. 3 to perform processing of raising the low-frequency region of the differential signal. With this processing, for example, processing can be performed to raise the level of the differential signal in a blur region (low-frequency region) which is out of focus. With this processing, the processing explained with reference to FIGS. 7(a) and 7(b) is enabled, i.e., control can be performed such that, the change of the disparity is reduced to the minimum at a pixel position in focus (for example, a subject closest to the observer), and as a subject moves away from the focal position, the change of the disparity is increased.

A specific example of correspondence between the input signal to the image processing apparatus 100, the differential signal, and the output signal will be explained with reference to FIGS. 8 to 11.

FIGS. 8 to 11 illustrate lines of the input signal, the differential signal, and the output signal. Each line corresponds to a portion of a horizontal line of an image signal. The vertical axis denotes brightness, and the horizontal axis denotes a pixel position in the horizontal direction.

The input signal is a line representing the brightness of a horizontal line constituting the left image (L1) 10 or the right image (R1) 20 which are input to the image processing apparatus 100.

The differential signal is a signal generated by the differential processing performed by the differentiating device (the left image differentiating device 112 or the right image differentiating device 122) of the image processing apparatus 100.

The output signal is a signal generated by combining processing performed by the combining unit (the left image combining unit 114 or the right image combining unit 124) of the image processing apparatus 100.

The signals indicated in FIGS. 8 to 11 correspond to the following processing examples.

Figure 8:
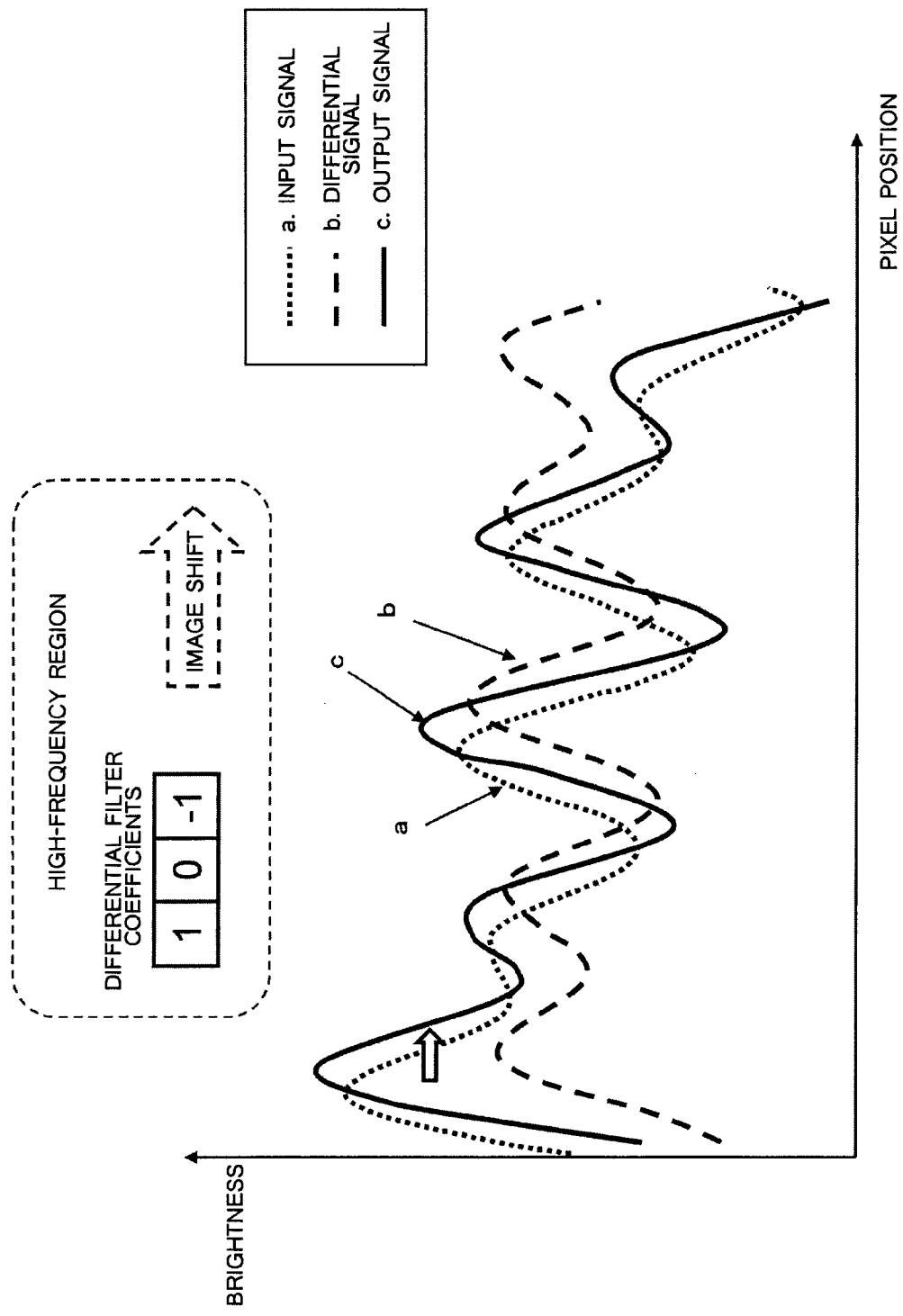
FIG. 8 is a figure explaining an example of correspondence of signal patterns in image transform processing executed by the image processing apparatus according to the embodiment of the present invention.

(1) FIG. 8: processing example where differential (in the present embodiment, the left image differentiating device 112) processing is applied to a high-frequency region constituting an image with differential filter coefficients [1, 0, −1] (right direction shift)

Figure 9:
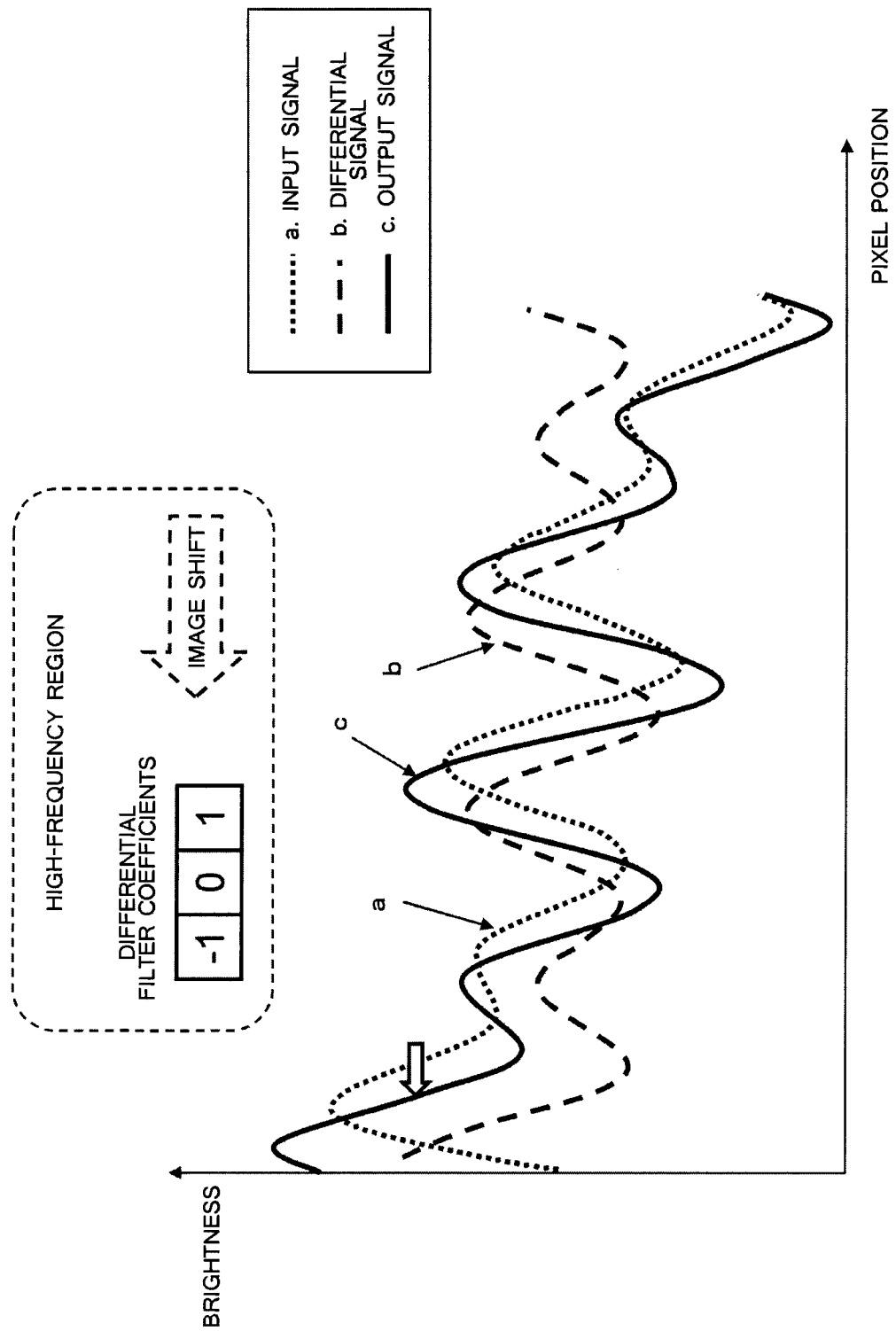
FIG. 9 is a figure explaining an example of correspondence of signal patterns in image transform processing executed by the image processing apparatus according to the embodiment of the present invention.
Figure 10:
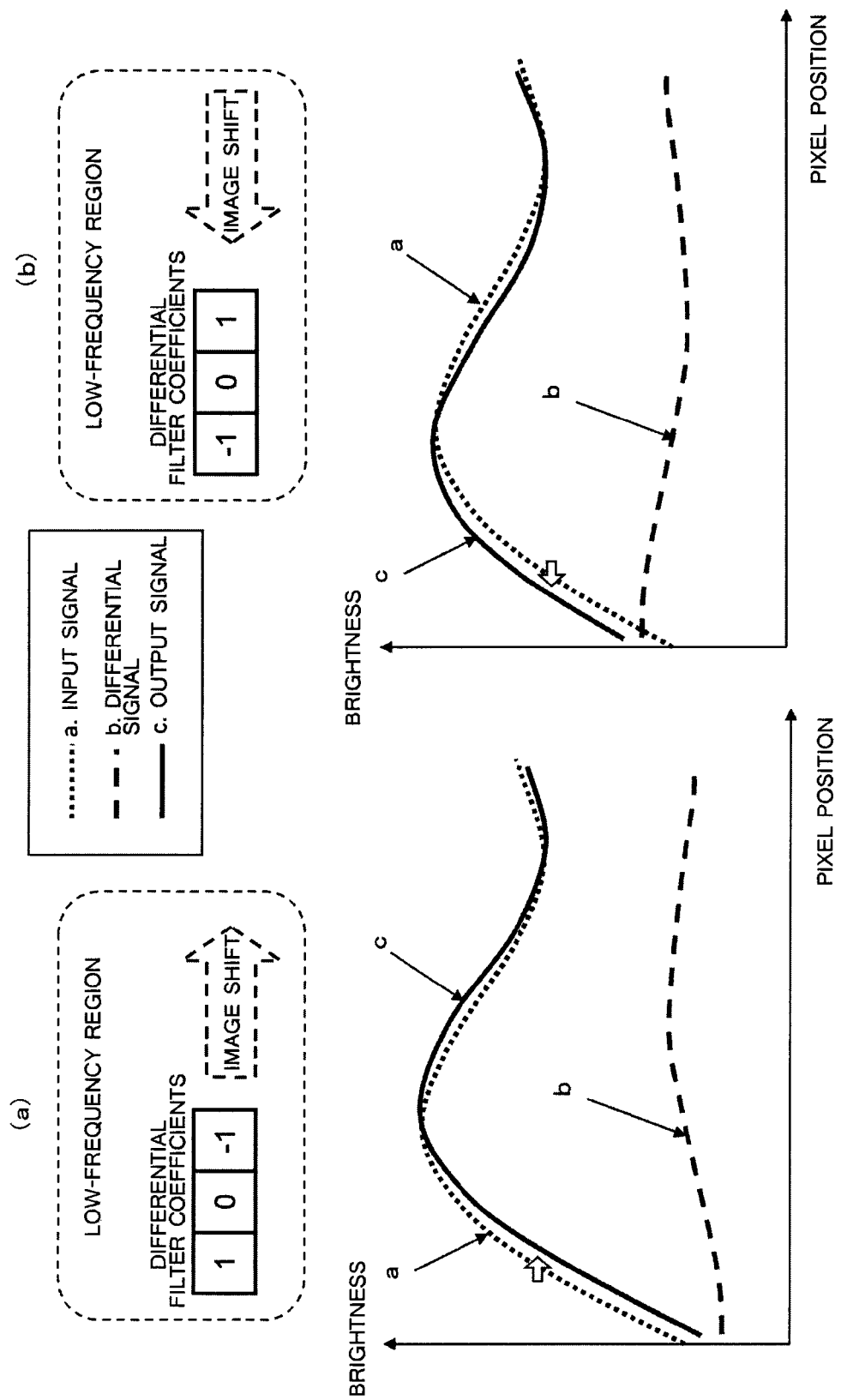
FIGS. 10($a$) and 10($b$) are figures explaining an example of correspondence of signal patterns in image transform processing executed by the image processing apparatus according to the embodiment of the present invention.
Figure 11:
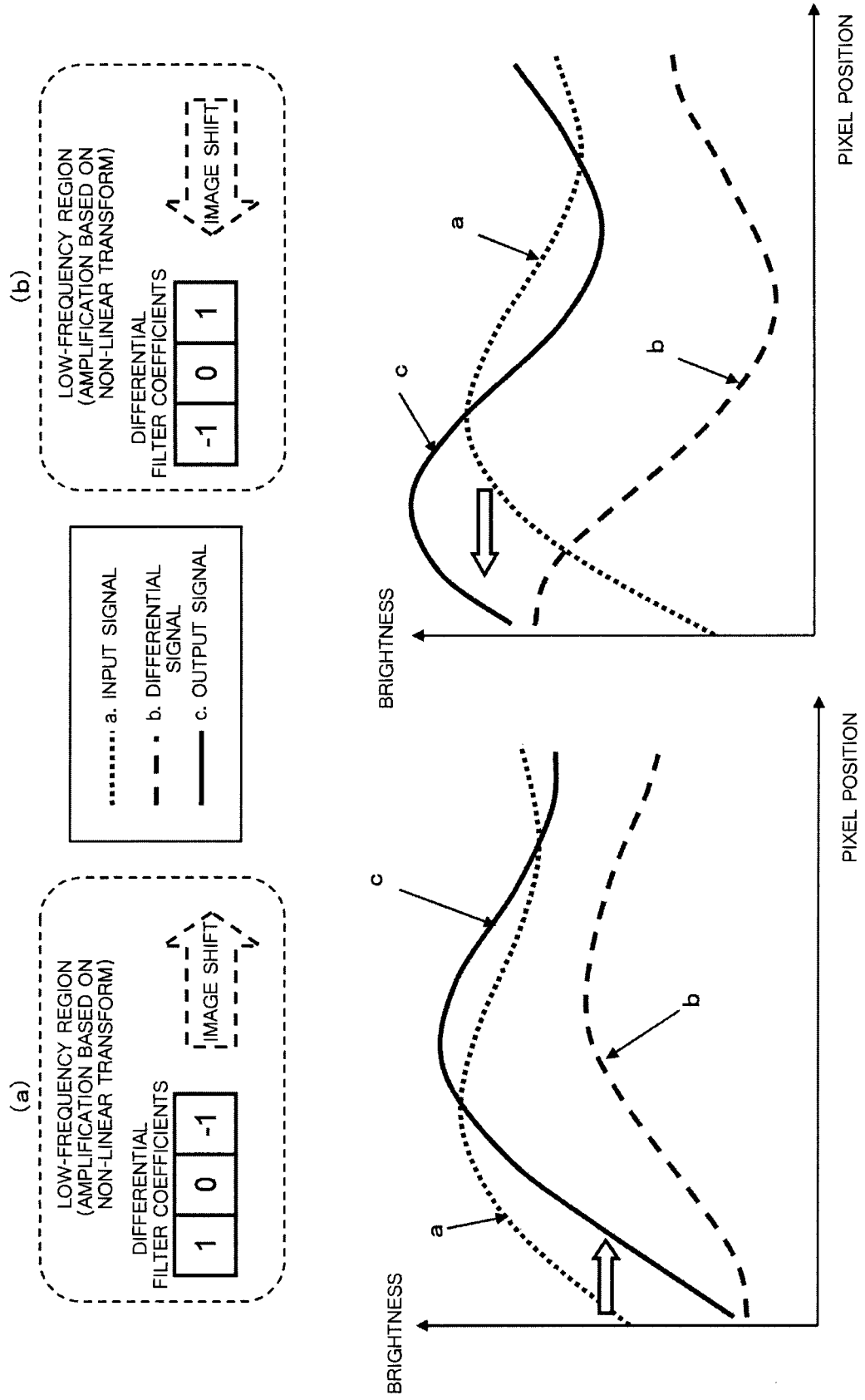
FIGS. 11($a$) and 11($b$) are figures explaining an example of correspondence of signal patterns in image transform processing executed by the image processing apparatus according to the embodiment of the present invention.

(2) FIG. 9: processing example where differential (in the present embodiment, the right image differentiating device 122) processing is applied to a high-frequency region constituting an image with differential filter coefficients [−1, 0, 1] (left direction shift)

(3a) FIG. 10(a): processing example where differential (in the present embodiment, the left image differentiating device 112) processing is applied to a low-frequency region constituting an image with differential filter coefficients [1, 0, −1] (right direction shift)

(3b) FIG. 10(b): processing example where differential (in the present embodiment, the right image differentiating device 122) processing is applied to a low-frequency region constituting an image with differential filter coefficients [−1, 0, 1] (left direction shift)

(4a) FIG. 11(a): processing example where differential (in the present embodiment, the left image differentiating device 112) processing is applied to a low-frequency region constituting an image with differential filter coefficients [1, 0, −1], and further, the differential signal is amplified using non-linear transform (right direction shift)

(4b) FIG. 11(b): processing example where differential (in the present embodiment, the right image differentiating device 122) processing is applied to a low-frequency region constituting an image with differential filter coefficients [−1, 0, 1], and further, the differential signal is amplified using non-linear transform (left direction shift)

FIG. 8 illustrates processing example where differential (in the present embodiment, the left image differentiating device 112) processing is applied to a high-frequency region constituting an image with differential filter coefficients [1, 0, −1].

A differential signal (b) is generated by differential processing performed on the input signal (a), and an output signal (c) is generated by combining processing of the input signal and the differential signal.

As can be understood from the figure, the output signal (c) is shifted in the right direction with respect to the input signal (a).

FIG. 9 is processing example where differential (in the present embodiment, the right image differentiating device 122) processing is applied to a high-frequency region constituting an image with differential filter coefficients [−1, 0, 1].

A differential signal (b) is generated by differential processing performed on the input signal (a), and an output signal (c) is generated by combining processing of the input signal and the differential signal.

As can be understood from the figure, the output signal (c) is shifted in the left direction with respect to the input signal (a).

FIG. 10(a) is processing example where differential (in the present embodiment, the left image differentiating device 112) processing is applied to a low-frequency region constituting an image with differential filter coefficients [1, 0, −1].

As can be understood from the figure, the output signal (c) is shifted in the right direction with respect to the input signal (a).

FIG. 10(b) is processing example where differential (in the present embodiment, the right image differentiating device 122) processing is applied to a low-frequency region constituting an image with differential filter coefficients [−1, 0, 1].

As can be understood from the figure, the output signal (c) is shifted in the left direction with respect to the input signal (a).

FIG. 11(a) is processing example where differential (in the present embodiment, the left image differentiating device 112) processing is applied to a low-frequency region constituting an image with differential filter coefficients [1, 0, −1], and further, the differential signal is amplified using non-linear transform.

As can be understood from the figure, the output signal (c) is shifted in the right direction with respect to the input signal (a).

FIG. 11(b) is processing example where differential (in the present embodiment, the right image differentiating device 122) processing is applied to a low-frequency region constituting an image with differential filter coefficients [−1, 0, 1], and further, the differential signal is amplified using non-linear transform.

As can be understood from the figure, the output signal (c) is shifted in the left direction with respect to the input signal (a).

The non-linear transforming units 113, 123 as illustrated in FIG. 1 use, for example, the non-linear transform processing described above with reference to FIG. 3 to perform processing of raising the low-frequency region of the differential signal. With this processing, for example, processing can be performed to raise the level of the differential signal in an out-of-focus low-frequency region. With this processing, for example, processing can be performed to increase the amount of shift (the amount of change of phase) in the low-frequency region.

More specifically, in accordance with the setting for the aspect of the transform processing performed by the non-linear transforming units 113, 123, control can be achieved to increase or decrease the different in the amount of shift between the low-frequency region and the high-frequency region.

[B. Embodiment 2: Example of Enlarging Processing of Parallax Range Set at a Deeper Side with Respect to a Display Surface of a Display Unit]

Subsequently, an embodiment 2 of an image processing apparatus according to the present invention will be explained.

The image processing apparatus according to the embodiment 2 has the same configuration as the image processing apparatus 100 as illustrated in FIG. 1 explained in the embodiment 1.

However, the embodiment 2 has such configuration that the differential filter applied by the left image differentiating device 112 of the left image transforming unit 110 and the differential filter applied by the right image differentiating device 122 of the right image transforming unit 120 are interchanged as compared with the case of the embodiment 1.

As a result of this change of the differential filters, the image shift directions of the left image and the right image are opposite directions. As a result, although the reducing processing of the parallax range is performed in the embodiment 1, processing to enlarge the parallax range is performed in the present embodiment.

Figure 12:
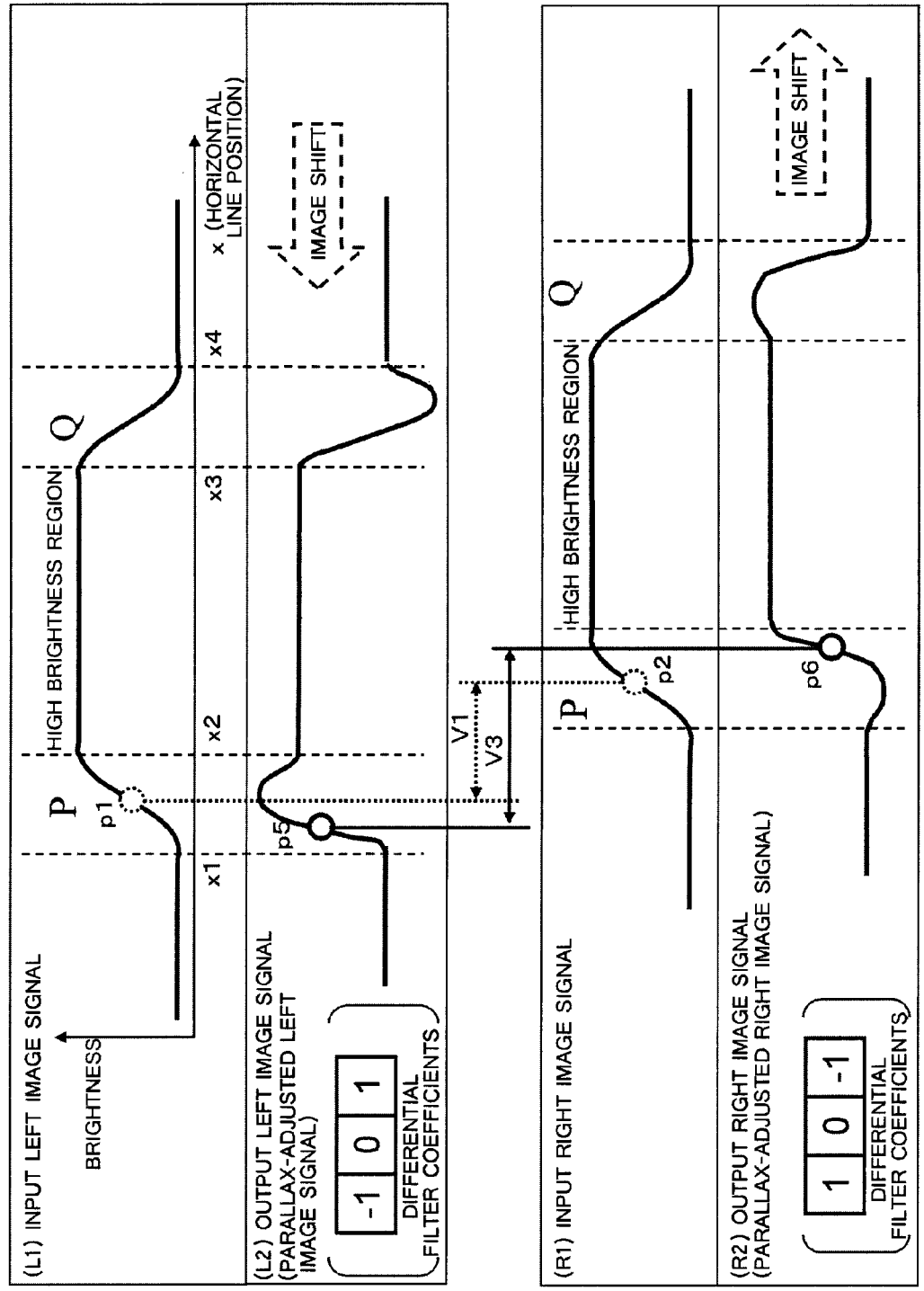
FIG. 12 is a figure explaining an example of image transform processing executed by the image processing apparatus according to the embodiment of the present invention.

Correspondence between the input image and the output image of the image processing apparatus 100 according to the present embodiment will be explained with reference to FIG. 12. FIG. 12 is the same figure as FIG. 6 explained in the embodiment 1. The following signal patterns are shown from the top of FIG. 12.

(L1) input left image signal
(L2) output left image signal (parallax-adjusted left image signal)
(R1) input right image signal
(R2) output right image signal (parallax-adjusted left image signal)

The input image signal of the image processing apparatus 100 includes the following pair of image signals.

(L1) input left image signal
(R1) input right image signal

These are signals for displaying a three-dimensional image, in which parallax is set in advance.

More specifically, for example, in FIG. 12, a displacement (disparity) is set between a displace position of (L1) input left image signal and a display position of (R1) input right image signal in the central portion of a brightness change portion [P]. The parallax is generated by this displacement of the display positions.

The disparity between the input images (L1), (R1) in the central portion of the brightness change portion [P] is set as follows:
  a point in (L1) input left image signal (p1),
  a point in (R1) input right image signal (p2), and
  a distance [V1] between these points.

In contrast, the disparity of the output images, i.e., parallax-adjusted image signals is as follows:
  a point in (L2) output left image signal (parallax-adjusted left image signal) (p5),
  a point in (R2) output right image signal (parallax-adjusted left image signal) (p6), and
  a distance [V3] between these points is the disparity.

In the present embodiment, the differential filter applied by the left image differentiating device 112 of the left image transforming unit 110 make a differential filter having differential filter coefficients of the following sequence as illustrated in FIG. 12 (L2).

−1, 0, 1

More specifically, in the embodiment 1 described above, it is the differential filter suitable for the right image differentiating device 122 of the right image transforming unit 120.

The differential processing performed with the filter having the differential filter coefficients of the above sequence means applying:
  differential data (In') of a pixel (n) in a horizontal line,
  a pixel value of a pixel (n−1) before (at the left of) the pixel (n) (in the present example, brightness)=(I(n−1)), and
  a pixel value of a pixel (n+1) after (at the right of) the pixel (n) (in the present example, brightness)=(I(n+1)),
  and calculating as follows.

$$In' = -(I(n-1)) + (I(n+1))$$

This differential signal is the same signal as the differential signal explained with reference to FIG. 5(b) in the embodiment 1. As a result, this combining (adding) processing result of the differential signal and the original input signal is the output left image signal (parallax-adjusted left image (L2)) as illustrated in FIG. 12 (L2) obtained by shifting the brightness change portions P, Q of (L1) input signal of FIG. 12 in the left direction.

On the other hand, the differential filter applied by the right image differentiating device 122 of the right image transforming unit 120 make a differential filter having differential filter coefficients of the following sequence as illustrated in FIG. 12(b) (R2).

1, 0, −1

It is the differential filter suitable having the differential filter coefficients of the above sequence.

More specifically, in the embodiment 1 described above, it is the differential filter suitable for the left image differentiating device 112 of the left image transforming unit 110.

The differential processing performed with the filter having the differential filter coefficients of the above sequence means applying:

differential data (In') of a pixel (n) in a horizontal line, a pixel value of a pixel (n−1) before (at the left of) the pixel (n) (in the present example, brightness)=(I(n−1)), and a pixel value of a pixel (n+1) after (at the right of) the pixel (n) (in the present example, brightness)=(I(n+1)), and calculating as follows.

$$In'=(I(n-1))-(I(n+1))$$

Figure 4:
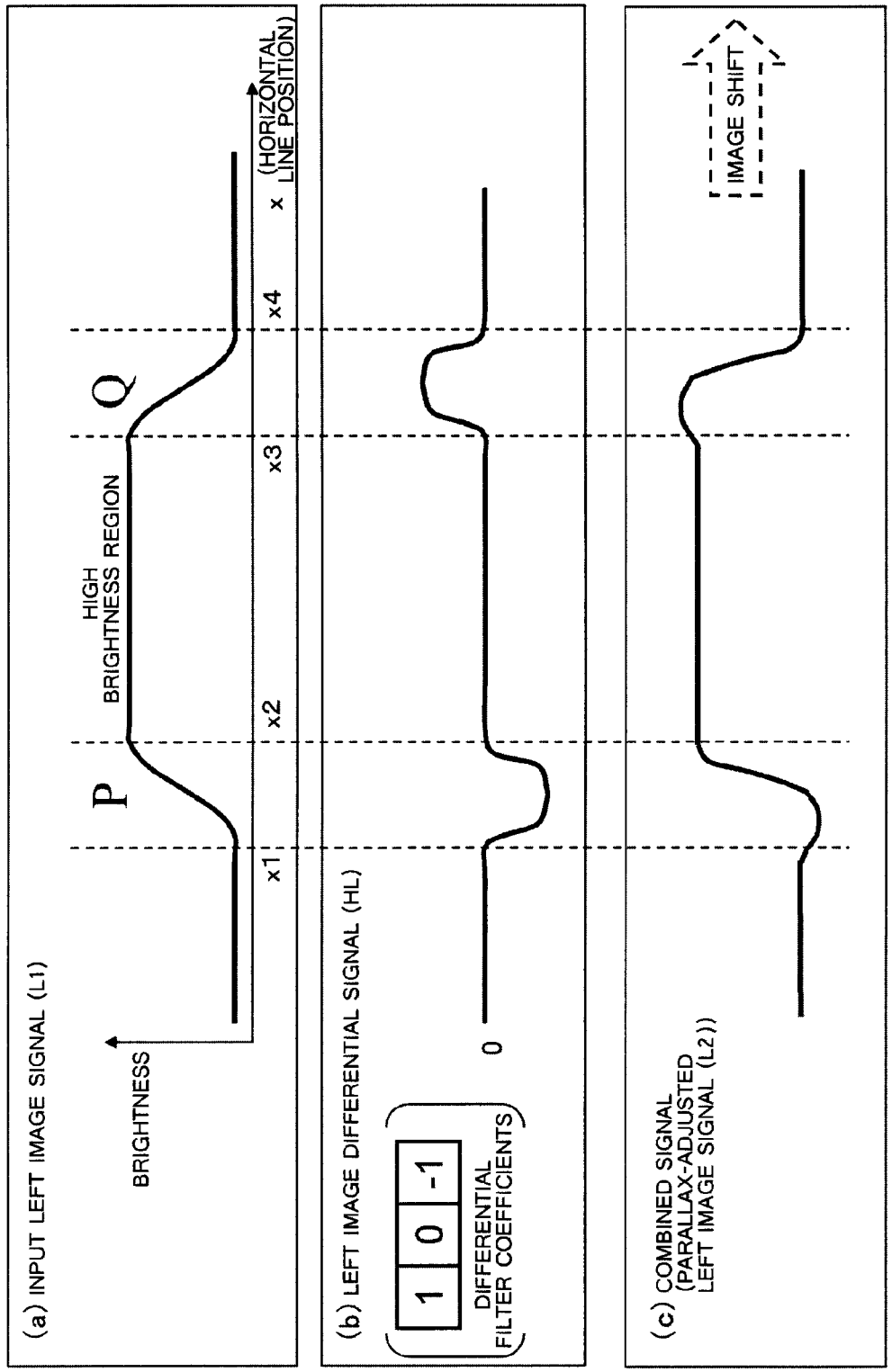
FIGS. 4($a$) to 4($c$) are figures explaining an example of processing performed by a left image transforming unit of the image processing apparatus according to the embodiment of the present invention.

This differential signal is the same signal as the differential signal explained with reference to FIG. 4(*b*) in the embodiment 1. As a result, this combining (adding) processing result of the differential signal and the original input signal is the output right image signal (parallax-adjusted left image (R2)) as illustrated in FIG. 12 (R2) obtained by shifting the brightness change portions P, Q of (R1) input signal of FIG. 12 in the right direction.

Although the non-linear transform processing is omitted in the explanation, the shift direction is set in the same manner even when the non-linear transform processing is performed.

In the embodiment 2, as described above, processing is performed while the differential filters applied by the differentiating devices for the left and right images according to the embodiment 1 are interchanged, so that the embodiment 2 is configured such that the shift directions of the left image and the right image are the opposite directions.

As a result, as illustrated in FIG. 12, the disparities in the central portion of the brightness change portion [P] are as follows.

The disparity V1 of the pair of input images, and

The disparity V3 of the output images (parallax-adjusted image signals), which are different values.

In the present example, $$V1<V3$$

holds, and the disparity V3 in the output images is increased as compared with the disparity V1 of the input images. With this increase of the disparity, the parallax is amplified.

This effect is obtained as an effect of shift of each image.

Figure 13:
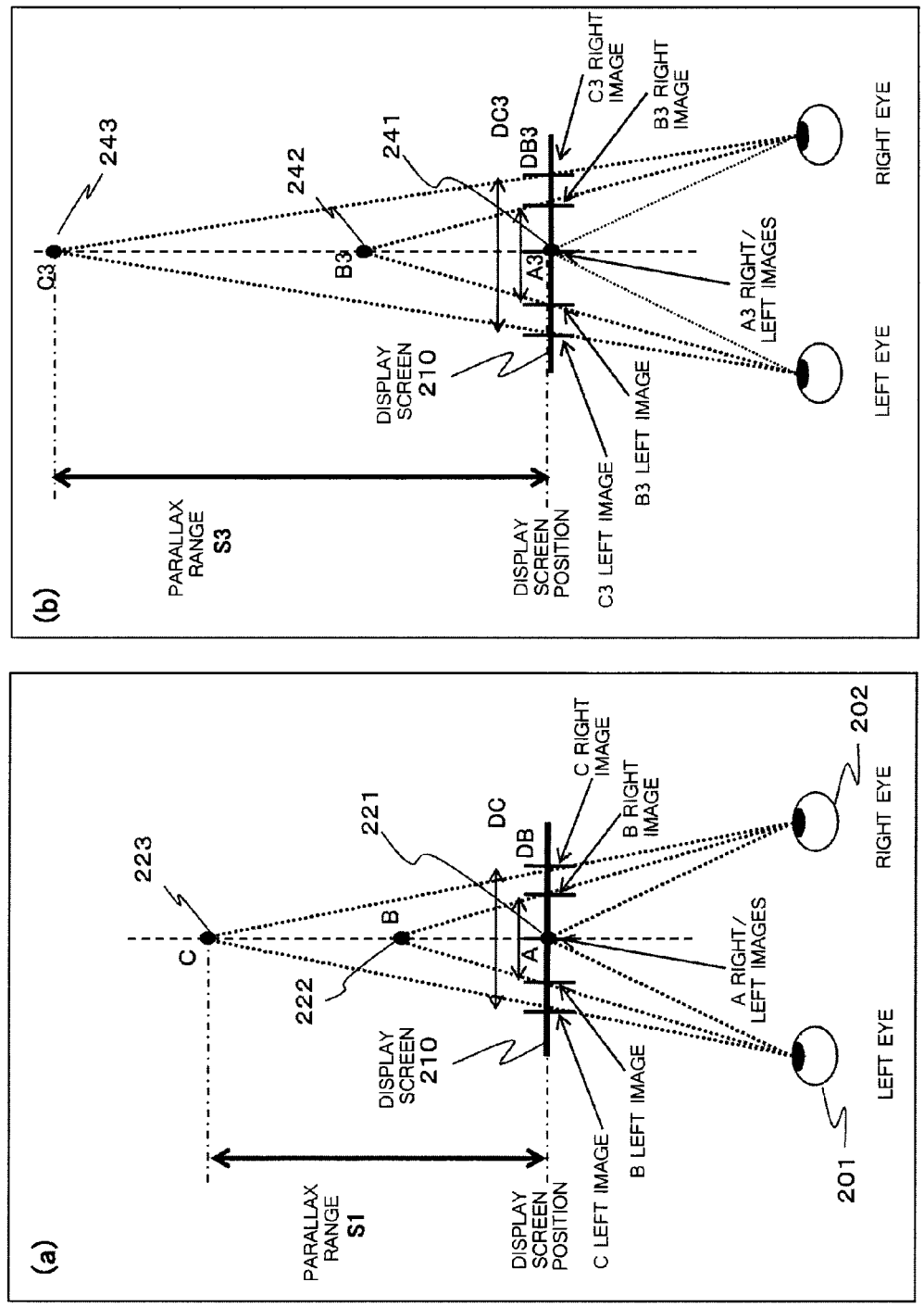
FIGS. 13($a$) and 13($b$) are figures explaining a specific example of control processing achieved with image transform processing executed by an image processing apparatus according to an embodiment 2 of the present invention.

The effect of the parallax adjusting process of the image processing apparatus according to the present embodiment 2 will be explained with reference to FIGS. 13(*a*) and 13(*b*). FIGS. 13(*a*) and 13(*b*) show the following figures.

Figure 7:
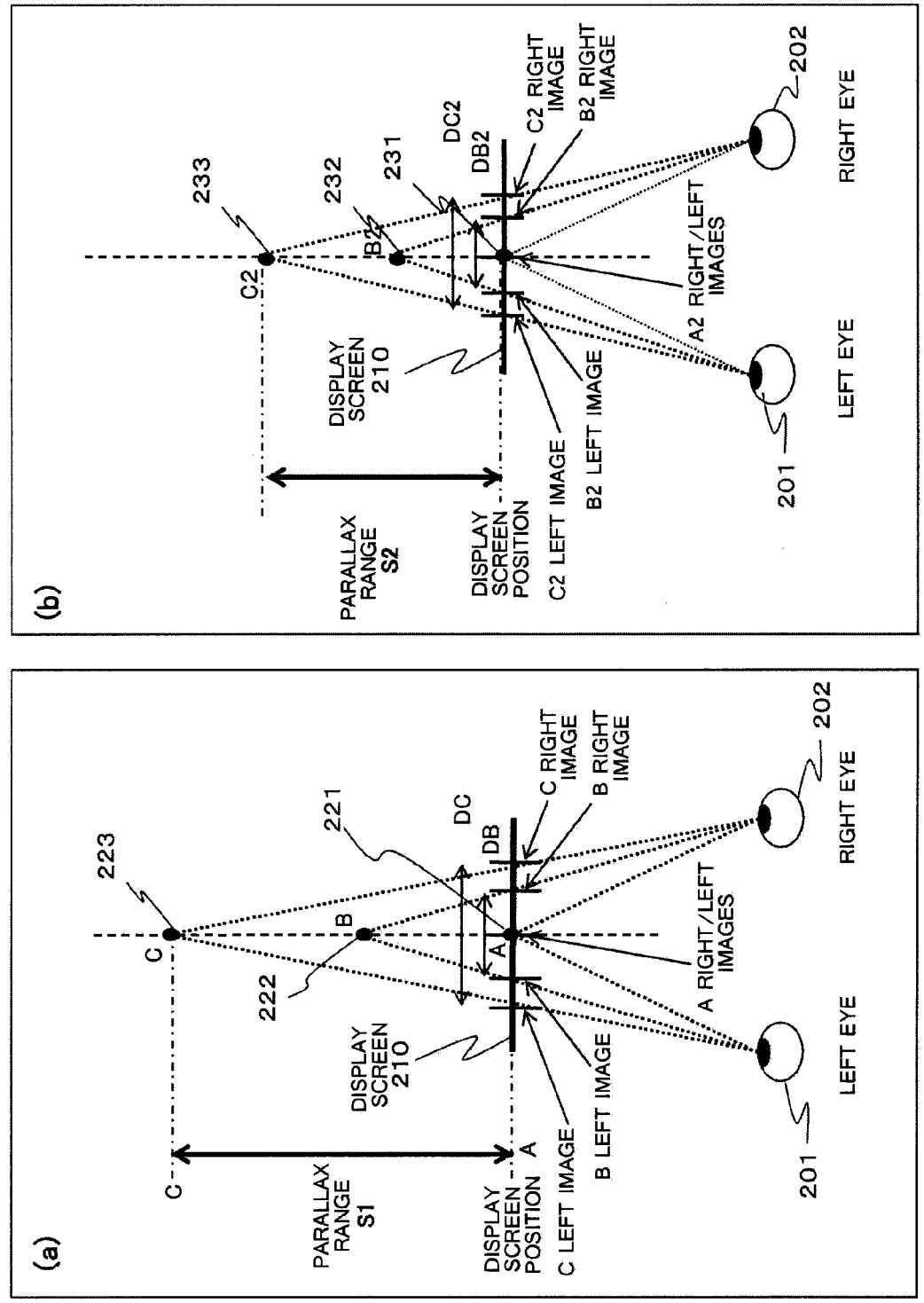
FIGS. 7($a$) and 7($b$) are figures explaining illustrating a specific example of control processing of image transform processing executed by an image processing apparatus according to an embodiment 1 of the present invention.

(a) parallax range S1 of input image (b) parallax range S3 of parallax-adjusted image Like FIGS. 7(*a*) and 7(*b*) of the embodiment 1 described above, FIGS. 13(*a*) and 13(*b*) show a left eye 201 and a right eye 202 of the observer (user) and a display screen 210 of a display unit which is executing the three-dimensional image display process.

An image having various parallaxes according to the subject distances are presented on the display screen 210.

In this explanation, disparity which is a distance of the same subjects on the display screen is used as an index value of parallax.

FIG. 13(*a*) is a figure corresponding to an input image before the parallax-adjusting process, and is the same figure as FIG. 7(*a*). In FIG. 13(*a*), The disparity of the subject A is zero, The disparity of the subject B is DB, and The disparity of the subject C is DC.

The following expression holds.

$$0<DB<DC$$

The observation position of the subject A realized by the user is on the display. The observation position of the subject B realized by the user is deeper than display (farther from the observer). The observation position of the subject C realized by the user is at a position still farther than that of the subject B.

The parallax range observed by the observer is a width [S1] from the point A at the closest display screen position to the point C which is the farthest subject observation position.

FIG. 13(*b*) illustrates an observation state of an image displayed using images converted by the image processing apparatus 100 as illustrated in FIG. 1 according to the present embodiment 2, i.e., the parallax-adjusted left image (L2) 50 and the parallax-adjusted right image (R2) 60, for example.

The subjects A3, B3, C3 are the same subjects as A, B, C of FIG. 13(*a*), but with the transform processing described above, image shift is executed, whereby the subject positions observed by the observer are changed.

The disparity of the subject A3 is 0.

The subject A3 in the left image and the subject A3 in the right image are displayed at the same position on the display screen 210, and therefore, the disparity is zero.

The position of the subject A3 realized by the observer is a position 241 on the display screen 210.

The disparity of the subject B3 is DB3.

The distance, on the display screen 210, between the subject B3 in the left image and the subject B3 in the right image is DB3, and therefore, the disparity is DB3.

The position of the subject B3 realized by the observer is a position 242 which is farther from the observer than display screen 210.

However, the position of the subject B3 realized by the observer is set at a position farther from the observer (farther from the display screen 210) than subject position B in the input image before the conversion as illustrated in FIG. 13(*a*). This is a result of the above shift processing of the images.

The disparity of the subject C3 is DC3.

It should be noted that DB3<DC3 holds.

The distance, on the display screen 210, between the subject C3 in the left image and the subject C3 in the right image is DC3, and therefore, the disparity is DC3.

The position of the subject C3 realized by the observer is a position 243 which is farther from the observer than display screen 210 and is farther from the subject B2.

However, the position of the subject C3 realized by the observer is set at a position farther from the observer (farther from the display screen 210) than subject position C in the input image before the conversion as illustrated in FIG. 13(*a*). This is a result of the above shift processing of the images.

In the present embodiment 2, the image transform processing is performed by the image processing apparatus 100 so that the image shift is executed in the direction opposite to that of the embodiment 1 described above.

More specifically, the left image position of the point B slightly moves in the left direction, and the right image position thereof slightly moves in the right direction, so that the disparity is increased. In other words, the disparity increases from DB to DB3.

The left image position of the point C, which is located still deeper, greatly moves in the left direction, and the right image position thereof greatly moves in the right direction, so that the disparity is further increased. In other words, the disparity increases from DC to DC3.

It should be noted that the following expression holds.

$$(DC3-DC)>(DB3-DB)$$

This means that the enlargement width is larger for the disparity of the deeper subject.

As a result, as can be understood by comparing the parallax ranges S1, S3 of FIGS. 13(a) and 13(b), The parallax range S1 (A to C) of the input image before the conversion change to the parallax range S3 (A3 to C3) of the output image (parallax-adjusted image) after the conversion.

In other words, in this example, the parallax range S3 (A3 to C3) of the output image (parallax-adjusted image) is enlarged as compared with the parallax range S1 (A to C) of the input image.

The parallax enlarging effect explained with reference to FIGS. 13(a) and 13(b) is the effect that is provided as a result of the image shift explained previously with reference to FIG. 12.

In other words, the left image differential processing unit 113 performs differential calculation using the coefficients as illustrated in FIG. 12 (L2), and the differential signal is added to the left image, or the differential signal is added to the left image after the non-linear processing, whereby an image of a subject away from the focal position is displaced in the left direction with respect to the input image.

On the other hand, the right image differential processing unit 123 performs differential calculation using the coefficients as illustrated in FIG. 12 (R2), and the differential signal is added to the right image, or the differential signal is added to the right image after the non-linear processing, whereby an image of a subject away from the focal position is displaced in the right direction with respect to the input image.

As a result, the disparity between the left image and the right image is more than that of the input image, and the parallax range can be enlarged, e.g., from the parallax range S1 of FIG. 13(a) to the parallax range S3 as illustrated FIG. 13(b).

In the image transform processing executed by the image processing apparatus 100, as described above, the change of the disparity is the least at a pixel position in focus (for example, a subject closest to the observer) in the image serving as the conversion target image, and the farther a point is away from the focal position, the greater the change of the disparity becomes.

In the situation as illustrated in FIG. 13, the point A at the closest position is in focus, and the disparity of the point A hardly changes in view of the fact that the subject at a deeper position has greater subject blur.

When the point A at the closest position is in focus, it is considered that, in the image, as a subject moves to a deeper side (to A, B, and then to C), the subject moves away from the focal point, and this increases blur.

In this case,

The disparities of the subjects A, B, and C before the image conversion are denoted as DA, DB, and DC, respectively, and The disparities of the subjects A, B, and C after the image conversion are denoted as DA3, DB3, and DC3, respectively.

Then, the change widths of the disparities are set as follows.

$$(DC3-DC)>(DB3-DB)>(DA3-DA)\approx 0$$

[C. Embodiment 3: Example of Control (Reducing/Enlarging) Processing of Parallax Range Set at a Closer Side with Respect to a Display Surface of a Display Unit]

In the embodiment 1 and the embodiment 2, the example of processing where the image for three-dimensional display which is input to the image processing apparatus is an image in which parallax setting of the left image (L1) 10 and the right image (R1) 20 is set at a deeper side of the display surface of the display unit, i.e., an image in which the parallax setting of the left image (L1) 10 and the right image (R1) 20 is set at a farther position from the observer has been explained. In other words, In the embodiment 1, the example of processing for reduction of the parallax range set at a deeper side of the display surface of the display unit has been explained.

In the embodiment 2, the example of processing for enlarging of the parallax range set at a deeper side of the display surface of the display unit has been explained.

However, images applied to display of three-dimensional images are not limited to the images explained in the embodiments 1, 2. There is an image in which parallax is set so that a subject protrudes to a closer side of the display surface of the display unit, i.e., to a position closer to the observer.

Hereinafter, an example of processing where an input image subjected to parallax control is a three-dimensional image in which an observation position of a subject is set at a closer side (in an observer direction) with respect to the display surface will be explained as the embodiment 3.

In the embodiment 3(a), an example of processing for reduction of a parallax range set at a side closer than display surface of the display unit will be explained.

In the embodiment 3(b), an example of processing for enlarging of a parallax range set at a side closer than display surface of the display unit will be explained.

These examples of processing will be explained in order.

It should be noted that the present embodiment 3 is achieved using the same configuration as the image processing apparatus 100 as illustrated in FIG. 1 explained in the embodiment 1.

(a) Example of processing for reduction of a parallax range set at a side closer than display surface of the display unit First, the example of processing for reduction of a parallax range set at a side closer than display surface of the display unit will be explained with reference to FIGS. 14(a) and 14(b).

Figure 14:
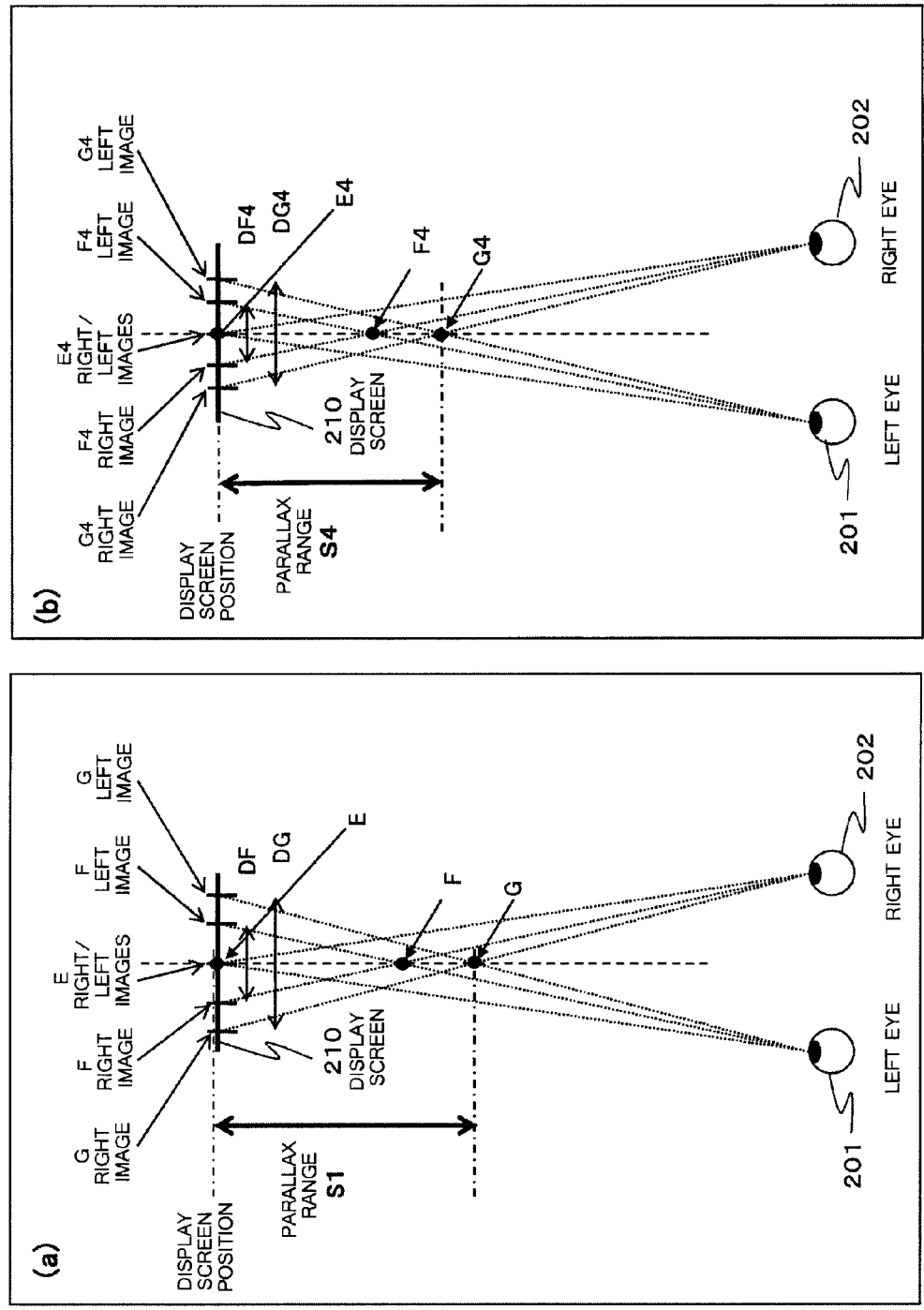
FIGS. 14($a$) and 14($b$) are figures explaining a specific example of control processing achieved with image transform processing executed by an image processing apparatus according to an embodiment 3(a) of the present invention.

FIGS. 14(a) and 14(b) show the following figures.

(a) parallax range S1 of input image (b) parallax range S4 of parallax-adjusted image FIGS. 14(a) and 14(b) further show a left eye 201 and a right eye 202 of the observer (user) and a display screen 210 of a display unit which is executing the three-dimensional image display process.

An image having various parallaxes according to the subject distances are presented on the display screen 210.

Like the embodiments 1, 2 described above, disparity which is a distance of the same subjects on the display screen is used as an index value of parallax in this explanation.

FIG. 14(a) is a figure corresponding to an input image before the parallax-adjusting process. In FIG. 14(a), The disparity of the subject E is DE which is zero, The disparity of the subject F is DF, and The disparity of the subject G is DG.

The magnitudes of the disparities satisfy the following relationship.

$$DG>DF>DE\approx 0$$

The observation position of the subject E realized by the user is on the display. The observation position of the subject F realized by the user is closer than display (closer to the observer). The observation position of the subject G realized by the user is at a position still closer than that of the subject F.

The parallax range observed by the observer is a width [S1] from the point E at the farthest display screen position to the point G which is the closest subject observation position.

As described above, the subject is observed as if the subject is located at a point in the space, which is a crossing point between a line connecting the left eye 201 of the observer and the display position of the left image on the display screen 210 and a line connecting the right eye 202 of the observe and the display position of the right image on the display screen 210.

In the present embodiment, the images of the subjects, i.e., the left image and the right image, (E to G right images and E to G left images) are set so that the crossing point is set at a position closer than display screen 210 (a direction closer to the observer).

When the three-dimensional image with such setting is shown, the observer realizes, as illustrated in FIG. 14(a), the subjects located closer to the observer than display screen 210.

As described above, the parallax range of the input image as illustrated in FIG. 14(a) is a width [S1] from the point E at the farthest display screen position to the point G which is the closest subject observation position.

FIG. 14(b) illustrates an observation state of an image displayed using images converted by the image processing apparatus 100 as illustrated in FIG. 1 according to the present embodiment 3(a), i.e., the parallax-adjusted left image (L2) 50 and the parallax-adjusted right image (R2) 60, for example.

The subjects E4, F4, G4 are the same subjects as E, F, G of FIG. 14(a), but with the transform processing described above, image shift is executed, whereby the subject positions observed by the observer are changed.

The disparity of the subject E4 is 0.

The subject E4 in the left image and the subject E4 in the right image are displayed at the same position on the display screen 210, and therefore, the disparity is zero.

The position of the subject E4 realized by the observer is a position on the display screen 210.

The disparity of the subject F4 is DF4.

The distance, on the display screen 210, between the subject F4 in the left image and the subject F4 in the right image is DF4, and therefore, the disparity is DF4.

The position of the subject F4 realized by the observer is a position closer to the observer than display screen 210, i.e., the position F4 at the side of the observer.

However, the position of the subject F4 realized by the observer is set at a position farther from the observer (closer to the display screen 210) than subject position F in the input image before the conversion as illustrated in FIG. 14(a). This is a result of the above shift processing of the images.

The disparity of the subject G4 is DG4.

It should be noted that DF4<DG4 holds.

The distance, on the display screen 210, between the subject G4 in the left image and the subject G4 in the right image is DG4, and therefore, the disparity is DG4.

The position of the subject G4 realized by the observer is a position closer to the observer than display screen 210, i.e., the position G4 at the side of the observer.

However, the position of the subject G4 realized by the observer is set at a position farther from the observer (closer to the display screen 210) than subject position G in the input image before the conversion as illustrated in FIG. 14(a). This is a result of the above shift processing of the images.

In the present embodiment 3(a), the image transform processing is performed by the image processing apparatus 100 so that the image shift is executed in the same direction as that of the embodiment 2 described above.

More specifically, the same image shift processing as that explained with reference to FIG. 12 is executed. That is, the following image shift processing is executed:

for the left image (L1) 10, the shift processing is performed in the left direction, and for the right image (R1) 20, the shift processing is performed in the right direction.

As a result, the position F of the left image (FIG. 14(a), F, left image) slightly moves in the left direction to the position F4 of the left image in FIG. 14(b), and the position F of the right image (FIG. 14(a), F, right image) slightly moves in the right direction to the position F4 of the right image in FIG. 14(b). Accordingly, the disparity decreases. In other words, the disparity decreases from DF to DF4.

At the position G which is located still closer to the observer (observer side), the position G of the left image (FIG. 14(a), G, left image) greatly moves in the left direction to the position G4 of the left image in FIG. 14(b), and the position G of the right image (FIG. 14(a), G, right image) greatly moves in the right direction to the position G4 of the right image in FIG. 14(b). With this movement, the disparity becomes still more smaller.

The disparity decreases from DG to DG4.

It should be noted that the following expression holds.

$$(DG-DG4)>(DF-DF4)$$

This means that the reducing width is larger for the disparity of the subject closer to the observer (farther from the display screen 210).

As a result, as can be understood by comparing the parallax ranges S1, S4 of FIGS. 14(a) and 14(b), The parallax range S1 (E to G) of the input image before the conversion change to the parallax range S4 (E4 to G4) of the output image (parallax-adjusted image) after the conversion.

In other words, in this example, the parallax range S4 (E4 to G4) of the output image (parallax-adjusted image) is reduced as compared with the parallax range S1 (E to G) of the input image.

The parallax range reducing effect explained with reference to FIGS. 14(a) and 14(b) is the effect that is provided as a result of the image shift performed by the image processing apparatus 100.

In the present embodiment 3(a), the left image differentiating device 112 executes differential processing like the embodiment 2. More specifically, the left image differentiating device 112 executes the differential processing by applying the following differential filter coefficients as illustrated in FIG. 12 (L2),

[−1, 0, 1]

With this differential processing, the left image is shifted in the left direction as illustrated in FIG. 12 (L1), (L2).

On the other hand, the right image differentiating device 122 executes the differential processing by applying the following differential filter coefficients as illustrated in FIG. 12 (R2),

[1, 0, −1]

With this differential processing, the right image is shifted in the right direction as illustrated in FIG. 12 (R1), (R2).

As illustrated in FIGS. 14(a) and 14(b), the left image differential processing unit 113 performs the differential calculation using the coefficients as illustrated in FIG. 12 (L2), and using the combining processing in which the differential signal or the non-linear processing result of the differential signal is added to the left image, a converted image is generated in which the image is displaced in the left direction with respect to the input image.

On the other hand, the right image differential processing unit 123 performs the differential calculation using the coefficients as illustrated in FIG. 12 (R2), and using the combining processing in which the differential signal is added to the right image or the differential signal is added to the right image after the non-linear processing, a converted image is generated in which the image is displaced in the right direction with respect to the input image.

As a result, the disparity between the left image and the right image is less than that of the input image, and the parallax range can be reduced, e.g., from the parallax range S1 of FIG. 14(a) to the parallax range S4 as illustrated in FIG. 14(b).

The present embodiment is also configured such that the change of the disparity is the least at a pixel position in focus (subject E) in the image serving as the conversion target image, and the farther a point is away from the focal position (to E, F, and then to G), the greater the change of the disparity becomes.

(b) Example of processing for enlarging of a parallax range set at a side closer than display surface of the display unit Subsequently, the example of processing for enlarging of a parallax range set at a side closer than display surface of the display unit will be explained with reference to FIGS. 15(a) and 15(b).

FIGS. 15(a) and 15(b) show the following figures.

(a) parallax range S1 of input image (b) parallax range S4 of parallax-adjusted image FIGS. 15(a) and 15(b) further show a left eye 201 and a right eye 202 of the observer (user) and a display screen 210 of a display unit which is executing the three-dimensional image display process.

An image having various parallaxes according to the subject distances are presented on the display screen 210.

Like the embodiments described above, disparity which is a distance of the same subjects on the display screen is used as an index value of parallax in this explanation.

FIG. 15(a) is a figure corresponding to an input image before the parallax-adjusting process, and is the same figure as FIG. 14(a). In FIG. 15(a), The disparity of the subject E is DE which is zero, The disparity of the subject F is DF, and The disparity of the subject G is DG.

The magnitudes of the disparities satisfy the following relationship.

$$DG > DF > DE \approx 0$$

The observation position of the subject E realized by the user is on the display. The observation position of the subject F realized by the user is closer than display (closer to the observer). The observation position of the subject G realized by the user is at a position still closer than that of the subject F.

This setting as illustrated in FIG. 15(a) is the same setting as that of FIG. 14(a) described above, and the observer realizes each subject at a position closer than display screen 210.

The parallax range of the input image as illustrated in FIG. 15(a) is a width [S1] from the point E at the farthest display screen position to the point G which is the closest subject observation position.

FIG. 15(b) illustrates an observation state of an image displayed using images converted by the image processing apparatus 100 as illustrated in FIG. 1 according to the present embodiment 3(b), i.e., the parallax-adjusted left image (L2) 50 and the parallax-adjusted right image (R2) 60, for example.

The subjects E5, F5, G5 are the same subjects as E, F, G of FIG. 15(a), but with the transform processing described above, image shift is executed, whereby the subject positions observed by the observer are changed.

The disparity of the subject E5 is 0.

The subject E5 in the left image and the subject E5 in the right image are displayed at the same position on the display screen 210, and therefore, the disparity is zero.

The position of the subject E5 realized by the observer is a position on the display screen 210.

The disparity of the subject F5 is DF5.

The distance, on the display screen 210, between the subject F5 in the left image and the subject F5 in the right image is DF5, and therefore, the disparity is DF5.

The position of the subject F5 realized by the observer is a position closer to the observer than display screen 210, i.e., the position F5 at the side of the observer.

However, the position of the subject F5 realized by the observer is set at a position closer to the observer (farther from the display screen 210) than subject position F in the input image before the conversion as illustrated in FIG. 15(a). This is a result of the above shift processing of the images.

The disparity of the subject G5 is DG5.

It should be noted that DF5<DG5 holds.

The distance, on the display screen 210, between the subject G5 in the left image and the subject G5 in the right image is DG5, and therefore, the disparity is DG5.

The position of the subject G5 realized by the observer is a position closer to the observer than display screen 210, i.e., the position G5 at the side of the observer.

However, the position of the subject G5 realized by the observer is set at a position closer to the observer (farther from the display screen 210) than subject position G in the input image before the conversion as illustrated in FIG. 15(a). This is a result of the above shift processing of the images.

In the present embodiment 3(b), the image transform processing is performed by the image processing apparatus 100 so that the image shift is executed in the same direction as that of the embodiment 1 described above.

More specifically, the same image shift processing as that explained with reference to FIG. 6 is executed. That is, the following image shift processing is executed:

for the left image (L1) 10, the shift processing is performed in the right direction, and for the right image (R1) 20, the shift processing is performed in the left direction.

As a result, the position F of the left image (FIG. 15(a), F, left image) slightly moves in the right direction to the position F5 of the left image in FIG. 15(b), and the position F of the right image (FIG. 15(a), F, right image) slightly moves in the left direction to the position F5 of the right image in FIG. 15(b). Accordingly, the disparity increases. In other words, the disparity increases from DF to DF5.

At the position G which is located still closer to the observer (observer side), the position G of the left image (FIG. 15(a), G, left image) greatly moves in the right direction to the position G5 of the left image in FIG. 15(b), and the position G of the right image (FIG. 15(a), G, right image) greatly moves in the left direction to the position G5 of the right image in FIG. 15(b). Accordingly, the disparity increases. In other words, the disparity increases from DG to DG5.

It should be noted that the following expression holds.

$$(DG5-DG) > (DF5-DF)$$

This means that the enlarging width is larger for the disparity of the subject closer to the observer (farther from the display screen 210).

Figure 15:
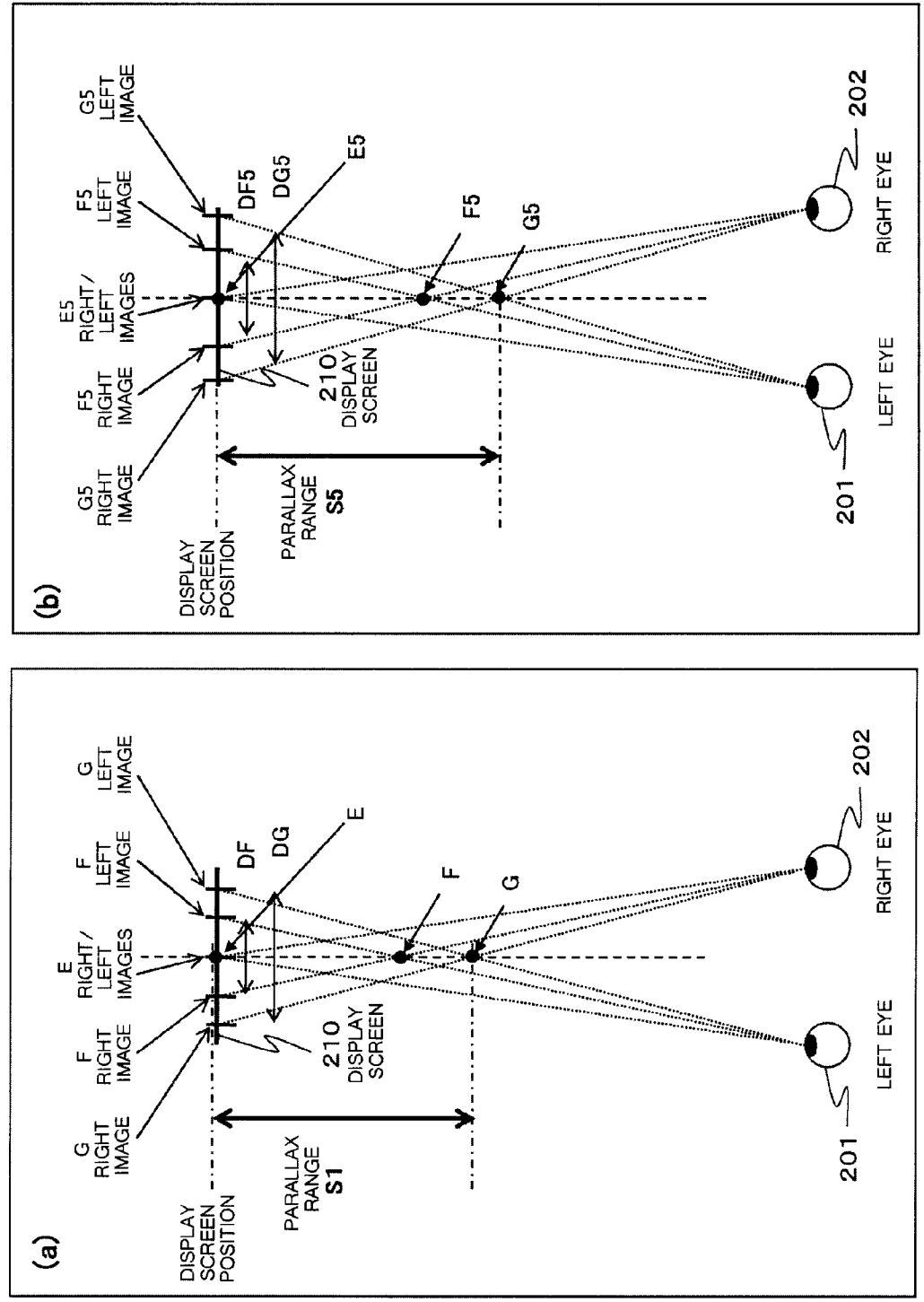
FIGS. 15($a$) and 15($b$) are figures explaining a specific example of control processing achieved with image transform processing executed by an image processing apparatus according to an embodiment 3(b) of the present invention.

As a result, as can be understood by comparing the parallax ranges S1, S5 of FIGS. 15(*a*) and 15(*b*), The parallax range S1 (E to G) of the input image before the conversion change to the parallax range S5 (E5 to G5) of the output image (parallax-adjusted image) after the conversion.

In other words, in this example, the parallax range S5 (E5 to G5) of the output image (parallax-adjusted image) is enlarged as compared with the parallax range S1 (E to G) of the input image.

The parallax range reducing effect explained with reference to FIGS. 15(*a*) and 15(*b*) is the effect that is provided as a result of the image shift performed by the image processing apparatus 100.

In the present embodiment 3(b), the same differential processing as that of the embodiment 1 explained previously is performed, and the same image shift processing as that explained with reference to FIG. 6 is executed. That is, the following image shift processing is executed:

for the left image (L1) 10, the shift processing is performed in the left direction, and for the right image (R1) 20, the shift processing is performed in the right direction.

In the present embodiment 3(b), the left image differentiating device 112 executes the differential processing by applying the following differential filter coefficients as illustrated in FIG. 6 (L2),

[1, 0, −1]

With this differential processing, the left image is shifted in the right direction as illustrated in FIG. 6 (L1), (L2).

On the other hand, the right image differentiating device 122 executes the differential processing by applying the following differential filter coefficients as illustrated in FIG. 6 (R2),

[−1, 0, 1]

With this differential processing, the right image is shifted in the left direction as illustrated in FIG. 6 (R1), (R2).

As illustrated in FIG. 6, the left image differential processing unit 113 performs the differential calculation using the coefficients as illustrated in FIG. 6 (L2), and using the combining processing in which the differential signal or the non-linear processing result of the differential signal is added to the left image, a converted image is generated in which the image is displaced in the right direction with respect to the input image.

On the other hand, the right image differential processing unit 123 performs the differential calculation using the coefficients as illustrated in FIG. 6 (R2), and using the combining processing in which the differential signal is added to the right image or the differential signal is added to the right image after the non-linear processing, a converted image is generated in which the image is displaced in the left direction with respect to the input image.

As a result, the disparity between the left image and the right image is larger than that of the input image, and the parallax range can be enlarged, e.g., from the parallax range S1 of FIG. 15(*a*) to the parallax range S5 as illustrated in FIG. 15(*b*).

The present embodiment is also configured such that the change of the disparity is the least at a pixel position in focus (subject E) in the image serving as the conversion target image, and the farther a point is away from the focal position (to E, F, and then to G), the greater the change of the disparity becomes.

[D. Embodiment 4: Example of Control Processing of Parallax Range Set at Either Side of a Display Surface of a Display Unit]

Subsequently, the example of control processing of parallax range set at either side of the display surface of the display unit will be explained.

In the embodiments 1 and 2, the example of processing performed on the image in which the parallax range is set at a deeper side of the display surface has been explained. In the embodiment 3, the example of processing performed on the image in which the parallax range is set at a closer side of the display surface has been explained. As described above, the setting of the parallax range can be set in various forms by changing the subject positions in the left image and the right image. Therefore, an image in which the parallax range is set at either side of the display surface of the display unit can also be generated. Hereinafter, an example of configuration for performing the parallax control by inputting such image in which the parallax range is set at either side of the display surface of the display unit will be explained.

It should be noted that the present embodiment 4 is achieved using the same configuration as the image processing apparatus 100 as illustrated in FIG. 1 explained in the embodiment 1.

In the embodiment 4, the following two examples of processing will be explained like the embodiment 3.

(a) Example of processing for shifting a left image in a right direction and shifting a right image in a left direction (b) Example of processing for shifting a left image in a left direction and shifting a right image in a right direction These examples of processing will be explained in order.

(a) Example of processing for shifting a left image in a right direction and shifting a right image in a left direction First, the example of processing for shifting the left image (L1) 10, which is input into the image processing apparatus 100, in the right direction and shifting the right image (R1) 20 in the left direction will be explained with reference to FIG. 16.

In this example of processing, processing corresponding to the processing as illustrated in FIG. 6 explained in the embodiment 1 described above is executed.

More specifically, the following image shift processing is executed:

for the left image (L1) 10, the shift processing is performed in the right direction, and for the right image (R1) 20, the shift processing is performed in the left direction.

In the present embodiment 4(a), the left image differentiating device 112 executes the differential processing by applying the following differential filter coefficients as illustrated in FIG. 6 (L2),

[1, 0, −1]

With this differential processing, the left image is shifted in the right direction as illustrated in FIG. 6 (L1), (L2).

On the other hand, the right image differentiating device 122 executes the differential processing by applying the following differential filter coefficients as illustrated in FIG. 6 (R2),

[−1, 0, 1]

With this differential processing, the right image is shifted in the left direction as illustrated in FIG. 6 (R1), (R2).

An example of parallax control processing according to the present embodiment 4(a) will be explained with reference to FIG. 16.

FIGS. 16(a) and 16(b) show the following figures.
(a) parallax range T1 of input image
(b) parallax range T5 of parallax-adjusted image FIGS. 16(a) and 16(b) further show a left eye 201 and a right eye 202 of the observer (user) and a display screen 210 of a display unit which is executing the three-dimensional image display process.

An image having various parallaxes according to the subject distances are presented on the display screen 210.

In the present embodiment, an image which is set such that the observer (user) realizes that the position of the subject is at either side of the display screen is adopted as an input image.

As described above, the subject is observed as if the subject is located at a point in the space, which is a crossing point between a line connecting the left eye 201 of the observer and the display position of the left image on the display screen 210 and a line connecting the right eye 202 of the observe and the display position of the right image on the display screen 210.

In the present embodiment, the images of the subjects, i.e., the left image and the right image, (H to J right images and H to J left images) are set so that the crossing point is set at a position either side of the display screen 210.

More specifically, it is an input image which is set so that:
a subject H is observed on the display screen 210,
a subject I is observed at a position closer to the observer than display screen 210 (observer side), and
a subject J is observed at a deeper side of the display screen 210.

Like the embodiments described above, disparity which is a distance of the same subjects on the display screen is used as an index value of parallax in this explanation.

FIG. 16(a) is a figure corresponding to an input image before the parallax-adjusting process.

In FIG. 16(a),
The disparity of the subject H is DH which is zero,
The disparity of the subject I is DI, and
The disparity of the subject J is DJ.

In this case, the disparity of the subject I is set such that the image of the subject I is observed at a position closer to the observer than display screen 210, and the disparity of the subject J is set such that the image of the subject J is observed at a deeper side of the display screen 210.

More specifically, as can be understood from the arrangement of the display screen 210 of FIG. 16(a),
The image (I left image) of the subject I in the left image is set at the right side of the display screen 210, and
The image (I right image) of the subject I in the right image is set at the left side of the display screen 210.

In contrast,
The image (J left image) of the subject J in the left image is set at the left side of the display screen 210, and
The image (J right image) of the subject J in the right image is set at the right side of the display screen 210.

According to this setting, the subject I is observed at a position closer to the observer than display screen 210 (observer side), and the subject J is observed at a deeper side of the display screen 210.

The parallax range observed by the observer is a width [T1] from the point J which is the farthest from the observer to the point I which is the closest to the observer.

FIG. 16(b) illustrates an observation state of an image displayed using images converted by the image processing apparatus 100 as illustrated in FIG. 1 according to the present embodiment 4(a), i.e., the parallax-adjusted left image (L2) 50 and the parallax-adjusted right image (R2) 60, for example.

The subjects H6, I6, J6 are the same subjects as H, I, J of FIG. 16(a), but with the transform processing described above, image shift is executed, whereby the subject positions observed by the observer are changed.

The disparity of the subject H6 is 0.

The subject H6 in the left image and the subject H6 in the right image are displayed at the same position on the display screen 210, and therefore, the disparity is zero.

The position of the subject H6 realized by the observer is a position on the display screen 210.

The disparity of the subject I6 is DI6.

The distance, on the display screen 210, between the subject I6 in the left image and the subject I6 in the right image is DI6, and therefore, the disparity is DI6.

The position of the subject I6 realized by the observer is a position closer to the observer than display screen 210, i.e., the position I6 at the side of the observer.

However, the position of the subject I6 realized by the observer is set at a position closer to the observer (farther from the display screen 210) than subject position I in the input image before the conversion as illustrated in FIG. 16(a). This is a result of the above shift processing of the images.

The disparity of the subject J6 is DJ6.

The distance, on the display screen 210, between the subject J6 in the left image and the subject J6 in the right image is DJ6, and therefore, the disparity is DJ6.

The position of the subject J6 realized by the observer is a position deeper than display screen 210, i.e., the position J6 which is the farthest from the observer.

However, the position of the subject J6 realized by the observer is set at a position closer to the observer (closer to the display screen 210) than subject position J in the input image before the conversion as illustrated in FIG. 16(a). This is a result of the above shift processing of the images.

In the present embodiment 4(a), the image transform processing is performed by the image processing apparatus 100 so that the image shift is executed in the same direction as that of the embodiment 1 described above.

More specifically, the same image shift processing as that explained with reference to FIG. 6 is executed. That is, the following image shift processing is executed:
for the left image (L1) 10, the shift processing is performed in the right direction, and
for the right image (R1) 20, the shift processing is performed in the left direction.

As a result, the following processing is performed for the subject I observed at a position closer to the observer than display screen 210.

The position I of the left image (FIG. 16(a), I, left image) moves in the right direction to the position I6 of the left image in FIG. 16(b), and the position I of the right image (FIG. 16(a), I, right image) moves in the left direction to the position I6 of the right image in FIG. 16(b). Accordingly, the disparity increases. In other words, the disparity increases from DI to DI6.

Further, the following processing is performed for the subject J observed at a position deeper than display screen 210.

The position J of the left image (FIG. 16(a), J, left image) moves in the right direction to the position J6 of the left image in FIG. 16(b), and the position J of the right image (FIG. 16(a), J, right image) moves in the left direction to the position J6 of the right image in FIG. 16(b). Accordingly, the disparity decreases. In other words, the disparity decreases from DJ to DJ6.

As described above, in the processing of the embodiment 4(a), for the subject I observed at a position closer to the observer than display screen 210, the disparity is greatly changed, and accordingly, it is observed at a position still more closer to the observer.

On the other hand, for the subject J observed at a position deeper than display screen 210, the disparity is slightly changed, and even in this case, it is observed at a position still more closer to the observer than position before the conversion.

Figure 16:
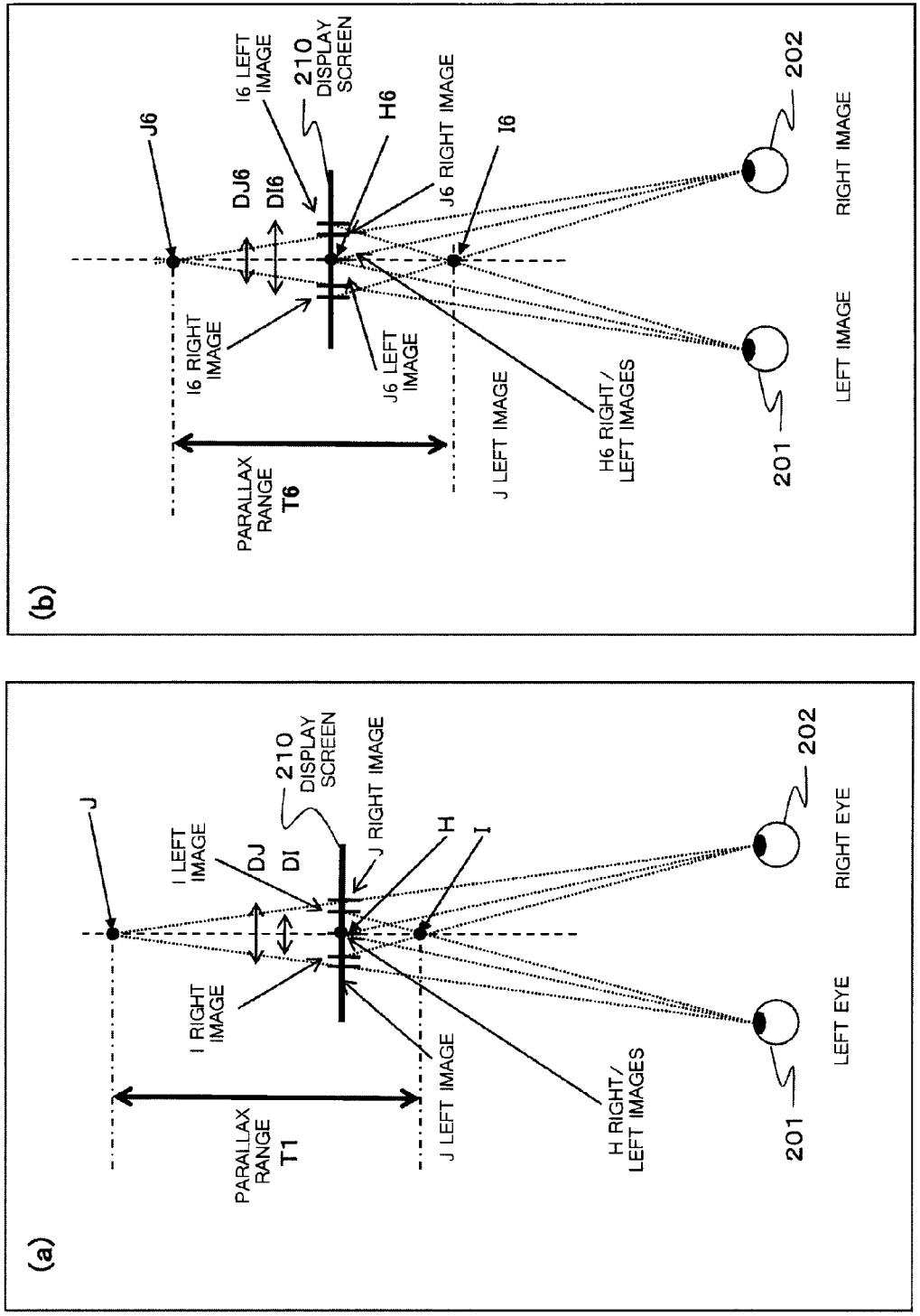
FIGS. 16($a$) and 16($b$) are figures explaining a specific example of control processing achieved with image transform processing executed by an image processing apparatus according to an embodiment 4(a) of the present invention.

As a result, as can be understood by comparing the parallax ranges T1, T6 of FIGS. 16(*a*) and 16(*b*), The parallax range T1 (I to J) of the input image before the conversion change to the parallax range T6 (I6 to J6) of the output image (parallax-adjusted image) after the conversion.

In other words, in this example, the parallax range T6 (I6 to J6) of the output image (parallax-adjusted image) is controlled so that the parallax range T1 (I to J) of the input image is moved closer to the observer side as a whole.

The parallax range moving effect explained with reference to FIGS. 16(*a*) and 16(*b*) is the effect that is provided as a result of the image shift performed by the image processing apparatus 100.

In the present embodiment 4(a), as described above, the same differential processing as that of the embodiment 1 explained previously is performed, and the same image shift processing as that explained with reference to FIG. 6 is executed. That is, the following image shift processing is executed:

for the left image (L1) 10, the shift processing is performed in the right direction, and for the right image (R1) 20, the shift processing is performed in the left direction.

As illustrated in FIG. 6, the left image differential processing unit 113 performs the differential calculation using the coefficients as illustrated in FIG. 6 (L2), and using the combining processing in which the differential signal or the non-linear processing result of the differential signal is added to the left image, a converted image is generated in which the image is displaced in the right direction with respect to the input image.

On the other hand, the l right image differential processing unit 123 performs differential calculation using the coefficients as illustrated in FIG. 6 (R2), and using the combining processing in which the differential signal is added to the right image or the differential signal is added to the right image after the non-linear processing, a converted image is generated in which the image is displaced in the left direction with respect to the input image.

As a result, the disparity between the left image and the right image is changed as illustrated in FIGS. 16(*a*) and 16(*b*), and the entire parallax range can be moved closer to the observer, e.g., from the parallax range T1 of FIG. 16(*a*) to the parallax range T6 as illustrated in FIG. 16(*b*).

The present embodiment is also configured such that the change of the disparity is the least at a pixel position in focus (subject E) in the image serving as the conversion target image, and the farther a point is away from the focal position, the greater the change of the disparity becomes.

(b) Example of processing for shifting a left image in a left direction and shifting a right image in a right direction Subsequently, the example of processing for shifting the left image (L1) 10, which is input into the image processing apparatus 100, in the left direction and shifting the right image (R1) 20 in the right direction will be explained with reference to FIG. 17.

In this example of processing, processing corresponding to the processing as illustrated in FIG. 12 explained in the embodiment 2 described above is executed. More specifically, the following image shift processing is executed:

for the left image (L1) 10, the shift processing is performed in the left direction, and for the right image (R1) 20, the shift processing is performed in the right direction.

In the present embodiment 4(a), the left image differentiating device 112 executes the differential processing by applying the following differential filter coefficients as illustrated in FIG. 12 (L2),

[−1, 0, 1]

With this differential processing, the left image is shifted in the left direction as illustrated in FIG. 12 (L1), (L2).

On the other hand, the right image differentiating device 122 executes the differential processing by applying the following differential filter coefficients as illustrated in FIG. 12 (R2),

[1, 0, −1]

With this differential processing, the right image is shifted in the right direction as illustrated in FIG. 6 (R1), (R2).

An example of parallax control processing according to the present embodiment 4(b) will be explained with reference to FIG. 17.

Figure 17:
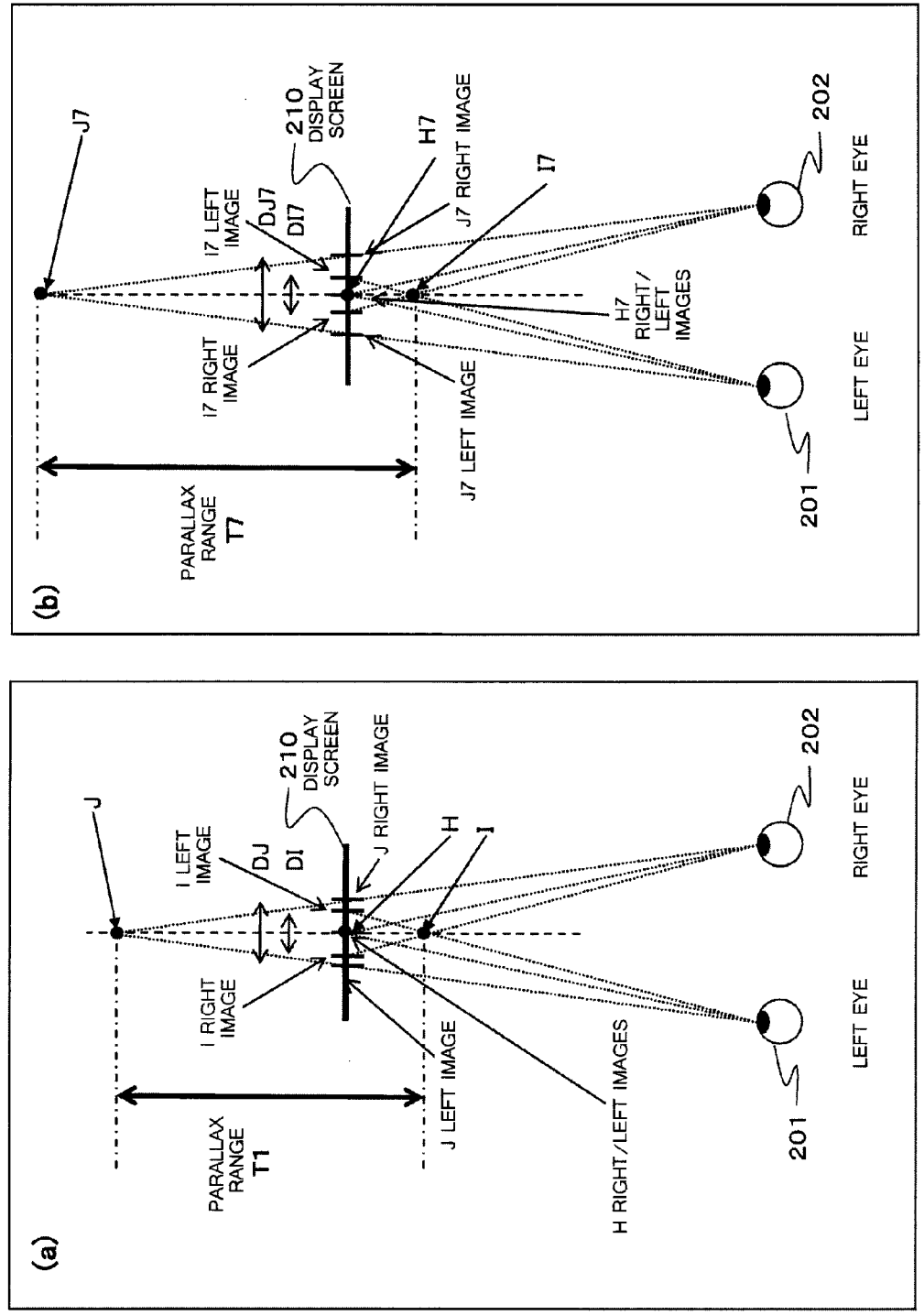
FIGS. 17($a$) and 17($b$) are figures explaining a specific example of control processing achieved with image transform processing executed by an image processing apparatus according to an embodiment 4(b) of the present invention.

FIGS. 17(*a*) and 17(*b*) show the following figures.

(a) parallax range T1 of input image (b) parallax range T5 of parallax-adjusted image FIGS. 17(*a*) and 17(*b*) further show a left eye 201 and a right eye 202 of the observer (user) and a display screen 210 of a display unit which is executing the three-dimensional image display process.

An image having various parallaxes according to the subject distances are presented on the display screen 210.

In the present embodiment, an image which is set such that the observer (user) realizes that the position of the subject is at either side of the display screen is adopted as an input image.

FIG. 17(*a*) is a figure illustrating the same parallax range T1 of the input image as that of FIG. 16(*a*) explained above.

More specifically, it is an input image which is set so that:

a subject H is observed on the display screen 210, a subject I is observed at a position closer to the observer than display screen 210 (observer side), and a subject J is observed at a deeper side of the display screen 210.

In FIG. 17(*a*),

The disparity of the subject H is DH which is zero,

The disparity of the subject I is DI, and

The disparity of the subject J is DJ.

In this case, the disparity of the subject I is set such that the image of the subject I is observed at a position closer to the observer than display screen 210, and the disparity of the subject J is set such that the image of the subject J is observed at a deeper side of the display screen 210.

The parallax range observed by the observer is a width [T1] from the point J which is the farthest from the observer to the point I which is the closest to the observer.

FIG. 17(*b*) illustrates an observation state of an image displayed using images converted by the image processing apparatus 100 as illustrated in FIG. 1 according to the present embodiment 4(b), i.e., the parallax-adjusted left image (L2) 50 and the parallax-adjusted right image (R2) 60, for example.

The subjects H7, I7, J7 are the same subjects as H, I, J of FIG. 17(*a*), but with the transform processing described above, image shift is executed, whereby the subject positions observed by the observer are changed.

The disparity of the subject H7 is 0.

The subject H7 in the left image and the subject H7 in the right image are displayed at the same position on the display screen 210, and therefore, the disparity is zero.

The position of the subject H7 realized by the observer is a position on the display screen 210.

The disparity of the subject I7 is DI7.

The distance, on the display screen 210, between the subject I7 in the left image and the subject I7 in the right image is DI7, and therefore, the disparity is DI7.

The position of the subject I7 realized by the observer is a position closer to the observer than display screen 210, i.e., the position I7 at the side of the observer.

However, the position of the subject I7 realized by the observer is set at a position farther from the observer (closer to the display screen 210) than subject position I in the input image before the conversion as illustrated in FIG. 17(a). This is a result of the above shift processing of the images.

The disparity of the subject J7 is DJ7.

The distance, on the display screen 210, between the subject J7 in the left image and the subject J7 in the right image is DJ7, and therefore, the disparity is DJ7.

The position of the subject J7 realized by the observer is a position deeper than display screen 210, i.e., the position J7 which is the farthest from the observer.

However, the position of the subject J7 realized by the observer is set at a position farther from the observer (farther from the display screen 210) than subject position J in the input image before the conversion as illustrated in FIG. 17(a). This is a result of the above shift processing of the images.

In the present embodiment 4(b), the image transform processing is performed by the image processing apparatus 100 so that the image shift is executed in the same direction as that of the embodiment 2 described above.

More specifically, the same image shift processing as that explained with reference to FIG. 12 is executed. That is, the following image shift processing is executed:

for the left image (L1) 10, the shift processing is performed in the left direction, and for the right image (R1) 20, the shift processing is performed in the right direction.

As a result, the following processing is performed for the subject I observed at a position closer to the observer than display screen 210.

The position I of the left image (FIG. 17(a), I, left image) moves in the left direction to the position I7 of the left image in FIG. 17(b), and the position I of the right image (FIG. 17(a), I, right image) moves in the right direction to the position I7 of the right image in FIG. 17(b). Accordingly, the disparity decreases. In other words, the disparity decreases from DI to DI7.

Further, the following processing is performed for the subject J observed at a position deeper than display screen 210.

The position I of the left image (FIG. 17(a), J, left image) moves in the left direction to the position J7 of the left image in FIG. 17(b), and the position J of the right image (FIG. 17(a), J, right image) moves in the right direction to the position J7 of the right image in FIG. 17(b). Accordingly, the disparity increases. In other words, the disparity increases from DJ to DJ7.

As described above, in the processing of the embodiment 4(b), for the subject I observed at a position closer to the observer than display screen 210, the disparity is lightly changed, and accordingly, it is observed at a position farther from the observer, i.e., a position closer to the display screen 210.

On the other hand, for the subject J observed at a position deeper than display screen 210, the disparity is greatly changed, and even in this case, it is observed at a position farther from the observer than position before the conversion.

As a result, as can be understood by comparing the parallax ranges T1, T7 of FIGS. 17(a) and 17(b), The parallax range T1 (I to J) of the input image before the conversion change to the parallax range T7 (I7 to J7) of the output image (parallax-adjusted image) after the conversion.

In other words, in this example, the parallax range T7 (I7 to J7) of the output image (parallax-adjusted image) is controlled so that the parallax range T1 (I to J) of the input image is moved farther from the observer as a whole.

The parallax range moving effect explained with reference to FIGS. 17(a) and 17(b) is the effect that is provided as a result of the image shift performed by the image processing apparatus 100.

In the present embodiment 4(b), as described above, the same differential processing as that of the embodiment 2 explained previously is performed, and the same image shift processing as that explained with reference to FIG. 12 is executed. That is, the following image shift processing is executed:

for the left image (L1) 10, the shift processing is performed in the left direction, and for the right image (R1) 20, the shift processing is performed in the right direction.

As illustrated in FIG. 12, the left image differential processing unit 113 performs the differential calculation using the coefficients as illustrated in FIG. 12 (L2), and using the combining processing in which the differential signal or the non-linear processing result of the differential signal is added to the left image, a converted image is generated in which the image is displaced in the left direction with respect to the input image.

On the other hand, the right image differential processing unit 123 performs differential calculation using the coefficients as illustrated in FIG. 12 (R2), and using the combining processing in which the differential signal is added to the right image or the differential signal is added to the right image after the non-linear processing, a converted image is generated in which the image is displaced in the right direction with respect to the input image.

As a result, the disparity between the left image and the right image is changed as illustrated in FIGS. 17(a) and 17(b), and the entire parallax range can be moved away from the observer, e.g., from the parallax range T1 of FIG. 17(a) to the parallax range T7 as illustrated in FIG. 17(b).

The present embodiment is also configured such that the change of the disparity is the least at a pixel position in focus (subject E) in the image serving as the conversion target image, and the farther a point is away from the focal position, the greater the change of the disparity becomes.

The configuration of the embodiment 1 to the embodiment 4 explained hereinabove does not require the processing of generating the disparity map describing disparity (image difference) corresponding to each pixel of the left image and the right image and the processing using the disparity map. Therefore, the processing cost is smaller, and the size of the circuit can be reduced easily.

Subsequently, the embodiment using a simplified disparity map will be explained.

[E. Embodiment 5: The Embodiment for Performing Parallax Control Using Simplified Disparity Map]

Subsequently, a configuration of an image processing apparatus executing the parallax control using the simplified disparity map and an example of processing will be explained as the embodiment 5.

In the embodiment explained below, an image converting apparatus capable of appropriately controlling the parallax range by generating the simplified disparity map is achieved.

Figure 18:
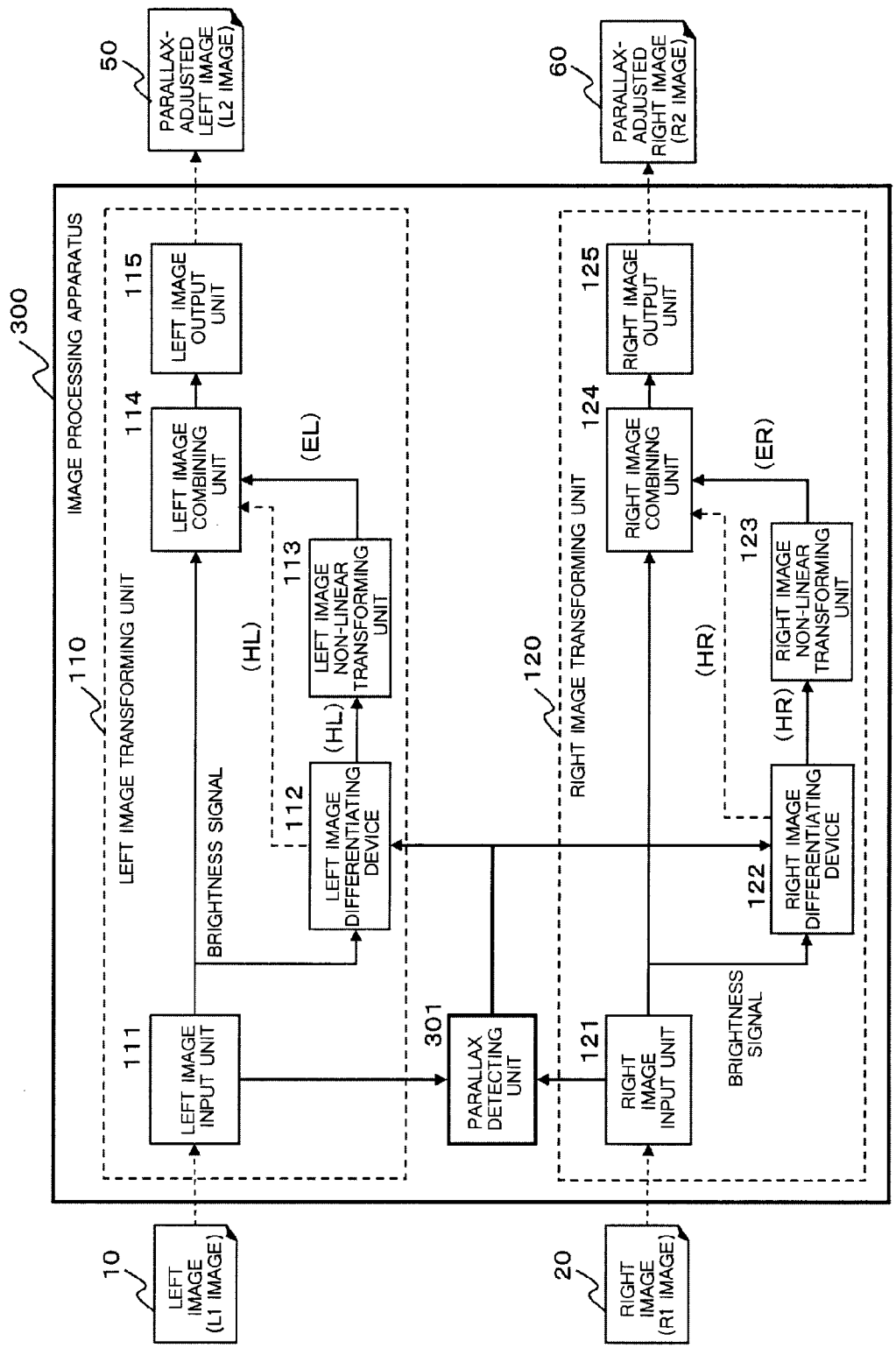
FIG. 18 is a figure explaining an example of configuration of the image processing apparatus according to the embodiment of the present invention.

An example of configuration of an image processing apparatus 300 according to the embodiment 5 is shown in FIG. 18. The image processing apparatus 300 as illustrated in FIG. 18 is configured such that a parallax detecting unit 301 is added to the image processing apparatus 100 as illustrated in FIG. 1 explained as the image processing apparatus according to the embodiment 1 explained above. The other configuration is the same as the configuration as illustrated in FIG. 1.

As illustrated in FIG. 18, the image processing apparatus 300 includes a left image transforming unit 110 for receiving a left image (L1 image) 10, performing image transform, and generating a parallax-adjusted left image (L2 image) 50 in which parallax is adjusted, and also includes a right image transforming unit 120 for receiving a right image (R1 image) 20, performing image transform, and generating a parallax-adjusted right image (R2 image) 60 in which parallax is adjusted. In addition, the image processing apparatus 300 includes the parallax detecting unit 301.

The left image transforming unit 110 includes a left image input unit 111 for receiving the left image (L1) 10, a left image differential processing unit 112 for performing differential processing of the left image 10, a left non-linear transforming unit 113 for non-linearly transforming a differential signal of the left image 10, a left image combining unit 114 for combining the left image 10 and the differential signal non-linearly transformed, and a left image output unit 115 for outputting the converted parallax-adjusted left image (L2) 50.

The right image transforming unit 120 includes a right image input unit 121 for receiving the right image (R1) 20, a right image differential processing unit 122 for performing differential processing of the right image 20, a right non-linear transforming unit 123 for non-linearly transforming a differential signal of the right image 20, a right image combining unit 124 for combining the right image 20 and the differential signal non-linearly transformed, and a right image output unit 125 for outputting the converted parallax-adjusted right image (R2) 60.

This left image transforming unit 110 and this right image transforming unit 120 execute the same processing as the processing explained in the embodiments 1 to 4 explained above.

The parallax detecting unit 301 receives the left image brightness signal which is output from the left image input unit 111 of the left image transforming unit 110 and the right image brightness signal which is output from the right image input unit 121 of the right image transforming unit 120, and detects corresponding pixel positions in a horizontal direction that are determined to be the same subjects in the left image and the right image.

The parallax detecting unit 301 according to the present embodiment obtains the following determination result for a positional relationship of corresponding pixel positions of the left image and the right image (hereinafter referred to as corresponding points).

A determination is made as to which of the following patterns is applicable.

(a) the corresponding point of the left image is located at the left of the corresponding point of the right image, and (b) the corresponding point of the left image is located at the right of the corresponding point of the right image (a) the corresponding point of the left image is located at the left of the corresponding point of the right image.

When the case of (a) will be explained with reference to FIG. 17(a) explained in the embodiment 4 explained above, the case of (a) is the corresponding relationship of the subject J in the left image and the subject J in the right image.

In other words, the corresponding point (J left image) of the left image is located at the left of the corresponding point (J right image) of the right image.

In this kind of setting, the position at which the subject is observed is at a side deeper than display screen (position farther from the observer).

(b) the corresponding point of the left image is located at the right of the corresponding point of the right image.

When the case of (b) will be explained with reference to FIG. 17(a) explained in the embodiment 4 explained above, the case of (b) is the corresponding relationship of the subject I in the left image and the subject I in the right image.

In other words, the corresponding point (I left image) of the left image is located at the right of the corresponding point (I right image) of the right image.

In this kind of setting, the position at which the subject is observed is at a side closer to the observer than display screen (position closer to the observer).

In the explanation below, when (a) the corresponding point of the left image is located at the left of the corresponding point of the right image.

In this case, the disparity is a positive value.

When (b) the corresponding point of the left image is located at the right of the corresponding point of the right image.

In this case, the disparity is a negative value.

When the disparity is positive, the position at which the subject is observed is at a side deeper than display screen (position farther from the observer).

When the disparity is negative, the position at which the subject is observed is at a side closer to the observer than display screen (position closer to the observer).

A generally available disparity map is configured to hold an accurate amount of pixel displacement (the number of pixels) corresponding to each pixel of the left image and the right image, but in the present embodiment, the parallax detecting unit 301 detects only positive/negative (polarity) of the above disparity of each pixel or a block including multiple pixels.

The parallax detecting unit 301 generates this rough disparity map including disparity polarity information corresponding to pixels or blocks, and inputs the rough disparity map into the left image differential processing unit 112 of the left image transforming unit 110 and the right image differential processing unit 122 of the right image transforming unit 120.

It should be noted that complicated parallax detection processing for obtaining a high numerical accuracy of parallax is not required in the parallax detection processing executed by the parallax detecting unit 301 of the image processing apparatus 300 according to the present embodiment. For example, the disparity map is used to control the filter coefficients of the differential processing unit, but in principle, the horizontal movement of the image relies on a spatial frequency of an input image, and therefore, the performance of parallax control is not greatly affected by the spatial resolution of the disparity map. Therefore, in the parallax detection processing, a reduced image may be used. Alternatively, parallax information may be configured to be detected only at points obtained by spatially decimating the input image. With such configuration, the cost of the processing can be reduced.

Each of the left image differential processing unit 112 and the right image differential processing unit 122 switches the mode of the differential processing in accordance with the polarity at the target pixel position of the input disparity map. More specifically, for example, each of the left image differential processing unit 112 and the right image differential processing unit 122 performs processing for switching, as necessary, the processing applying the differential filter having the setting as illustrated in FIG. 6 and the processing applying the differential filter having the setting as illustrated in FIG. 12 explained in the embodiments 1 and 2 explained above.

More specifically, the following processing are performed.

(1) processing for shifting the left image in the right direction, and shifting the right image in the left direction (FIG. 6), (2) processing for shifting the left image in the left direction, and shifting the right image in the right direction (FIG. 12).

Any one of the above processing is switched and executed in accordance with the polarity at the target pixel position of the disparity map.

Hereinafter, the following processing examples will be explained in order with reference to FIGS. 19(a), 19(b), 20(a) and 20(b), which are processing examples in which the image processing apparatus 300 as illustrated in FIG. 18 of the present embodiment 5 is applied to the input image in which a polarity of disparity is in two directions (subjects are displayed at a position deeper than display screen and at a position closer to the observer than display screen).

The embodiment 5(a): the embodiment for reducing parallax range

The embodiment 5(b): the embodiment for enlarging parallax range (Embodiment 5(a): The Embodiment for Reducing Parallax Range)

First, the embodiment for performing processing for reducing a parallax range by applying polarity determination information of disparity will be explained with reference to FIGS. 19(a) and 19(b).

Figure 19:
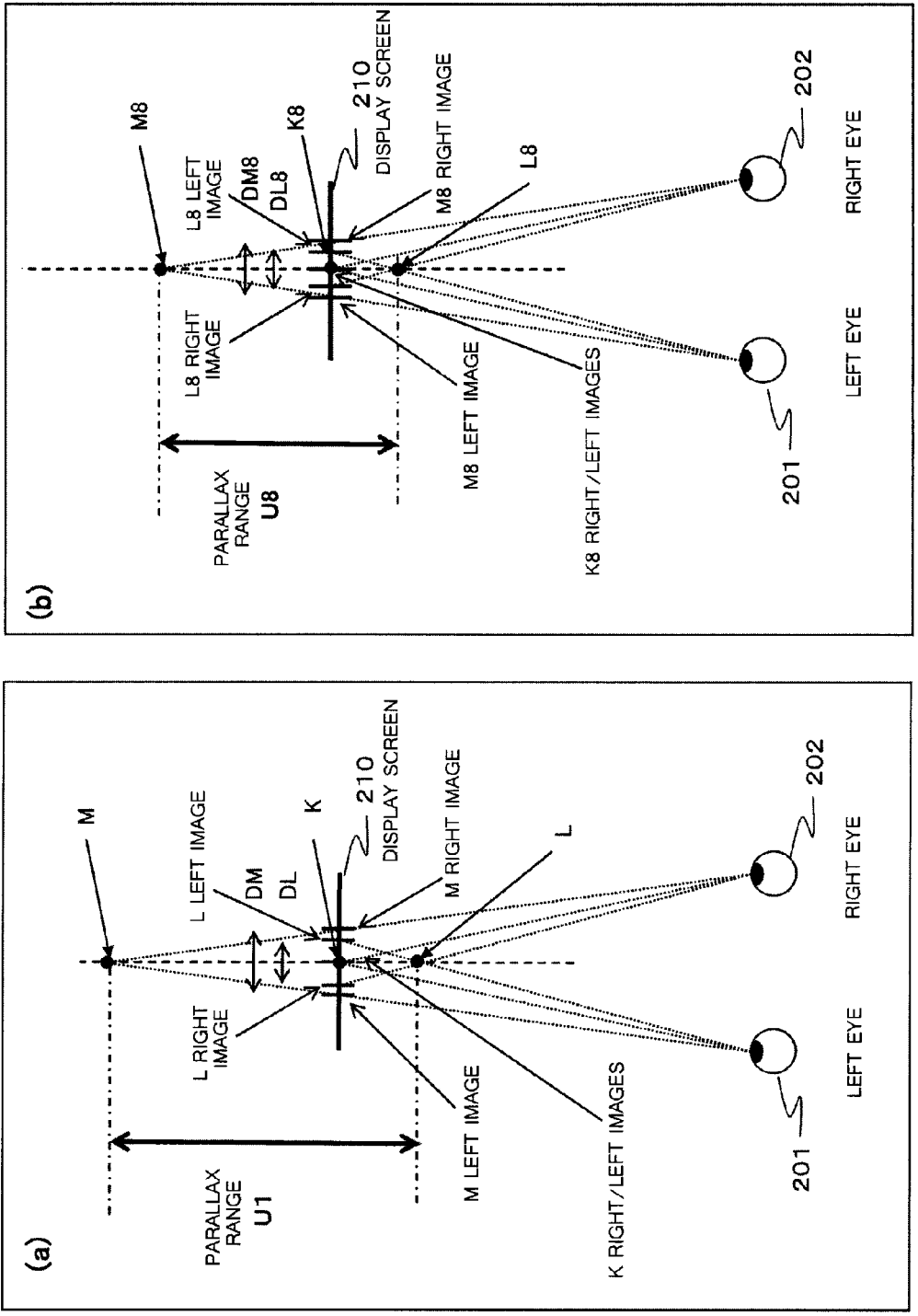
FIGS. 19($a$) and 19($b$) are figures explaining a specific example of control processing achieved with image transform processing executed by an image processing apparatus according to an embodiment 5(a) of the present invention.

Like those explained in each of the above embodiments, FIGS. 19(a) and 19(b) show the following figures.

(a) parallax range U1 of input image (b) parallax range U8 of parallax-adjusted image FIGS. 19(a) and 19(b) further show a left eye 201 and a right eye 202 of the observer (user) and a display screen 210 of a display unit which is executing the three-dimensional image display process.

An image having various parallaxes according to the subject distances are presented on the display screen 210.

In the present embodiment, an image which is set such that the observer (user) realizes that the position of the subject is at either side of the display screen is adopted as an input image.

Like FIGS. 16(a) and 17(a) explained in the embodiment 4 explained above, subjects are observed at either side of the display screen 210 in FIG. 19(a). More specifically, it is an input image which is set so that:

a subject K is observed on the display screen 210, a subject L is observed at a position closer to the observer than display screen 210 (observer side), and a subject M is observed at a deeper side of the display screen 210.

In FIG. 19(a),

The disparity of the subject K is DH which is zero, The disparity of the subject L is DL (disparity polarity=negative (−)), and The disparity of the subject M is DM (disparity polarity=positive (+)).

In this case, the polarity of the disparity of the subject L is negative, and the image of the subject L is set so that it is observed at a position closer to the observer than display screen 210. The polarity of the disparity of the subject M is positive, and the image of the subject M is set so that it is observed at a position deeper than display screen 210.

The parallax range is a parallax range [U1] corresponding to the observation positions of the subjects L to M.

FIG. 19(b) illustrates an observation state of an image displayed using images converted by the image processing apparatus 300 as illustrated in FIG. 18 according to the present embodiment 5(a), i.e., the parallax-adjusted left image (L2) 50 and the parallax-adjusted right image (R2) 60, for example.

The subjects K8, L8, M8 are the same subjects as K, L, M of FIG. 19(a), but since the image transform processing with the image shift is executed in accordance with the disparity polarity described above, whereby the subject positions observed by the observer are changed.

The disparity of the subject K8 is zero.

The subject K8 in the left image and the subject K8 in the right image are displayed at the same position on the display screen 210, and therefore, the disparity is zero.

The position of the subject K8 realized by the observer is a position on the display screen 210.

The disparity of the subject L8 is DL8.

The distance, on the display screen 210, between the subject L8 in the left image and the subject L8 in the right image is DL8, and therefore, the disparity is DL8.

The position of the subject L8 realized by the observer is a position closer to the observer than display screen 210, i.e., the position L8 at the side of the observer.

However, the position of the subject L8 realized by the observer is set at a position farther from the observer (closer to the display screen 210) than subject position L in the input image before the conversion as illustrated in FIG. 19(a). This is a result of the above shift processing of the images.

In this shift processing, the polarity of the disparity DL of the subject L as illustrated in FIG. 19(a) is considered.

As described above, the disparity of the subject L is DL (disparity polarity=negative (−)). In other words, the corresponding point (L left image) of the left image is at the right of the corresponding point (L right image) of the right image.

As described above, in the present embodiment 5(a), in the transform processing of the pixel position (pixel or block) of which disparity polarity is negative (−), "processing of shifting the left image in the left direction and shifting the right image in the right direction (see FIG. 12)" is executed.

More specifically, as illustrated in FIG. 12, the left image differential processing unit 113 performs the differential calculation using the coefficients [−1, 0, 1] as illustrated in FIG. 12 (L2), and using the combining processing in which the differential signal or the non-linear processing result of the differential signal is added to the left image, a converted image is generated in which the image is displaced in the left direction with respect to the input left image.

On the other hand, the right image differential processing unit 123 performs the differential calculation using the coefficients [1, 0, −1] as illustrated in FIG. 12 (R2), and using the combining processing in which the differential signal is added to the right image or the differential signal is added to the right image after the non-linear processing, a converted image is generated in which the image is displaced in the right direction with respect to the input right image.

With this image transform processing, the disparity of the subject L is changed from DL as illustrated in FIG. 19(a) to DL8 as illustrated in FIG. 19(b). As a result, the distance between the corresponding point (L8 left image) of the left image and the corresponding point (L8 right image) of the right image is reduced. As a result, the subject image L8 is set such that it is moved in a direction away from the observer (closer to the display screen 210) with respect to the position of the subject image L as illustrated in FIG. 19(a) before the conversion.

On the other hand, before the image conversion, the disparity of the subject M located at a position deeper than display screen 210 is DM. After the image conversion, the disparity of the subject M becomes DM8 as illustrated in FIG. 19(b).

The position of the subject M8 realized by the observer is at the position M8 deeper than display screen 210.

However, the position of the subject M8 realized by the observer is set at a position closer to the observer (closer to the display screen 210) than subject position M in the input image before the conversion as illustrated in FIG. 19(a). This is a result of the above shift processing of the images.

In this shift processing, the polarity of the disparity DM of the subject M as illustrated in FIG. 19(a) is also considered.

As described above, the disparity of the subject M is DM (disparity polarity=positive (+)). In other words, the corresponding point (M left image) of the left image is located at the left of the corresponding point (M right image) of the right image.

As described above, in the present embodiment 5(a), in the transform processing of the pixel position (pixel or block) of which disparity polarity is positive (+), "processing of shifting the left image in the right direction and shifting the right image in the left direction (see FIG. 6)" is executed.

More specifically, as illustrated in FIG. 6, the left image differential processing unit 113 performs the differential calculation using the coefficients [1, 0, −1] as illustrated in FIG. 6 (L2), and using the combining processing in which the differential signal or the non-linear processing result of the differential signal is added to the left image, a converted image is generated in which the image is displaced in the right direction with respect to the input left image.

On the other hand, the right image differential processing unit 123 performs the differential calculation using the coefficients [−1, 0, 1] as illustrated in FIG. 6 (R2), and using the combining processing in which the differential signal is added to the right image or the differential signal is added to the right image after the non-linear processing, a converted image is generated in which the image is displaced in the left direction with respect to the input right image.

With this image transform processing, the disparity of the subject M is changed from DM as illustrated in FIG. 19(a) to DM8 as illustrated in FIG. 19(b). As a result, the distance between the corresponding point (M8 left image) of the left image and the corresponding point (M8 right image) of the right image is reduced. As a result, the subject image M8 is set such that it is moved in a direction closer to the observer (closer to the display screen 210) with respect to the position of the subject image M as illustrated in FIG. 19(a) before the conversion.

As a result, the parallax range of the three-dimensional image displayed with the converted images is the parallax range [U8] as illustrated in FIG. 19(b).

The parallax range [U8] after the conversion becomes closer to the display screen 210 at either side of the display screen, as compared with the parallax range [U1] of the images before the conversion, so that the parallax range [U8] after the conversion becomes a reduced parallax range.

As described above, according the present embodiment 5(a), with the processing using the differential filter coefficients in the opposite patterns, the shift processing in the opposite directions is executed on the subject observed at a position closer to the observer than display screen and the subject observed at a position deeper than display screen. In other words, different filters are selected and applied in accordance with the polarities of disparities, and the image shift processing (FIG. 6 or FIG. 12) is executed in different directions.

With this processing, the observation positions of not only the subject observed at a position closer to the observer than display screen but also the subject observed at a position deeper than display screen can be moved in the display screen direction, and as a result, the parallax range can be reduced (from U1 to U8) more efficiently.

(Embodiment 5(b): The Embodiment for Enlarging Parallax Range

Subsequently, the embodiment for performing processing for enlarging a parallax range by applying polarity determination information of disparity will be explained with reference to FIGS. 20(a) and 20(b).

Figure 20:
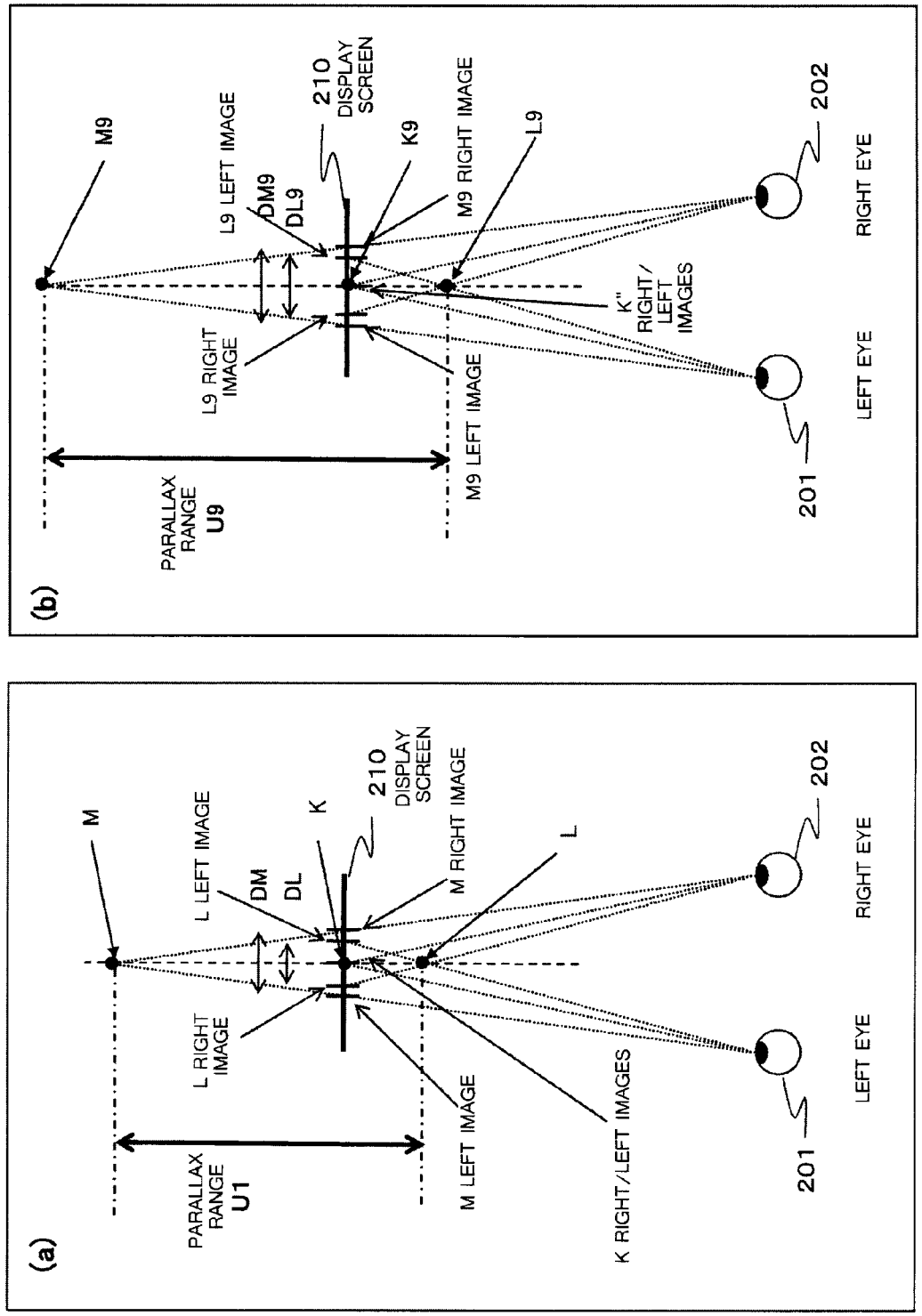
FIGS. 20($a$) and 20($b$) are figures explaining a specific example of control processing achieved with image transform processing executed by an image processing apparatus according to an embodiment 5(b) of the present invention.

Like those explained in each of the above embodiments, FIGS. 20(a) and 20(b) show the following figures.

(a) parallax range U1 of input image
(b) parallax range U9 of parallax-adjusted image FIGS. 20(a) and 20(b) further show a left eye 201 and a right eye 202 of the observer (user) and a display screen 210 of a display unit which is executing the three-dimensional image display process.

An image having various parallaxes according to the subject distances are presented on the display screen 210.

In the present embodiment, an image which is set such that the observer (user) realizes that the position of the subject is at either side of the display screen is adopted as an input image.

Like FIG. 19(a), subjects are observed at either side of the display screen 210 in FIG. 20(a). More specifically, it is an input image which is set so that:

a subject K is observed on the display screen 210,
a subject L is observed at a position closer to the observer than display screen 210 (observer side), and
a subject M is observed at a deeper side of the display screen 210.

In FIG. 20(a),
The disparity of the subject K is DH which is zero,
The disparity of the subject L is DL (disparity polarity=negative (−)), and
The disparity of the subject M is DM (disparity polarity=positive (+)).

In this case, the polarity of the disparity of the subject L is negative, and the image of the subject L is set so that it is observed at a position closer to the observer than display screen 210. The polarity of the disparity of the subject M is positive, and the image of the subject M is set so that it is observed at a position deeper than display screen 210.

The parallax range is a parallax range [U1] corresponding to the observation positions of the subjects L to M.

FIG. 20(b) illustrates an observation state of an image displayed using images converted by the image processing apparatus 300 as illustrated in FIG. 18 according to the present embodiment 5(b), i.e., the parallax-adjusted left image (L2) 50 and the parallax-adjusted right image (R2) 60, for example.

The subjects K9, L9, M9 are the same subjects as K, L, M of FIG. 20(a), but since the image transform processing with the image shift is executed in accordance with the disparity polarity described above, whereby the subject positions observed by the observer are changed.

The disparity of the subject K9 is zero.

The subject K9 in the left image and the subject K9 in the right image are displayed at the same position on the display screen 210, and therefore, the disparity is zero.

The position of the subject K9 realized by the observer is a position on the display screen 210.

The disparity of the subject L9 is DL9.

The distance, on the display screen 210, between the subject L9 in the left image and the subject L9 in the right image is DL9, and therefore, the disparity is DL9.

The position of the subject L9 realized by the observer is a position closer to the observer than display screen 210, i.e., the position L9 at the side of the observer.

However, the position of the subject L9 realized by the observer is set at a position closer to the observer (farther from the display screen 210) than subject position L in the input image before the conversion as illustrated in FIG. 20(a). This is a result of the above shift processing of the images.

In this shift processing, the polarity of the disparity DL of the subject L as illustrated in FIG. 20(a) is considered.

As described above, the disparity of the subject L is DL (disparity polarity=negative (−)). In other words, the corresponding point (L left image) of the left image is at the right of the corresponding point (L right image) of the right image.

As described above, the transform processing of the pixel position (pixel or block) of which disparity polarity is negative (−) in the present embodiment 5(b) is different from that of the embodiment 5(a) explained above.

In the present embodiment 5(b), "processing of shifting the left image in the right direction and shifting the right image in the left direction (see FIG. 6)" is executed.

More specifically, as illustrated in FIG. 6, the left image differential processing unit 113 performs the differential calculation using the coefficients [1, 0, −1] as illustrated in FIG. 6 (L2), and using the combining processing in which the differential signal or the non-linear processing result of the differential signal is added to the left image, a converted image is generated in which the image is displaced in the right direction with respect to the input left image.

On the other hand, the right image differential processing unit 123 performs the differential calculation using the coefficients [−1, 0, 1] as illustrated in FIG. 6 (R2), and using the combining processing in which the differential signal is added to the right image or the differential signal is added to the right image after the non-linear processing, a converted image is generated in which the image is displaced in the left direction with respect to the input right image.

With this image transform processing, the disparity of the subject L is changed from DL as illustrated in FIG. 20(a) to DL9 as illustrated in FIG. 20(b). As a result, the distance between the corresponding point (L9 left image) of the left image and the corresponding point (L9 right image) of the right image is increased. As a result, the subject image L9 is set such that it is moved in a direction closer to the observer (farther from the display screen 210) with respect to the position of the subject image L as illustrated in FIG. 20(a) before the conversion.

On the other hand, before the image conversion, the disparity of the subject M located at a position deeper than display screen 210 is DM. As a result of the image conversion, the disparity of the subject M becomes DM9 as illustrated in FIG. 20(b).

The position of the subject M9 realized by the observer is at the position M9 deeper than display screen 210.

However, the position of the subject M9 realized by the observer is set at a position farther from the observer (farther from the display screen 210) than subject position M in the input image before the conversion as illustrated in FIG. 20(a). This is a result of the above shift processing of the images.

In this shift processing, the polarity of the disparity DM of the subject M as illustrated in FIG. 20(a) is also considered.

As described above, the disparity of the subject M is DM (disparity polarity=positive (+)). In other words, the corresponding point (M left image) of the left image is located at the left of the corresponding point (M right image) of the right image.

As described above, in the present embodiment 5(b), in the transform processing of the pixel position (pixel or block) of which disparity polarity is positive (+), "processing of shifting the left image in the left direction and shifting the right image in the right direction (see FIG. 12)" is executed.

More specifically, as illustrated in FIG. 12, the left image differential processing unit 113 performs the differential calculation using the coefficients [−1, 0, 1] as illustrated in FIG. 12 (L2), and using the combining processing in which the differential signal or the non-linear processing result of the differential signal is added to the left image, a converted image is generated in which the image is displaced in the left direction with respect to the input left image.

On the other hand, the right image differential processing unit 123 performs the differential calculation using the coefficients [1, 0, −1] as illustrated in FIG. 12 (R2), and using the combining processing in which the differential signal is added to the right image or the differential signal is added to the right image after the non-linear processing, a converted image is generated in which the image is displaced in the right direction with respect to the input right image.

With this image transform processing, the disparity of the subject M is changed from DM as illustrated in FIG. 20(a) to DM9 as illustrated in FIG. 20(b). As a result, the distance between the corresponding point (M9 left image) of the left image and the corresponding point (M9 right image) of the right image is increased. As a result, the subject image M9 is set such that it is moved in a direction farther from the observer (farther from the display screen 210) with respect to the position of the subject image M as illustrated in FIG. 20(a) before the conversion.

As a result, the parallax range of the three-dimensional image displayed with the converted images is the parallax range [U9] as illustrated in FIG. 20(b).

The parallax range [U9] after the conversion becomes farther from the display screen 210 at either side of the display screen, as compared with the parallax range [U1] of the images before the conversion, so that the parallax range [U9] after the conversion becomes an enlarged parallax range.

As described above, according the present embodiment 5(b), with the processing using the differential filter coefficients in the opposite patterns, the shift processing in the opposite directions is executed on the subject observed at a position closer to the observer than display screen and the subject observed at a position deeper than display screen. In other words, different filters are selected and applied in accordance with the polarities of disparities, and the image shift processing (FIG. 6 or FIG. 12) is executed in different directions.

With this processing, the observation positions of not only the subject observed at a position closer to the observer than display screen but also the subject observed at a position deeper than display screen can be moved in a direction away from the display screen direction, and as a result, the parallax range can be enlarged (from U1 to U9) more efficiently.

The present embodiment is also configured such that the change of the disparity is the least at a pixel position in focus (subject E) in the image serving as the conversion target image, and the farther a point is away from the focal position, the greater the change of the disparity becomes.

[F. Embodiment 6: the embodiment having configuration to enable input of signal for control of shift mode]

Subsequently, an embodiment having a configuration to enable input of a control signal for control of a shift mode will be explained with reference to FIGS. 21 to 23.

In the above embodiments, in the configuration as illustrated in FIG. 1, a combination of [−1, 0, 1] and [1, 0, −1] is configured to be used as the differential filter coefficients applied by the left image differentiating device 112 and the right image differentiating device 122, as explained with reference to FIGS. 6 and 12.

More specifically, the setting is as follows.

In the embodiment 1, the setting of the differential filter coefficients (the left image differentiating device: [1, 0, −1], the right image differentiating device [−1, 0, 1]) according to FIG. 6 is setting for shifting the left image in the right direction and shifting the right image in the left direction.

In the embodiment 2, the setting (the left image differentiating device: [−1, 0, 1], the right image differentiating device [1, 0, −1]) according to FIG. 12 is setting for shifting the left image in the left direction and shifting the right image in the right direction.

In each the embodiment, the differential filter coefficients applied by each differentiating device are set as follows.

In the embodiment 3(a), the setting is according to FIG. 12,
In the embodiment 3(b), the setting is according to FIG. 6,
In the embodiment 4(a), the setting is according to FIG. 6,
In the embodiment 4(b), the setting is according to FIG. 12,
In the embodiment 5(a), the setting is according to FIG. 12,
In the embodiment 5(b), the setting is according to FIG. 6, The shift direction of images can be controlled according to the setting mode of these differential filter coefficients.

The differential filter coefficients are not limited to a combination such as [−1, 0, 1], [1, 0, −1]. Various kinds of setting are possible, e.g., [−2, 0, 2], [2, 0, −2], a combination of [−1, −0.5, 0, 0.5, 1], [1, 0.5, 0, −0.5, −1], or application of a two-dimensional filter other than first-order differentiation filter. The shift mode can be changed by changing such differential filter coefficients.

In the explanation about the embodiments 1 to 5 described above, the non-linear transform processing is executed by the left linear transforming unit 113 and the right linear transforming unit 123 in accordance with, for example, a pattern as illustrated in FIG. 3

As described above, the shift mode can be controlled by adjusting this transform pattern. More specifically, this makes it possible to perform control so as to change a shift ratio and the like between a region in focus and a blurred region, for example.

In the configuration of the embodiment 6, the control signal input unit is provided to control the shift direction and the shift mode.

Figure 21:
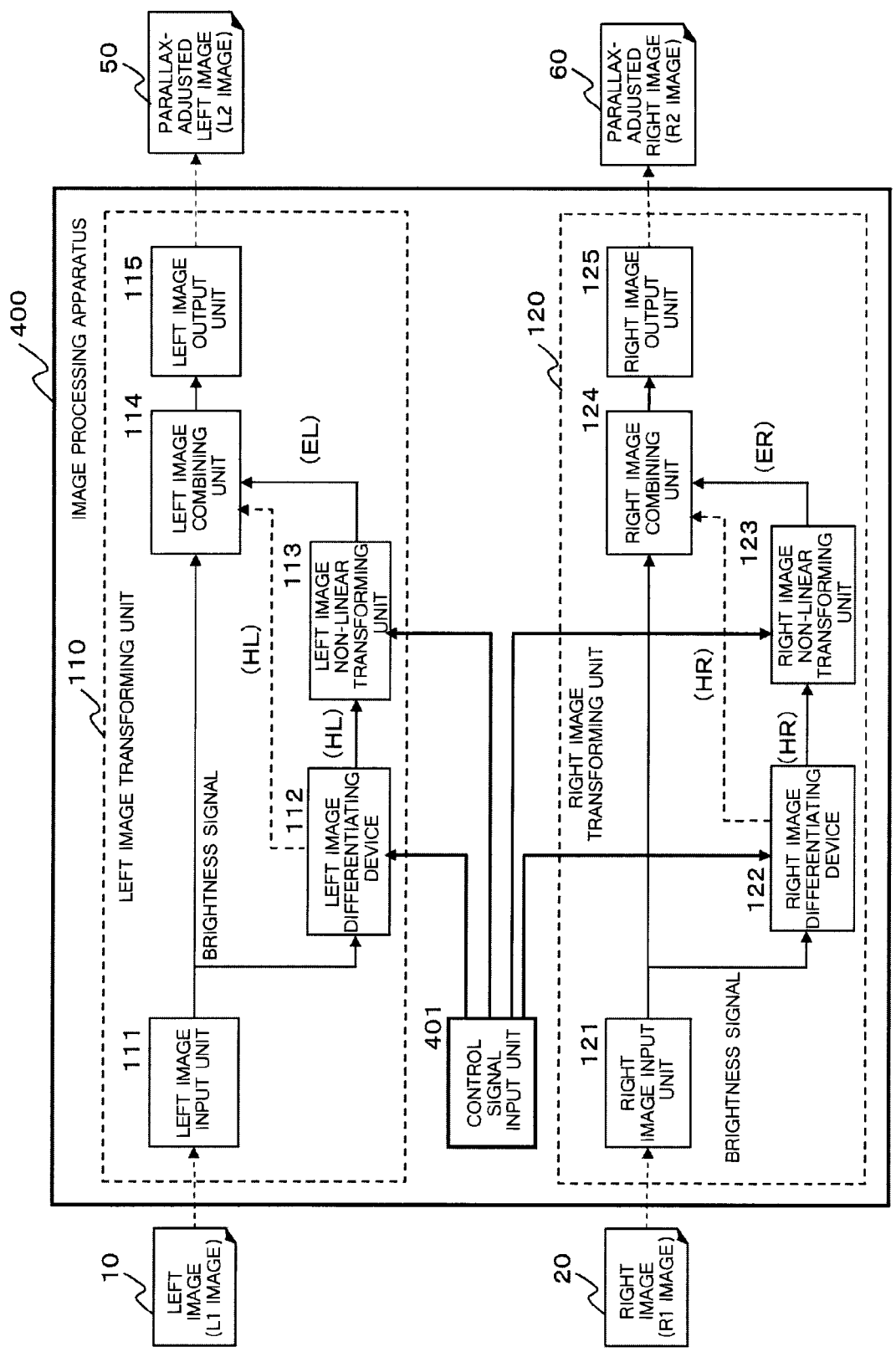
FIG. 21 is a figure explaining an example of configuration of the image processing apparatus according to the embodiment of the present invention.

An image processing apparatus 400 as illustrated in FIG. 21 has a configuration in which a control signal input unit 401 is added to the image processing apparatus 100 as illustrated in FIG. 1. The other configuration is the same as the configuration as illustrated in FIG. 1.

As illustrated in FIG. 21, the image processing apparatus 400 includes a left image transforming unit 110 for receiving a left image (L1 image) 10, performing image transform, and generating a parallax-adjusted left image (L2 image) 50 in which parallax is adjusted, and also includes a right image transforming unit 120 for receiving a right image (R1 image) 20, performing image transform, and generating a parallax-adjusted right image (R2 image) 60 in which parallax is adjusted. In addition, the image processing apparatus 400 includes the parallax detecting unit 301.

The left image transforming unit 110 includes a left image input unit 111 for receiving the left image (L1) 10, a left image differential processing unit 112 for performing differential processing of the left image 10, a left non-linear transforming unit 113 for non-linearly transforming a differential signal of the left image 10, a left image combining unit 114 for combining the left image 10 and the differential signal non-linearly transformed, and a left image output unit 115 for outputting the converted parallax-adjusted left image (L2) 50.

The right image transforming unit 120 includes a right image input unit 121 for receiving the right image (R1) 20, a right image differential processing unit 122 for performing differential processing of the right image 20, a right non-linear transforming unit 123 for non-linearly transforming a differential signal of the right image 20, a right image combining unit 124 for combining the right image 20 and the differential signal non-linearly transformed, and a right image output unit 125 for outputting the converted parallax-adjusted right image (R2) 60.

This left image transforming unit 110 and this right image transforming unit 120 execute the same processing as the processing explained in the embodiments 1 to 4 explained above.

The control signal input unit 401 inputs control signals for controlling a differential mode applied by the left image differentiating device 112 and the right image differentiating device 122 and control signals of transform processing into the left image non-linear transforming unit 113 and the right image non-linear transforming unit 123.

A specific example of setting control configuration of the differential filter of the differentiating device will be explained with reference to FIG. 22. FIG. 22 is a figure illustrating an example of internal configuration of the left image differentiating device 112.

The left image differentiating device 112 includes a filter selecting unit 421 and a differential filter applying unit 422.

The differential filter applying unit 422 has a configuration in which multiple different differential filter coefficients can be selected and applied. The filter selecting unit 421 selects a particular differential filter in accordance with the control signal provided by the control signal input unit 401, and using the selected differential filter, differential processing is executed on the brightness signal of the left image which is input from the left image input unit 111.

For example, according to such configuration, the differential processing to which various differential filter coefficients are applied is achieved.

Figure 22:
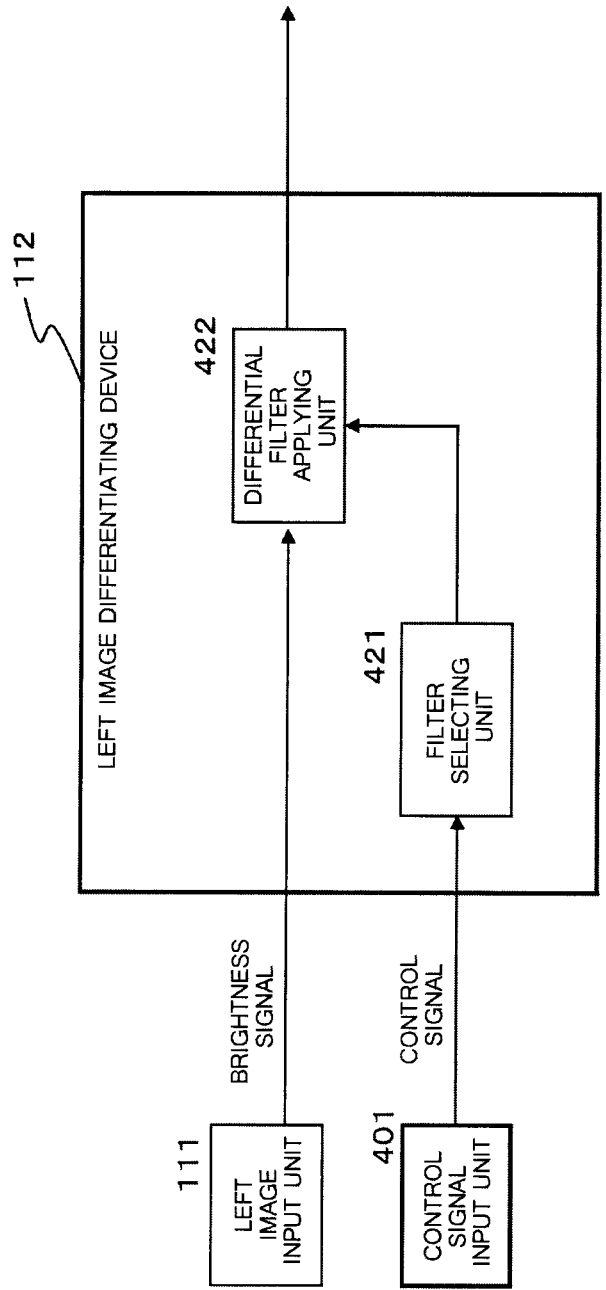
FIG. 22 is a figure explaining an example of configuration of a differentiating device of the image processing apparatus according to the embodiment of the present invention.

It should be noted that FIG. 22 has been explained as an example of configuration of the left image differentiating device 112, and the right image differentiating device 122 also has the same configuration. With the right image differentiating device 122, the differential processing to which various differential filter coefficients are applied is achieved.

As illustrated in FIG. 21, the control signal of the control signal input unit 401 is also input to the left image non-linear transforming unit 113 and the right image non-linear transforming unit 123.

The control signal which is input to the left image non-linear transforming unit 113 and the right image non-linear transforming unit 123 is a signal for controlling the transform processing mode of the differential signal. In the explanation about the embodiments explained above, for example, the non-linear transform processing is configured to be executed in accordance with the pattern as illustrated in FIG. 3. In the present embodiment, however, the transform pattern can be controlled in various modes in accordance with the control signal. For example, the control signal can be set as a function F applied to an input (In).

The following expression is determined using the function F serving as this control signal.

output Out=$F$(In)

As described above, the transform pattern is adjusted, so that the shift mode can be controlled. More specifically, this makes it possible to perform control so as to change a shift ratio and the like between a region in focus and a blurred region, for example.

It should be noted that the transform processing is not limited to non-linear process. Alternatively, linear transform may also be used.

As described above, the image processing apparatus 400 as illustrated in FIG. 21 is configured to be able to input control signals for controlling the differential mode applied by the left image differentiating device 112 and the right image differentiating device 122 and control signals of transform processing into the left image non-linear transforming unit 113 and the right image non-linear transforming unit 123.

The input of the control signals enable control of the shift mode and the shift direction of images.

For example, a converted image is displayed on the display unit, and a control signal is changed while a user observes the displayed image. Such processing can achieve setting of the parallax range and setting of the three-dimensional image according to user's preference.

The configuration explained with reference to FIG. 21 is a configuration in which the control signal input unit 401 is added to the image processing apparatus as illustrated in FIG. 1 explained as the configuration of the embodiments 1 to 4 described above. Alternatively, a control signal input unit may be added to the image processing apparatus 300 as illustrated in FIG. 18 explained as the configuration of the embodiment 5. FIG. 23 illustrates an example of configuration of an image processing apparatus 500.

Figure 23:
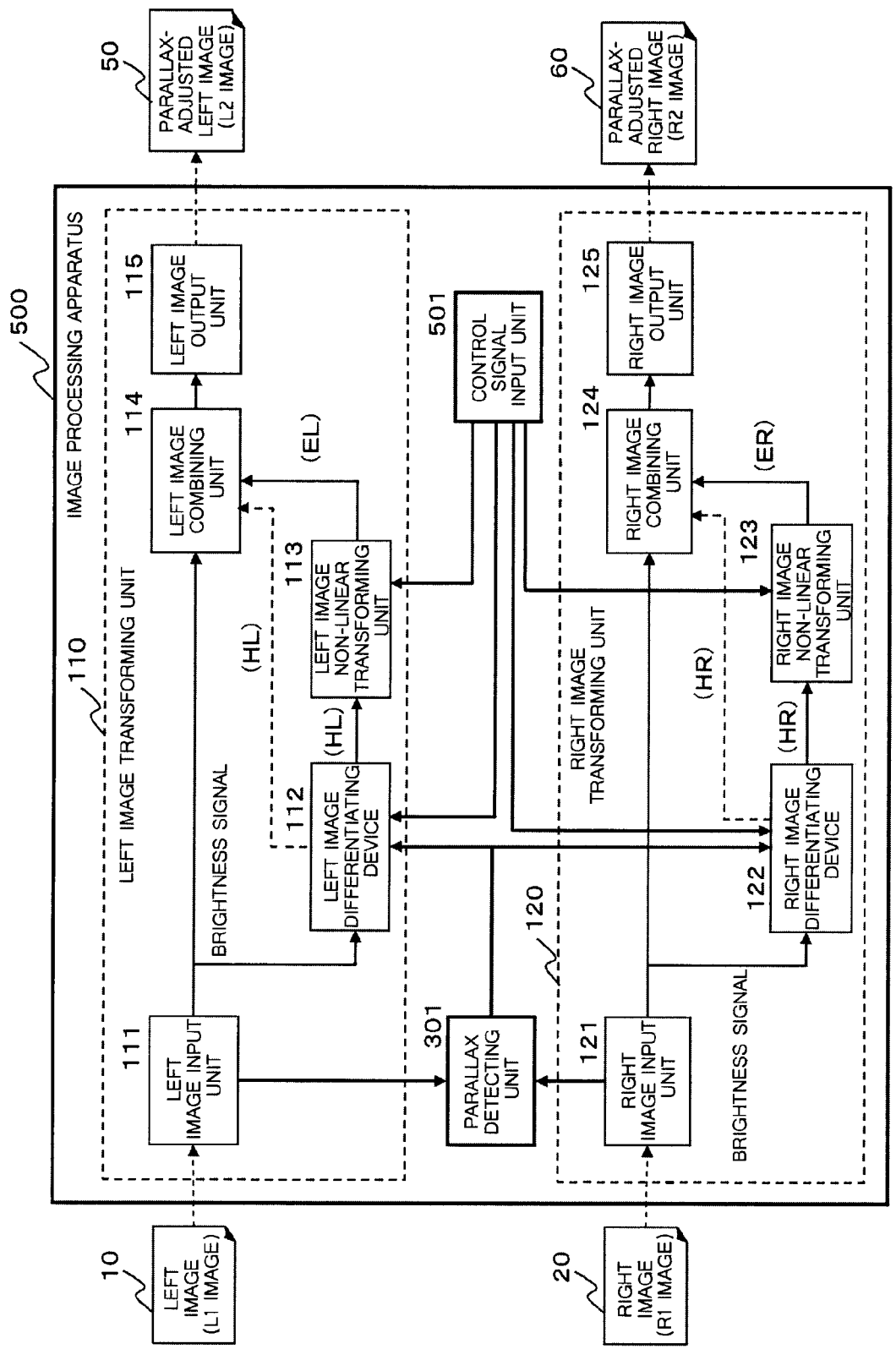
FIG. 23 is a figure explaining an example of configuration of the image processing apparatus according to the embodiment of the present invention.

The image processing apparatus 500 as illustrated in FIG. 23 has a configuration in which a control signal input unit 501 is added to the image processing apparatus 300 as illustrated in FIG. 18 explained as the image processing apparatus of the embodiment 5 explained above.

The configuration of the left image transforming unit 110, the right image transforming unit 120, and the parallax detecting unit 301 and the executed processing are substantially the same as what has been explained in the embodiment 5 explained above.

However, the image processing apparatus 500 as illustrated in FIG. 23 is configured to be able to input control signals for controlling the differential mode applied by the left image differentiating device 112 and the right image differentiating device 122 and control signals of transform processing into the left image non-linear transforming unit 113 and the right image non-linear transforming unit 123.

The input of the control signals enable control of the shift mode and the shift direction of images.

For example, a converted image is displayed on the display unit, and a control signal is changed while a user observes the displayed image. Such processing can achieve setting of the parallax range and setting of the three-dimensional image according to user's preference.

In the explanation about the embodiments described above, the input images are configured to be applied and converted as it is in the processing. However, the reducing processing and the decimation processing are executed on the images (left image 10, right image 20) which are input by the image input units, and thereafter, differential processing, non-linear transform, combining processing, or parallax detection processing may be executed. With such processing configuration, the amount of data processing can be reduced. As explained in the embodiment 5, only the parallax detection processing of the parallax detecting unit 301 may be configured to be executed as processing to which a reduced image or a decimated processing image is applied.

In each the embodiment described above, the differential filters of which patterns of differential filter coefficients are in the opposite sequences in the left image differentiating device and the right image differentiating device are configured to be applied. But the same effects can also be achieved by employing the following configuration: the differential processing is executed using the same differential filter coefficients in the left image differentiating device and the right image differentiating device, and in subsequent combining processing, differential signal (or a signal obtained by non-linearly transforming the differential signal) is added to the original image signal for one of images (for example, a left image), and deduction processing is executed on the original image signal for the other of the images (for example, a right image).

The present invention has been hereinabove described in detail so far with reference to particular the embodiments. However, it is obvious that a person skilled in the art could modify the embodiments and employ an alternative in the embodiments without deviating from the gist of the present invention. In other words, the present invention has been disclosed as a form of example, and the present invention should not be understood in a limited manner. In order to determine the gist of the present invention, the field of claims should be taken into consideration.

The series of processing explained in the specification can be executed by either hardware, software or a composite configuration of both. When the processing is executed by software, a program having the processing sequence recorded therein can be installed and executed in a memory within a computer incorporated into dedicated hardware, or the program can be installed and executed in a general-purpose computer capable of executing various kinds of processing. For example, the program can be recorded to a recording medium in advance. The program can be installed to the computer from a recording medium. Alternatively, the program can be received via a network such as a LAN (Local Area Network) and the Internet, and the program can be installed to a recording medium such as an internal hard disk.

Various kinds of processing described in the specification are not limited to execution in time series as described therein. Alternatively, various kinds of processing can be executed in parallel or individually, in accordance with the performance of processing of the apparatus executing the processing or as necessary. In this specification, a system is a logical configuration of a set of multiple apparatuses, and an apparatus of each configuration is not necessarily limited to be provided within the same housing.

Industrial Applicability

As hereinabove described, according to a configuration of an embodiment of the present invention, an apparatus and a method for performing a parallax control of a left image and a right image applied to display of a stereoscopic image are provided. The image processing apparatus according to the present invention includes a left image transforming unit for generating a left image-transformed image by changing a phase of an image signal of a left image which is to be presented to a left eye in a right direction or a left direction and a right image transforming unit for generating a right image-transformed image by changing a phase of an image signal of a right image which is to be presented to a right eye in the left direction or the right direction. For example, each image transforming unit generates a differential signal by applying, to an input image, differential filter coefficients of coefficient series of opposite characteristics, and generates a parallax-controlled transformed signal using combining processing in which the differential signal or a non-linear signal of this differential signal is added to an original image signal. This processing achieves processing for, e.g., reduction or enlargement of a parallax range.

Reference Signs List

10 Left image (L1 image)
20 Right image (R1 image)
50 Parallax-adjusted left image (L2 image)
60 Parallax-adjusted right image (R2 image)
100 Image processing apparatus
110 Left image transforming unit
111 Left image input unit
112 Left image differential processing unit
113 Left non-linear transforming unit
114 Left image combining unit
115 Left image output unit
120 Right image transforming unit
121 Right image input unit
122 Right image differential processing unit
123 Right non-linear transforming unit
124 Right image combining unit
125 Right image output unit
300 Image processing apparatus
301 Parallax detecting unit
400 Image processing apparatus
401 Control signal input unit
421 Filter selecting unit
422 Differential filter applying unit
500 Image processing apparatus
501 Control signal input unit

The invention claimed is:

1. An image processing apparatus comprising:
a left image transforming unit for inputting a left image which is to be presented to a left eye and which is applied to display of a stereoscopic image, changing a phase of an image signal of a left image in a right direction or a left direction, and generating a left image-transformed image; and
a right image transforming unit for inputting a right image which is to be presented to a right eye and which is applied to display of a stereoscopic image, changing a phase of an image signal of a right image in the left direction or the right direction, and generating a right image-transformed image, wherein the left image transforming unit and the right image transforming unit extract feature quantities of the image signals of the input images, and generate the left image-transformed image and the right image-transformed image using image transform processing to which the extracted feature quantities are applied,
the image processing apparatus further includes a parallax detecting unit generating parallax information by analyzing arrangement of a corresponding point which corresponds to a same subject portion in the left image and the right image which are input into the image processing apparatus, and
the left image differentiating device and the right image differentiating device execute differential processing by changing a differential processing mode in accordance with the parallax information generated by the parallax detecting unit.

2. The image processing apparatus according to claim 1, wherein the left image transforming unit includes:
a left image differentiating device for generating a differential signal of the image signal of the left image as the feature quantity; and
a left image combining unit for generating the left image-transformed image by executing combining processing in which the differential signal of the left image or a transformed signal of the differential signal is added to the left image signal, and
wherein the right image transforming unit includes: a right image differentiating device for generating a differential signal of the image signal of the right image as the feature quantity; and
a right image combining unit for generating the right image-transformed image by executing combining processing in which the differential signal of the right image or a transformed signal of the differential signal is added to the right image signal.

3. The image processing apparatus according to claim 2, wherein the left image transforming unit includes a left image non-linear transforming unit for executing non-linear transform processing of the differential signal of the left image, and the left image combining unit generates the left image-transformed image by executing combining processing in which a transformed signal generated by the left image non-linear transforming unit is added to the left image signal, and
the right image transforming unit includes a right image non-linear transforming unit for executing non-linear transform processing of the differential signal of the right image, and the right image combining unit generates the right image-transformed image by executing combining processing in which a transformed signal generated by the right image non-linear transforming unit is added to the right image signal.

4. The image processing apparatus according to claim 2 or 3, wherein the left image differentiating device and the right image differentiating device execute differential processing to which first-order differentiation filters having differential filter coefficient series are applied.

5. The image processing apparatus according to claim 2 or 3, wherein the left image differentiating device and the right image differentiating device execute differential processing according to a same differential mode, and
one of the left image combining unit and the right image combining unit adds the differential signal of each image or the transformed signal of the differential signal to the input image signal, and the other of them performs processing of deducting the differential signal of each image or the transformed signal of the differential signal from the input image signal.

6. The image processing apparatus according to claim 2, wherein the left image differentiating device and the right image differentiating device execute differential processing of a brightness signal of the input image signal.

7. The image processing apparatus according to claim 1, wherein the parallax detecting unit generates disparity polarity information indicating that the arrangement of the corresponding point which corresponds to the same subject portion in the left image and the right image which are input into the image processing apparatus is any one of the following settings (a) and (b):
   (a) a corresponding point of the left image is located at the left of a corresponding point of the right image; and
   (b) the corresponding point of the left image is located at the right of the corresponding point of the right image, and
   the left image differentiating device and the right image differentiating device execute differential processing to which first-order differentiation filters having differential filter coefficient series are applied, in accordance with the disparity polarity information generated by the parallax detecting unit.

8. The image processing apparatus according to claim 7, wherein the parallax detecting unit generates parallax information by applying reduced images or decimated images of the left image and the right image which are input to the image processing apparatus.

9. The image processing apparatus according to claim 3, wherein the image processing apparatus further includes a control signal input unit for inputting a control signal for controlling change to at least one of a differential processing mode for the left image differentiating device and the right image differentiating device and a transform processing mode for the left image non-linear transforming unit and the right image non-linear transforming unit.

10. An image processing method executed by an image processing apparatus, comprising:
   a left image transforming step for causing a left image transforming unit to input a left image which is to be presented to a left eye and which is applied to display of a stereoscopic image, to change a phase of an image signal of a left image in a right direction or a left direction, and to generate a left image-transformed image; and
   a right image transforming step for causing a right image transforming unit to input a right image which is to be presented to a right eye and which is applied to display of a stereoscopic image, to change a phase of an image signal of a right image in the left direction or the right direction, and to generate a right image-transformed image,
   wherein the left image transforming step and the right image transforming step are steps for extracting feature quantities of the image signals of the input images, and generating the left image-transformed image and the right image-transformed image using image transform processing to which the extracted feature quantities are applied,
   the image processing apparatus further includes a parallax detecting unit generating parallax information by analyzing arrangement of a corresponding point which corresponds to a same subject portion in the left image and the right image which are input into the image processing apparatus, and
   the left image differentiating device and the right image differentiating device execute differential processing by changing a differential processing mode in accordance with the parallax information generated by the parallax detecting unit.

11. A non-transitory computer-readable storage medium storing a program which, when executed by an image processing apparatus, causes the apparatus to execute image processing comprising the steps of:
   a left image transforming step for causing a left image transforming unit to input a left image which is to be presented to a left eye and which is applied to display of a stereoscopic image, to change a phase of an image signal of a left image in a right direction or a left direction, and to generate a left image-transformed image; and
   a right image transforming step for causing a right image transforming unit to input a right image which is to be presented to a right eye and which is applied to display of a stereoscopic image, to change a phase of an image signal of a right image in the left direction or the right direction, and to generate a right image-transformed image,
   wherein in the left image transforming step and the right image transforming step, feature quantities of the image signals of the input images are extracted, and the left image-transformed image and the right image-transformed image are generated using image transform processing to which the extracted feature quantities are applied,
   the image processing apparatus further includes a parallax detecting unit generating parallax information by analyzing arrangement of a corresponding point which corresponds to a same subject portion in the left image and the right image which are input into the image processing apparatus, and
   the left image differentiating device and the right image differentiating device execute differential processing by changing a differential processing mode in accordance with the parallax information generated by the parallax detecting unit.

* * * * *